US011172528B2

(12) United States Patent
Chiba et al.

(10) Patent No.: US 11,172,528 B2
(45) Date of Patent: Nov. 9, 2021

(54) TERMINAL APPARATUS, GATEWAY, AND COMMUNICATION CONTROL METHOD

(71) Applicants: Sharp Kabushiki Kaisha, Sakai (JP); FG Innovation Company Limited, Tuen Mun (CN)

(72) Inventors: Shuichiro Chiba, Sakai (JP); Yudai Kawasaki, Sakai (JP); Masafumi Aramoto, Sakai (JP)

(73) Assignees: SHARP KABUSHIKI KAISHA, Sakai (JP); FG Innovation Company Limited, New Territories (HK)

( * ) Notice: Subject to any disclaimer, the term of this patent is extended or adjusted under 35 U.S.C. 154(b) by 0 days.

(21) Appl. No.: 16/324,910

(22) PCT Filed: Aug. 9, 2017

(86) PCT No.: PCT/JP2017/028963
§ 371 (c)(1),
(2) Date: Feb. 12, 2019

(87) PCT Pub. No.: WO2018/030474
PCT Pub. Date: Feb. 15, 2018

(65) Prior Publication Data
US 2021/0100047 A1 Apr. 1, 2021

(30) Foreign Application Priority Data
Aug. 12, 2016 (JP) .............................. JP2016-158450

(51) Int. Cl.
*H04W 76/00* (2018.01)
*H04W 76/15* (2018.01)
(Continued)

(52) U.S. Cl.
CPC ....... *H04W 76/15* (2018.02); *H04W 28/0252* (2013.01); *H04W 28/08* (2013.01);
(Continued)

(58) Field of Classification Search
CPC . H04W 76/15; H04W 76/25; H04W 28/0252; H04W 28/08; H04W 80/04; H04W 88/06
See application file for complete search history.

(56) References Cited

U.S. PATENT DOCUMENTS

2014/0161055 A1* 6/2014 Chitrapu ............... H04W 36/28
370/329
2016/0119939 A1* 4/2016 Himayat ........... H04W 72/0446
370/329
(Continued)

FOREIGN PATENT DOCUMENTS

WO 2014/089834 A1 6/2014

OTHER PUBLICATIONS

"3rd Generation Partnership Project; Technical Specification Group Services and System Aspects; Study on Architecture for Next Generation System(Release 14)", 3GPP TR 23.799 V0.6.0 (Jul. 2016).
(Continued)

*Primary Examiner* — Khai M Nguyen
(74) *Attorney, Agent, or Firm* — ScienBiziP, P.C.

(57) ABSTRACT

Provided are, for example: a communication controller configured to establish a suitable session for a terminal apparatus and a network apparatus that are connected to a wide variety of multiple access networks; a user-data communication controller that is suitable for a terminal apparatus and a network apparatus establishing a session via multiple access networks. Hence, the NextGen has studied the optimization of session management for the mobile communication service between a terminal apparatus and a network apparatus. Provided is a communication controller suitable for a terminal apparatus and network apparatus supporting the connection to a wide variety of multiple access networks.

16 Claims, 19 Drawing Sheets

(51) Int. Cl.
    *H04W 76/25*     (2018.01)
    *H04W 28/02*     (2009.01)
    *H04W 28/08*     (2009.01)
    *H04W 80/04*     (2009.01)
    *H04W 88/06*     (2009.01)

(52) U.S. Cl.
    CPC ........... *H04W 76/25* (2018.02); *H04W 80/04* (2013.01); *H04W 88/06* (2013.01)

(56) References Cited

U.S. PATENT DOCUMENTS

| | | | | |
|---|---|---|---|---|
| 2017/0339609 A1* | 11/2017 | Youn | ..................... | H04W 76/11 |
| 2017/0366618 A1* | 12/2017 | Vrzic | ..................... | H04L 67/148 |
| 2018/0103405 A1* | 4/2018 | Kim | ..................... | H04W 36/22 |
| 2018/0262930 A1* | 9/2018 | da Silva | ................. | H04W 4/24 |
| 2018/0324087 A1* | 11/2018 | Li | ......................... | H04W 88/16 |
| 2019/0230722 A1* | 7/2019 | Kawasaki | ............. | H04W 76/16 |
| 2020/0029380 A1* | 1/2020 | Kawasaki | ............. | H04W 76/11 |

OTHER PUBLICATIONS

Huawei et al., "Solution for PDU session establishment based on stateless IPv6 or DHCPv4", S2-163123, 3GPP TSG SA WG2 Meeting #115, May 23-27, 2016, Nanjing, China.

Samsung, "Correction/rewording of text in section 6.4.2.2", S2-163935, SA WG2 Meeting #116, Jul. 11-15, 2016, Vienna, Austria.

3rd Generation Partnership Project (3GPP), "Technical Specification Group Services and System Aspects; Study on Architecture for Next Generation System (Release 14)", 3GPP TR 23.799 V0.7.0 (Aug. 2016).

Motorola Mobility, Lenovo, Broardcom; "Solution for ATSSS", 3GPP SA WG2 Meeting #116, S2-164193, Jul. 11-15, 2016, Vienna, Austria.

* cited by examiner

FIG. 5B

| IMSI |
|---|
| EMM State |
| GUTI |
| ME Identity |
| Mobility Type |
| Handover Information |

FIG. 5C

| APN in Use |
|---|
| Assigned Session Type |
| IP Address(es) |
| Default Bearer |
| Mobility Type |
| Handover Information |

FIG. 5D

| EPS Bearer ID |
|---|
| TI |
| TFT |

| |
|---|
| IMSI |
| MSISDN |
| MM State |
| GUTI |
| ME Identity |
| UE Radio Access Capability |
| UE Network Capability |
| MS Network Capability |
| Access Restriction |
| MME F-TEID |
| SGW F-TEID |
| eNB Address |
| MME UE S1AP ID |
| eNB UE S1AP ID |
| NextGen BS Address |
| NextGen BS ID |
| WAG Address |
| WAG ID |
| Mobility Type |
| Handover Information |

| |
|---|
| APN in Use |
| Assigned Session Type |
| IP Address(es) |
| PGW F-TEID |
| SCEF ID |
| Default bearer |
| Mobility Type |
| Handover Information |

FIG. 9D

| |
|---|
| EPS Bearer ID |
| TI |
| TFT |
| SGW F-TEID |
| PGW F-TEID |
| MME F-TEID |
| eNB address |
| NextGen BS address |
| WAG address |
| eNB ID |
| NextGen BS ID |
| WAG ID |

FIG. 11B

| IMSI |
|---|
| ME Identity |
| MSISDN |
| MME F-TIED |
| SGW F-TIED |

FIG. 11C

| APN in Use (Data Network Identifier) |
|---|
| Assigned Session Type (Assigned PDN Type) |
| SGW F-TEID |
| PGW F-TEID |
| Default Bearer |
| IP Address(es) |

FIG. 11D

| EPS Bearer ID |
|---|
| TFT |
| PGW F-TEID |
| SGW F-TEID |
| eNB F-TEID |
| MME address |
| NextGen BS address |
| WAG address |
| MME ID |
| NextGen BS ID |
| WAG ID |

FIG. 12B

| IMSI |
|---|
| ME Identity |
| MSISDN |
| RAT type |

FIG. 12C

| APN in Use |
|---|

FIG. 12D

| Assigned Session Type |
|---|
| IP Address(es) |
| SGW F-TEID |
| PGW F-TEID |
| Default Bearer |

FIG. 12E

| EPS Bearer ID |
|---|
| TFT |
| SGW F-TEID |
| PGW F-TEID |

| User Identity |
|---|
| APN in Use |
| EPS Bearer ID |
| Serving Node Information |

FIG. 13B

TERMINAL APPARATUS, GATEWAY, AND COMMUNICATION CONTROL METHOD

TECHNICAL FIELD

The present invention relates to a terminal apparatus and the like. This application claims priority based on JP 2016-158450 filed on Aug. 12, 2016 in Japan, the contents of which are incorporated herein in its entirety by reference.

BACKGROUND ART

The 3rd Generation Partnership Project (3GPP), which undertakes activities for standardizing recent mobile communication systems, discusses System Architecture Evolution (SAE), which is the system architecture of Long Term Evolution (LTE). The 3GPP is in the process of creating specifications for the Evolved Packet System (EPS) as a communication system which realizes an all-IP (Internet Protocol) architecture. Note that a core network included in the EPS is called an Evolved Packet Core (EPC).

In recent years, the next-generation communication technology and the system architecture have been studied in the 3GPP for the 5G (5th Generation) mobile communication system, which is the next-generation mobile communication system.

NextGen (Architecture and Security for Next Generation System) has been studied as the next-generation communication technology. NextGen extracts technological challenges that have to be overcome when a wide variety of terminal apparatuses are connected to a cellular network. In addition, NextGen specifies the solutions for the extracted challenges.

For instance, what is required for the above-mentioned purposes includes: optimizing and diversifying the communication procedure to support uninterrupted mobile communication service in accordance with the terminal apparatus supporting a wide variety of access networks; and optimizing the system architecture in accordance with the optimization and the diversification of the communication procedure.

CITATION LIST

Non Patent Literature

NPL 1: 3GPP TR 23.799; Technical Specification Group Services and System Aspects; Study on Architecture for Next Generation System; (Release 14)

SUMMARY OF INVENTION

Technical Problem

NextGen has studied the optimization of session management for the mobile communication service between a terminal apparatus and a network apparatus.

Specifically, studies have been performed to provide an uninterrupted mobile communication service suitable for the terminal apparatus and/or the network apparatus by diversifying the access networks to be used in the session establishment procedure and/or in the user-data communication procedure.

The study that has been performed thus far, however, reveals neither specific means for establishing a session for a terminal apparatus and/or a network apparatus supporting a wide variety of access network nor specific means for implementing a means for communicating a wide variety of user data.

The present invention has been made under the above-described circumstances, and provides, among other things, a means for establishing a session and a communication controller for implementing a communication of a wide variety of user data.

Solution to Problem

A terminal apparatus of the present invention includes: a transmission and/or reception unit configured to perform a routing-rule update procedure by transmitting an update routing rule request message to a control apparatus of a core network, and by receiving an update routing rule accept message containing first information from the control apparatus in the core network; and a controller configured to start, based on completion of the routing-rule update procedure, an Access Traffic Splitting function using a first PDU session and a second PDU session, wherein the first information is information indicating that start of the Access Traffic Splitting function using multiple PDU sessions is permitted.

A gateway of the present invention included in a core network includes: a transmission and/or reception unit configured to perform a routing-rule update procedure by receiving a bearer resource command message from any one of a control apparatus of a core network and a control apparatus of a non-3GPP access, and by transmitting an update bearer request message containing first information to any one of the control apparatus of the core network and the control apparatus of the non-3GPP access, that one of the control apparatus of the core network and the control apparatus of the non-3GPP access being the source of the bearer resource command message; and a controller configured to start, based on completion of the routing-rule update procedure, an Access Traffic Splitting function using a first PDU session and a second PDU session, wherein the first information is information indicating that start of the Access Traffic Splitting function using multiple PDU sessions is permitted.

A communication control method for a terminal apparatus of the present invention includes the steps of: performing a routing-rule update procedure by transmitting an update routing rule request message to a control apparatus of a core network, and by receiving an update routing rule accept message containing first information from the control apparatus of the core network; and starting, based on completion of the routing-rule update procedure, an Access Traffic Splitting function using a first PDU session and a second PDU session, wherein the first information is information indicating that start of the Access Traffic Splitting function using multiple PDU sessions is permitted.

A communication control method of the present invention for a gateway included in a core network includes the steps of: performing a routing-rule update procedure by receiving a bearer resource command message from any one of a control apparatus of a core network and a control apparatus of a non-3GPP access, and by transmitting an update bearer request message containing first information to any one of the control apparatus of the core network and the control apparatus of the non-3GPP access, that one of the control apparatus of the core network and the control apparatus of the non-3GPP access being the source of the bearer resource command message; and, starting, based on completion of the routing-rule update procedure, an Access Traffic Splitting function using a first PDU session and a second PDU session, wherein the first information is information indicating that start of the Access Traffic Splitting function using multiple PDU sessions is permitted.

Advantageous Effects of Invention

According to the present invention, the terminal apparatus is capable of connecting to a core network via multiple access networks simultaneously and, in addition, capable of implementing a communication of a wide variety of user data. In addition, the core network is capable of accommodating a terminal apparatus connecting to a wide variety of access networks and is also capable of providing a mobile communication service.

BRIEF DESCRIPTION OF DRAWINGS

FIGS. 3A and 3B are diagrams illustrating an exemplar configuration of a mobile communication network and the like.

FIGS. 5B to 5D are diagrams illustrating a storage unit of the UE.

FIG. 8B is a diagram illustrating a storage unit of the MME.

FIGS. 9C and 9D are diagrams illustrating the storage unit of the MME.

FIGS. 11B to 11D are diagrams illustrating a storage unit of the SGW.

FIGS. 12B to 12E are diagrams illustrating a storage unit of the PGW.

FIG. 13B is a diagram illustrating a storage unit of the SCEF.

DESCRIPTION OF EMBODIMENTS

Hereinafter, embodiments for carrying out the present invention will be described with reference to the drawings. Note that as an example, the present embodiment describes an embodiment of a mobile communication system to which the present invention is applied.

1. Embodiment 1.1. System Overview

Figure 1:
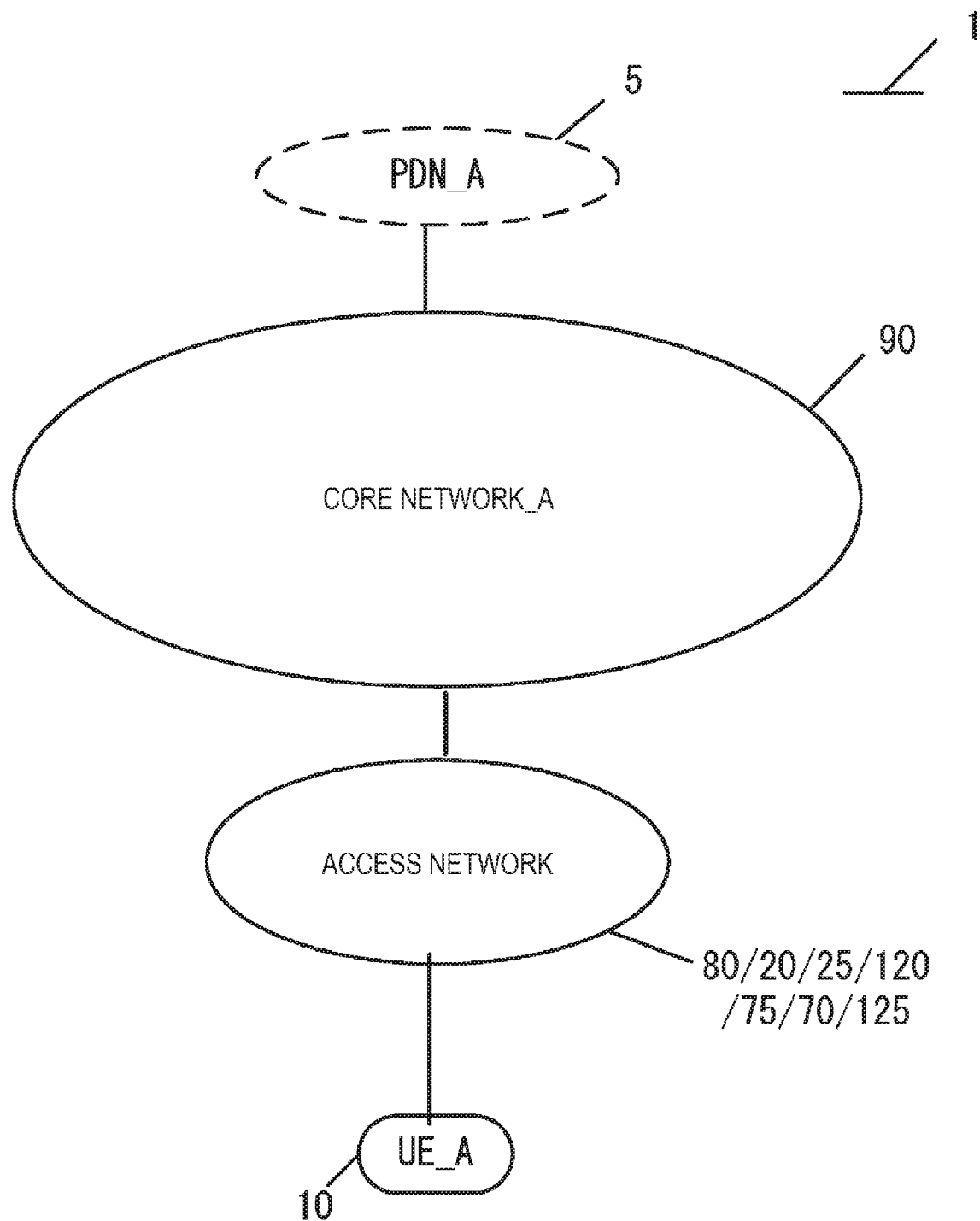
FIG. 1 is a diagram illustrating an overview of a mobile communication system.

FIG. 1 is a diagram illustrating an overview of a mobile communication system according to the present embodiment. As illustrated in FIG. 1, a mobile communication system 1 includes a mobile terminal apparatus UE_A 10, an access network, a core network_A 90, and a Packet Data Network (PDN)_A 5. The UE_A 10 may be any wirelessly connectable terminal apparatus, and may be a User Equipment (UE), Mobile Equipment (ME), a Mobile Station (MS), a Cellular Internet of Things (CIoT) terminal apparatus (CIoT UE), or the like. The CIoT terminal apparatus refers to an IoT (Internet of Things) terminal apparatus that is connectable to the core network_A 90, whereas the IoT terminal apparatus includes a cellular-phone terminal apparatus, such as a smart phone, and may be an IT (Information Technology) apparatus of various kinds, such as a personal computer and a sensor apparatus.

The UE_A 10 is connectable to the access network and/or the core network_A 90. In addition, the UE_A 10 is capable of connecting to the PDN_A 5 via the access network and/or the core network_A 90, and is capable of transmitting and/or receiving user data from and/or to the PDN_A 5. The user data may be the data transmitted and/or received between the UE_A 10 and the PDN_A 5. In addition, the transmission and/or reception (communication) of the user data may be performed by use of a Protocol Data Unit or Packet Data Unit session (PDU session). In addition, the communication of the user data does not have to be performed by means of an IP (Internet Protocol) communication but may be performed by means of a non-IP communication.

The PDU session is a connectivity to be established between the UE_A 10 and the PDN_A 5 for the purpose of providing a PDU connection service which includes the transmission and/or reception of user data between the UE_A 10 and the PDN_A 5. Specifically, the PDU session may be a connectivity which is to be established between the UE_A 10 and an external gateway. The external gateway may be an apparatus configured to connect the PDN_A 5 and the core network_A 90 such as a Packet Data Network Gateway (PGW)_A 30 and a Service Capability Exposure Function (SCEF)_A 46.

In addition, the PDU session may be a communication path which is to be established for the purpose of transmitting and/or receiving user data between the UE_A 10 and at least one of the core network_A 90 and the PDN_A 5, or may be a communication path to be established for the purpose of transmitting and/or receiving the PDU. Moreover, the PDU session may be a session which is to be established between the UE_A 10 and at least one of the core network_A 90 and the PDN_A 5, or may be a logical communication path including one or more transfer paths for the bearers between apparatuses in the mobile communication system 1. Specifically, the PDU session may be a connection which is to be established by the UE_A 10 between the core network_A 90 and the external gateway, or may be a connection, such as a Packet Data Network Connection (PDN connection), which is to be established between the UE_A 10 and at least one of the PGW_A 30 and the SCEF_A 46.

The PDU session may be a connectivity and/or connection between the UE_A 10 and the PGW_A 30 via an evolved NodeB (eNB)_A 45 and/or a Serving Gateway (SGW)_A 35, or may be a connectivity and/or connection between the UE_A 10 and the SCEF_A 46 via the eNB_A 45 and/or an MME_A 40. The PDU session which is to be established between the UE_A 10 and the PGW_A 30 via the apparatus(es) in the access network and the SGW_A 35 is defined as a first PDU session, whereas the PDU session which is to be established between the UE_A 10 and the SCEF_A 46 via the apparatus(es) in the access network and the MME_A 40 is defined as a second PDU session.

The UE_A 10 is capable of transmitting and/or receiving user data by use of the apparatuses, such as an application server allocated in the PDN_A 5, and by use of the PDU session. To put it differently, the PDU session is capable of transferring user data transmitted and/or received between the UE_A 10 and the apparatuses such as an application server allocated in the PDN_A 5. In addition, each of the apparatuses (i.e., the UE_A 10, the apparatuses in the access network, and/or apparatuses in the core network_A 90) may manage the PDU session by making one or more pieces of identification information correspond to the PDU session. These pieces of identification information may include at least one of the Access Point Name (APN), the Traffic Flow Template (TFT), the session type, the application identification information, the PDN_A 5 identification information, the Network Slice Instance (NSI) identification information, and the access network identification information, or may further includes other kinds of information. In addition, in a case where multiple PDU sessions are established, the pieces of identification information made to correspond to the PDU sessions may have identical contents to each other or may have different contents from each other.

The IP communication refers to a data communication that uses the IP. More specifically, it is a data communication accomplished by the transmission and/or reception of IP packets to which IP headers are attached. The payload portion included in the IP packet may contain user data that is transmitted and/or received by the UE_A 10. On the other hand, the non-IP communication refers to a data communication that does not use the IP. More specifically, it is a data communication accomplished by the transmission and/or reception of IP packets to which IP headers are not attached. For example, a non-IP communication may be a data communication accomplished by the transmission and/or reception of application data to which no IP packets are attached. In addition, it may be accomplished by the transmission and/or reception of user data that are transmitted or received by the UE_A 10 with different-type headers attached thereto, such as MAC headers and Ethernet (registered trademark) frame headers.

In addition, the PDN_A 5 is a Data Network (DN) configured to provide a communication service to the UE_A 10. The DN may be configured as a packet data service network or may be configured for each service. In addition, the PDN_A 5 may include a communication terminal apparatus connected thereto. Hence, connecting to the PDN_A 5 may mean connecting to a communication terminal apparatus and/or a server apparatus allocated in the PDN_A 5. In addition, transmitting and/or receiving user data to and/or from the PDN_A 5 may mean transmitting and/or receiving user data to and/or from a communication terminal apparatus and/or a server apparatus allocated in the PDN_A 5.

Moreover, the access network refers to a radio network connected to the UE_A 10 and/or the core network_A 90. The access network may be a 3GPP access network or may be a non-3GPP access network. The 3GPP access network may be an Evolved Universal Terrestrial Radio Access Network (E-UTRAN)_A 80, a Universal Terrestrial Radio Access Network (UTRAN)_A 20, a GSM (registered trademark) EDGE Radio Access Network (GERAN)_A 25, or a Next Generation Radio Access Network (NextGen RAN)_A 120. In addition, the non-3GPP access network may be a WLAN ANb 75, a WLAN ANa 70, WLAN ANc 125. Note that for the purpose of connecting to the core network_A 90, the UE_A 10 may connect to the access network, or the UE_A 10 may connect to the core network_A 90 via the access network.

In addition, the core network_A 90 refers to an IP mobile communication network connected to the access network and/or the PDN_A 5 and run by a Mobile Operator. The core network_A 90 may be a core network for the mobile operator that runs and manages the mobile communication system 1, or may be a core network for a virtual mobile operator such as a Mobile Virtual Network Operator (MVNO). Alternatively, the core network_A 90 may be a core network for accommodating a CIoT terminal apparatus. The core network_A 90 may be an Evolved Packet Core (EPC) included in an Evolved Packet System (EPS). It may be a Next Generation Core (NextGen Core) included in a Next Generation System (NextGen System).

Next, an example of a configuration of the core network_A 90 will be described. In the present embodiment, two configuration examples of the core network_A 90 will be described. The core network_A 90 may be a first core network, a second core network, or a combination thereof. The first core network may be an EPC, whereas the second core network may be a NextGen Core. In addition, a first core network and/or a second core network may include a system optimized for the IoT.

The core network_A 90 may include one or more Network Slice Instances (NSIs). The NSI refers to an instance of Network Slice generated by a user of a Network Slice Template (NST). The NST refers to a template to be used for the generation of NSIs and containing a resource request associated with one or more Network Functions (NFs) to provide a requested communication service and/or capability. To put it differently, the NSI may be an aggregate in a core network configured by multiple NFs. In addition, the NSI may be a logical network configured to divide user data delivered by a service and/or the like.

The NF refers to a processing function configured in a network. Specifically, the NF may be a functional apparatus, such as an MME, an SGW, and a PGW. Alternatively, it may be function and/or capability information, such as Mobility Management (MM) and Session Management (SM).

In addition, the NF may be a functional apparatus configured to implement a single function, or a functional apparatus configured to implement multiple functions. For example, a situation is allowable where both an NF configured to implement the MM function and an NF configured to implement the SM function exist separately. Alternatively, a different situation is also allowable where a single NF is configured to implement both the MM function and the SM function.

Figure 2A:
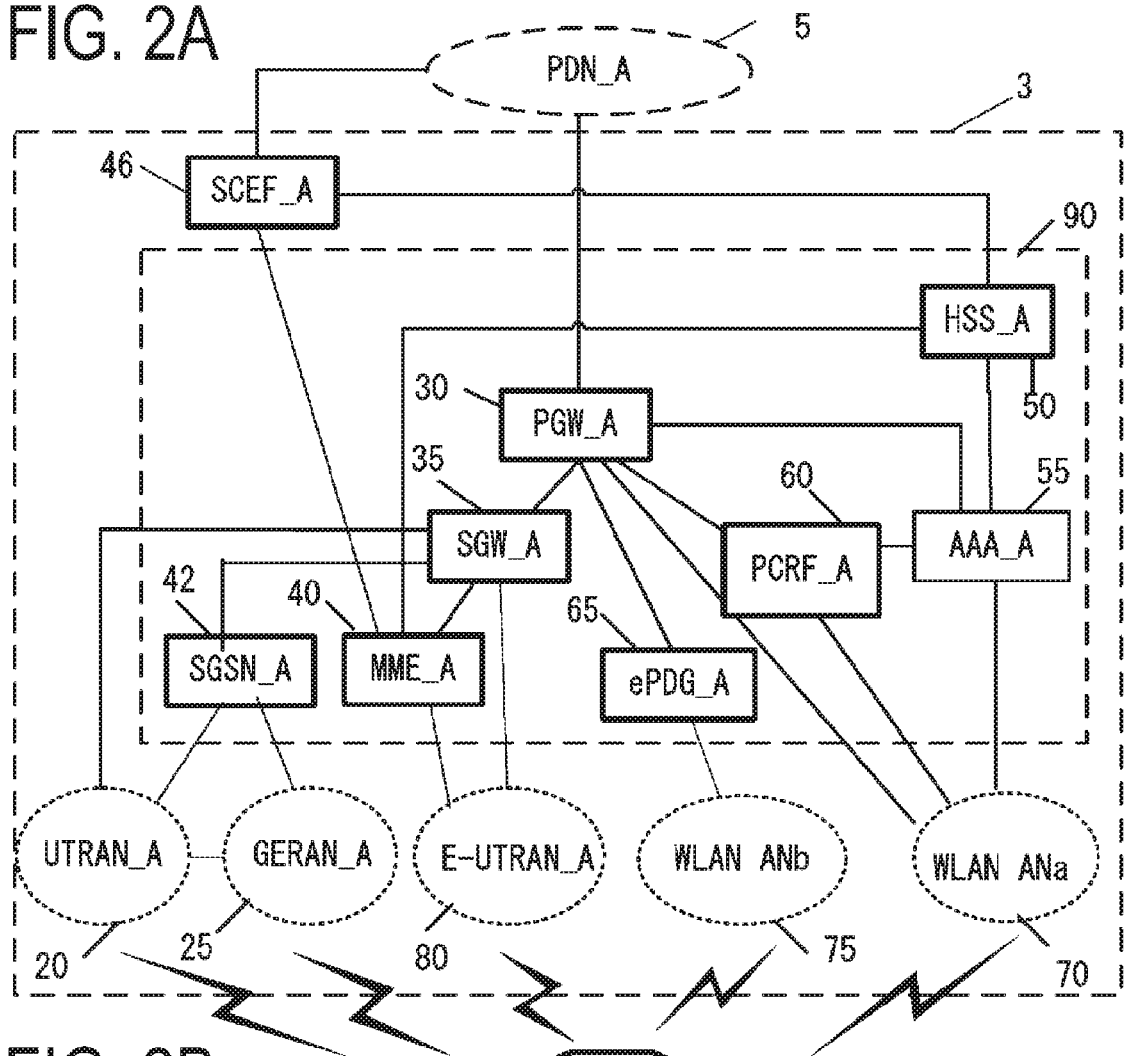
FIGS. 2A and 2B are diagrams illustrating an exemplar configuration and the like of a core network and an access network in the mobile communication system.
Figure 2B:
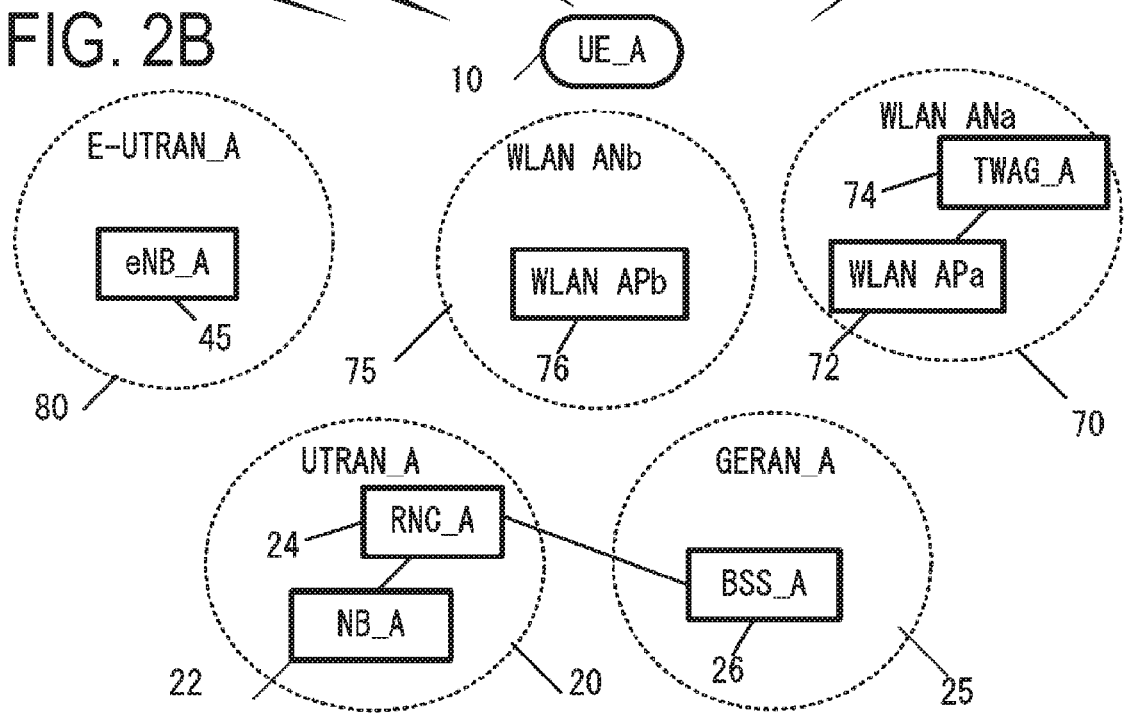

Firstly, FIGS. 2A and 2B illustrate an exemplar configuration of the core network_A 90 of a case where the core network_A 90 is a first core network. The core network_A 90 illustrated in FIG. 2A includes a Home Subscriber Server (HSS)_A 50, an Authentication Authorization Accounting (AAA)_A 55, a Policy and Charging Rules Function (PCRF)_A 60, a PGW_A 30, an enhanced Packet Data Gateway (ePDG)_A 65, an SGW_A 35, a Mobility Management Entity (MME)_A 40, a Serving GPRS Support Node (SGSN)_A 42, and SCFF_A 46. Furthermore, the core network_A 90 is capable of connecting to multiple radio access networks (the E-UTRAN_A 80, the WLAN ANb 75, the WLAN ANa 70, the UTRAN_A 20, and the GERAN_A 25).

Such a radio access network may be configured by connecting to multiple different access networks, or may be configured by connecting to any one of the access networks. Moreover, the UE_A 10 is capable of wirelessly connecting to the radio access network. In addition, the access networks connectable in the WLAN access system may include a WLAN access network b (WLAN ANb 75) configured to connect to the core network via an ePDG_A 65, or may include a WLAN access network a (WLAN ANa 70) configured to connect to the PGW_A 30, the PCRF_A 60, and the AAA_A 55. Note that each device has a similar configuration to those of the devices of the related art in a mobile communication system using the EPS, and thus detailed descriptions thereof will be omitted. Each device will be described briefly below.

The PGW_A 30 is connected to the PDN_A 5, the SGW_A 35, the ePDG_A 65, the WLAN ANa 70, the PCRF_A 60, and the AAA_A 55, and serves as a relay device configured to transfer user data by functioning as a gateway between the PDN_A 5 and/or the DN and the core network_A 90. Note that the PGW_A 30 may be a gateway for the IP communication and/or the non-IP communication. In addition, the PGW_A 30 may have a function to transfer an IP communication. It may also have a function to convert a non-IP communication to an IP communication, or vice versa. A plurality of such gateways may be provided in the core network_A 90. The plurality of gateways may connect the core network_A 90 to a single DN. In addition, the PGW_A 30 may function as a gateway for user data transmitted and/or received by use of a User plane CIoT EPS optimization and/or a Control plane CIoT EPS optimization.

The User plane CIoT EPS optimization refers to a communication method by which user data are transmitted and/or received by each apparatus using the User Plane (U-Plane). In addition, the User plane CIoT EPS optimization may be a communication method by which each apparatus is capable of shifting from an idle mode (ECM-IDLE mode (also referred to as an EMM-IDLE mode)) to an active mode (ECM-CONNECTED mode (also referred to as an EMM-CONNECTED mode)) without using a Service Request Procedure. Alternatively, the User plane CIoT EPS optimization may be a communication method by which each apparatus is capable of maintaining a part of the context when shifting to the idle mode. The U-Plane may be a communication path configured to transmit and/or receive a control message, or may include multiple bearers.

The Control plane CIoT EPS optimization refers to a communication method by which each apparatus transmits and/or receives user data by use of a Control Plane (C-Plane). The C-Plane may be a communication path configured to transmit and/or receive a control message, or may include multiple bearers.

In addition, the PGW_A 30 may be a U-Plane Function, or U-Plane Network Function, (UP function) to transfer user data with a contact point with the PDN_A 5, or may be a User Plane Gateway (UP GW), which is a gateway used in the transferring of user data between the PDN_A 5 and the core network_A 90. In addition, the PGW_A 30 may be an ATSSS function to implement an ATSSS (Access Traffic Steering, Switching and Splitting). To be more specific, the PGW_A 30 may be connected to both the UP function and a Policy function, or may be connected to the UE_A 10 via the U-Plane.

The SGW_A 35 is connected to the PGW_A 30, the MME_A 40, the E-UTRAN_A 80, the SGSN_A 42, and the UTRAN_A 20. The SGW_A 35 is a relay apparatus configured to transfer user data as a gateway between the core network_A 90 and a 3GPP access network (specifically, the UTRAN_A 20, the GERAN_A 25, and the E-UTRAN_A 80). In addition, the SGW_A 35 may function as a gateway for user data transmitted and/or received by use of a User plane CIoT EPS optimization and/or a Control plane CIoT EPS optimization.

In addition, the SGW_A 35 may be a UP function to transfer user data with a contact point with the access network, or may be a User Plane Gateway (UP GW), which is a gateway used in the transferring of user data between the access network and the core network_A 90.

The MME_A 40 is connected to the SGW_A 35, the access network, the HSS_A 50, and the SCEF_A 46, and is a control apparatus configured to perform a location information management including a mobility management for the UE_A 10 and an access control via the access network. In addition, the MME_A 40 may also include a function as a session management apparatus configured to manage sessions to be established by the UE_A 10. In addition, the core network_A 90 may include multiple such control apparatuses, and may include, for example, a location management device that is different from the MME_A 40. The location management device that is different from the MME_A 40 may be connected to the SGW_A 35, the access network, the SCEF_A 46, and the HSS_A 50, as in the case of the MME_A 40.

Furthermore, in a case that multiple MMEs are included in the core network_A 90, the MMEs may be connected to each other. By means of this connection, the context of the UE_A 10 may be transmitted and/or received between the MMEs. As described above, the MME_A 40 is a control apparatus configured to transmit and/or receive to and/or from the UE_A 10 control information associated with the mobility management and the session management. To put it differently, the MME_A 40 has only to be a control apparatus of the Control Plane.

In the description provided above, the MME_A 40 is included in the core network_A 90. The MME_A 40, however, may be a control apparatus included in one or more core networks or NSIs, or alternatively may be a control apparatus connected to one or more core networks or NSIs. The plural NSIs may be run by a single network operator, or may be run individually by different network operators.

In addition, the MME_A 40 may be a relay apparatus configured to transfer user data as a gateway between the core network_A 90 and the access network. The user data to be transmitted and/or received via the MME_A 40 as a gateway may be small data. To put it differently, the MME_A 40 may function as a gateway for the user data transmitted and/or received by use of the Control plane CIoT EPS optimization.

In addition, the MME_A 40 may be an NF configured to play a role of the mobility management for the UE_A 10 or the like, an NF configured to play a role of the session management such as a PDU session, or an NF configured to play a role of the management of one or more NSIs. In addition, the MME_A 40 may be an NF configured to play one or more of the roles mentioned above. Note that the NF may be provided as one or more apparatuses allocated in the core network_A 90. Alternatively, the NF may be a Control Plane Function or a Control Plane Network Function (CP function) for the control information and/or the control message, or may be a shared CP function that is shared by multiple network slices.

The HSS_A 50 is connected to the MME_A 40, the AAA_A 55, and the SCEF_A 46, and is a managing node configured to manage subscriber information. The subscriber information of the HSS_A 50 is referred to during MME_A 40 access control, for example. Moreover, the HSS_A 50 may be connected to the location management device different from the MME_A 40.

The AAA_A 55 is connected to the PGW 30, the HSS_A 50, the PCRF_A 60, and the WLAN ANa 70, and is configured to perform an access control for the UE_A 10 connected via the WLAN ANa 70.

The PCRF_A 60 is connected to the PGW_A 30, the WLAN ANa 75, the AAA_A 55, and the PDN_A 5, and is configured to perform QoS management on data delivery. For example, the PCRF_A 60 manages QoS of a communication path between the UE_A 10 and the PDN_A 5. In addition, the PCRF_A 60 may be an apparatus configured to create and/or manage a Policy and Charging Control (PCC) rule and/or a routing rule to be used when each apparatus transmits and/or receives user data.

In addition, the PCRF_A 60 may be a Policy function configured to create and/or manage a policy. To be more specific, the PCRF_A 60 may be connected to the ATSSS function and the UP function, or may be an apparatus configured to create and/or manage ATSSS Function rules.

The ePDG_A 65 is connected to the PGW_A 30 and the WLAN ANb 75, and is configured to deliver user data as a gateway between the core network_A 90 and the WLAN ANb 75.

The SGSN_A 42 is connected to the UTRAN_A 20, the GERAN_A 25, and the SGW_A 35 and is a control device for the location management between a 3G/2G access network (UTRAN/GERAN) and an LTE access network (E-UTRAN). In addition, the SGSN_A 42 has functions of: selecting the PGW and the SGW: managing a time zone of the UE_A 10; and selecting the MME_A 40 at the time of handover to the E-UTRAN.

The SCEF_A 46 is connected to the PDN_A 5, the MME_A 40, and the HSS_A 50, and is a relay apparatus configured to transfer user data as a gateway connecting the core network_A 90 to at least one of the PDN_A 5 and the DN. To put it differently, the SCEF_A 46 may function as a gateway for the user data transmitted and/or received by use of the Control plane CIoT EPS optimization. The SCEF_A 46 may be a gateway for a non-IP communication. In addition, the SCEF_A 46 may have a function to convert a non-IP communication to an IP communication, or vice versa. In addition, multiple such gateways may be provided in the core network_A 90. In addition, multiple gateways may be provided to connect the core network_A 90 to a single DN.

Additionally, as illustrated in FIG. 2B, each radio access network includes apparatuses to which the UE_A 10 is actually connected (such as a base station apparatus and an access point apparatus), and the like. Apparatuses adapted to the radio access networks may be some of the possible apparatuses that can be used in these connections.

In the present embodiment, the E-UTRAN_A 80 is a Long Term Evolution (LTE) access network, and is configured by including an eNB_A 45. The eNB_A 45 is a radio base station to which the UE_A 10 is connected through the Evolved Universal Terrestrial Radio Access (E-UTRA). The E-UTRAN_A 80 may include one or more eNB_As 45. In addition, the multiple eNBs may be connected to one another.

The UTRAN_A 20 is a 3G access network, and includes both a Radio Network Controller (RNC)_A 24 and a NodeB (NB)_A 22. The NB_A 22 is a radio base station to which the UE_A 10 is connected through a Universal Terrestrial Radio Access (UTRA), and the UTRAN_A 20 may include one or more radio base stations. In addition, the RNC_A 24 is a control unit configured to connect the core network_A 90 and the NB_A 22, and the UTRAN_A 20 may include one or more RNCs. In addition, the RNC_A 24 may be connected to one or more NB_As 22. Moreover, the RNC_A 24 may be connected to a radio base station included in the GERAN_A 25 (i.e., to a Base Station Subsystem (BSS)_A 26).

The GERAN_A 25 is a 2G access network, and includes a BSS_A 26. The BSS_A 26 is a radio base station to which the UE_A 10 is connected through the GSM (trade name)/EDGE Radio Access (GERA), and the GERAN_A 25 may include one or more BSS_A 26. In addition, the BSS_A 26 may be connected to one another. In addition, the BSS_A 26 may be connected to the RNC_A 24.

The WLAN ANa 70 is a wireless LAN access network, and includes a Wireless Local Area Network Access Point (WLAN AP) a 72 and a Trusted WLAN Access Gateway (TWAG)_A 74. The WLAN APa 72 is a radio base station to which the UE_A 10 connects in the WLAN access system trusted by the operator running the core network_A 90, and the WLAN ANa 70 may include one or multiple radio base stations. The TWAG_A 74 serves as a gateway between the core network_A 90 and the WLAN ANa 70. The WLAN APa 72 and the TWAG_A 74 may be configured as a single apparatus. Even in a case where the operator running the core network_A 90 and the operator running the WLAN ANa 70 are different, such a configuration can be implemented through contracts and agreements between the operators.

The WLAN ANb 75 is a wireless LAN access network, and includes a WLAN APb 76. The WLAN APb 76 is a radio base station to which the UE_A 10 is connected in the WLAN access system in a case where no trusting relationship is established with the operator running the core network_A 90, and the WLAN ANb 75 may include one or more radio base stations. In this manner, the WLAN ANb 75 is connected to the core network_A 90 via the ePDG_A 65, which is an apparatus included in the core network_A 90, serving as a gateway. The ePDG_A 65 has a security function for ensuring security.

Figure 3A:
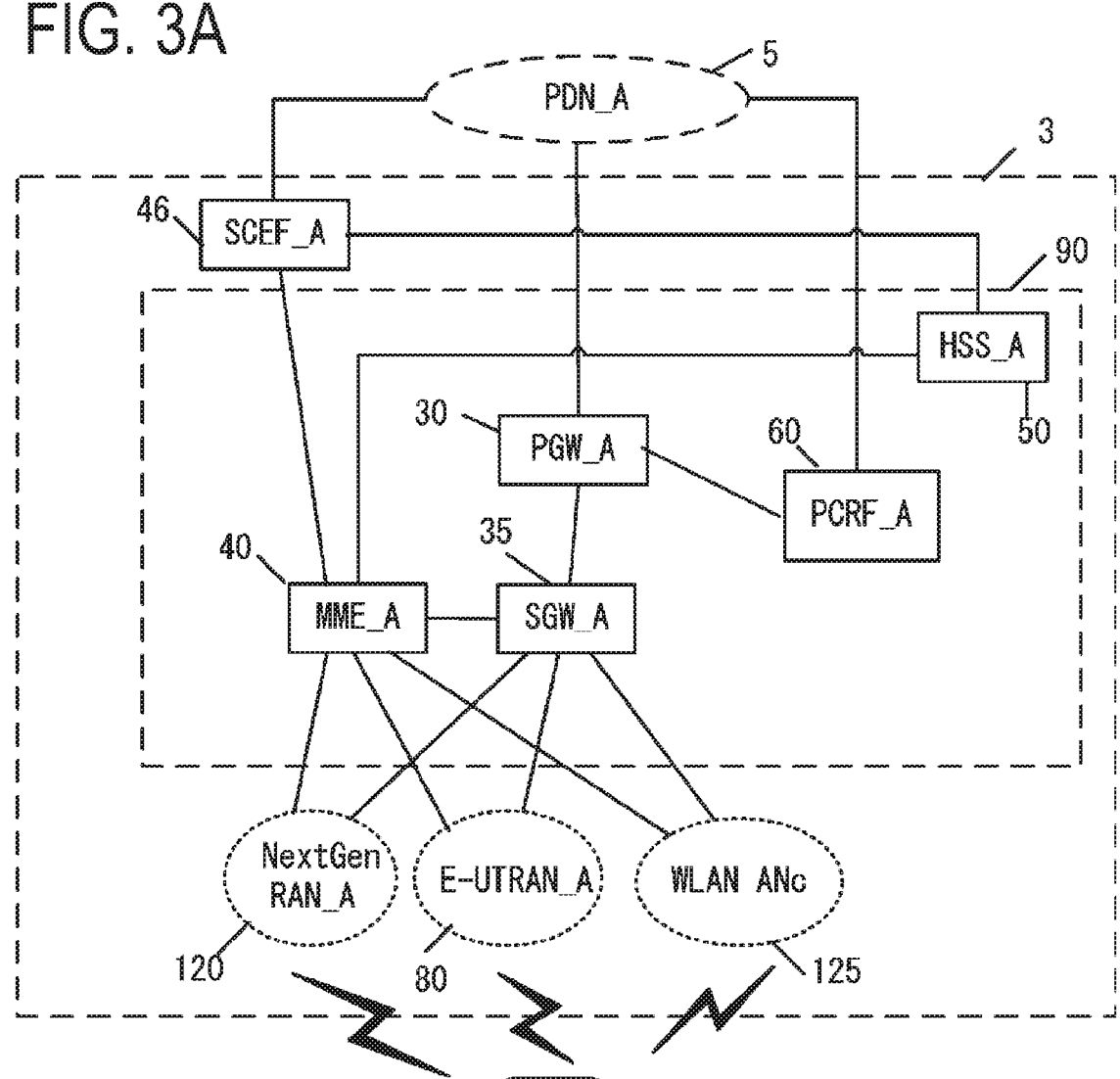
Figure 3B:
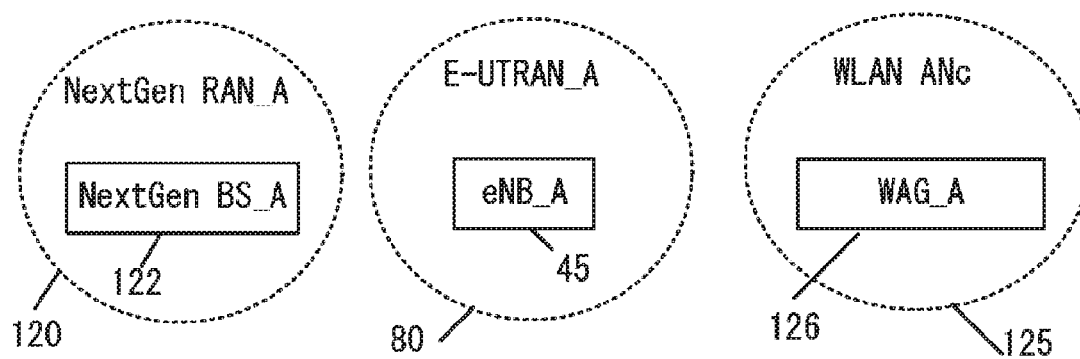

Next, an exemplar configuration of the core network_A 90 of a case where the core network_A 90 is a second core network will be described below. FIGS. 3A and 3B illustrate an exemplar configuration of the core network_A 90. The core network_A 90 illustrated in FIG. 3A includes the HSS_A 50, the PCRF_A 60, the PGW_A 30, the SGW_A 35, the MME_A 40, and the SCEF_A 46.

In addition, the core network_A 90 is capable of connecting to multiple radio access networks (specifically, the E-UTRAN_A 80, the NextGen RAN_A 120, and the WLAN ANc 125). Such a radio access network may be configured by connecting to multiple different access networks, or may be configured by connecting to any one of the access networks. Moreover, the UE_A 10 is capable of wirelessly connecting to a radio access network.

In addition, the access network connectable by means of the 3GPP access system may include the E-UTRAN_A 80 and the NextGen RAN_A 120. Moreover, the access network connectable by means of the WLAN access system may include the WLAN access network c (WLAN ANc 125) that connects to both the MME_A 40 and the SGW_A 35. Note that each apparatus has a similar configuration to its counterpart in the first core network, and thus detailed description thereof will be omitted. Each device will be described briefly hereinafter.

The PGW_A 30 is an apparatus connected to the PDN_A 5, the SGW_A 35, and the PCRF_A 60. In addition, the SGW_A 35 is an apparatus connected to the PGW_A 30, the MME_A 40, the E-UTRAN_A 80, the NextGen RAN_A 120, and the WLAN ANc 126. In addition, the MME_A 40 is an apparatus connected to the SGW_A 35, the E-UTRAN_A 80, the NextGenRAN_A 120, the WLAN ANc 126, the HSS_A 50, and the SCEF_A 46. Note that the PGW_A 30, the SGW_A 35, and the MME_A 40 play the same roles as those played by their respective counterparts in the first core network. In addition, the configuration and the roles of the SCEF_A 46, the HSS_A 50, and the PCRF_A 60 are the same ones as those of their counterparts in the first core network. Therefore, description of the steps will be omitted.

In addition, as illustrated in FIG. 3B, each radio access network includes, among other things, apparatuses to which the UE_A 10 is actually connected (such as a base station apparatus and an access point apparatus). Apparatuses adapted to the radio access networks may be some of the possible apparatuses that can be used in these connections.

In the present embodiment, the NextGen RAN_A 120 is a 5G access network, and includes a NextGen BS (Next Generation Base Station)_A 122. The NextGen BS_A 122 is a radio base station to which the UE_A 10 is connected through the Next Generation Radio Access (NextGen RA). The NextGen RAN_A 120 may include one or more NextGen BS_As 122.

In addition, the NextGen RAN_A 120 may be an access network including the E-UTRA and/or the NextGen RA. To put it differently, the NextGen RAN_A 120 may include either the eNB_A 45 or the NextGen BS_A 122, and alternatively, may include both.

The WLAN ANc 125 is a radio LAN access network, and includes a WAG_A 126. The WLAN Access Gateway (WAG)_A 126 is a radio base station to which the UE_A 10 is connected through a radio LAN access. The WLAN ANc 125 may include one or more WAG_As 126. In addition, the WAG_A 126 may serve as a gateway between the core network_A 90 and the WLAN ANc 125. In addition, the WAG_A 126 may include both a function unit serving as a radio base station and a separate function unit serving as a gateway. The WLAN ANc 125 may have an identical configuration with or a different configuration from the configuration of the WLAN ANa 70 and/or the WLAN ANb 75.

Note that in this specification, the fact that the UE_A 10 is connected to radio access networks means that the UE_A 10 is connected to a base station apparatus, an access point, or the like included in each of the radio access networks. In addition, the above-mentioned fact means that the transmitted and/or received data, signals, and the like pass through the base station apparatus, the access point, or the like.

1.2. Apparatus Configuration

Firstly, the identification information stored by each apparatus will be described below. The International Mobile Subscriber Identity (IMSI) is permanent identification information of each subscriber (user), and is identification information assigned to the user who uses the UE. The IMSI stored by the UE_A 10, the MME_A 40, and the SGW_A 35 may be the same IMSI stored by the HSS_A 50.

EMM State/MM State indicates the Mobility management state of the UE_A 10 or of the MME_A 40. For example, the EMM State/MM State may be an EMM-REGISTERED state (registered state) indicating that the UE_A 10 has already been registered and/or may be an EMM-DEREGISTERD state (not-registered state) indicating that the UE_A 10 has not been registered yet. In addition, the EMM State/MM State may be an ECM-CONNECTED state indicating that the connection between the UE_A 10 and the core network_A 90 is maintained, and/or may be an ECM-IDLE state indicating that the connection between the UE_A 10 and the core network_A 90 is released.

A Globally Unique Temporary Identity (GUTI) is temporary identification information about the UE_A 10. The GUTI includes the identification information of the MME_A 40 (i.e., Globally Unique MME Identifier (GUMMEI)) and the identification information of the UE_A 10 in a particular MME_A 40 (i.e., M-Temporary Mobile Subscriber Identity (M-TMSI)). The ME Identity is the ID of the UE_A 10 or the ME, and may be an International Mobile Equipment Identity (IMEI) or an IMEI Software Version (MEISV). An MSISDN represents a basic phone number of the UE_A 10. The MSISDN stored by the MME_A 40 may be information indicated by the storage unit of the HSS_A 50.

An MME F-TEID is information to identify the MME_A 40. The MME F-TEID may contain either the IP address of the MME_A 40 or the Tunnel Endpoint Identifier (TEID) of the MME_A 40. Alternatively, the MME F-TEID may contain both. In addition, the IP address of the MME_A 40 and the TEID of the MME_A 40 may be stored independently of each other. In addition, the MME F-TEID may be identification information for user data or may be identification information for control information.

An SGW F-TEID is information to identify the SGW_A 35. The SGW F-TEID may contain either the IP address of the SGW_A 35 or the TEID of the SGW_A 35. Alternatively, the SGW F-TEID may contain both. In addition, the IP address of the SGW_A 35 and the TEID of the SGW_A 35 may be stored independently of each other. In addition, the SGW F-TEID may be identification information for user data or may be identification information for control information.

A PGW F-TEID is information to identify the PGW_A 30. The PGW F-TEID may contain either the IP address of the PGW_A 30 or the TEID of the PGW_A 30. Alternatively, the PGW F-TEID may contain both. In addition, the IP address of the PGW_A 30 and the TEID of the PGW_A 30 may be stored independently of each other. In addition, the PGW F-TEID may be identification information for user data or may be identification information for control information.

An eNB F-TEID is identification information to identify the eNB_A 45. The eNB F-TEID may contain either the IP address of the eNB_A 45 or the TEID of the eNB_A 45. Alternatively, the eNB F-TEID may contain both. In addition, the IP address of the eNB_A 45 and the TEID of the SGW_A 35 may be stored independently of each other. In addition, the eNB F-TEID may be identification information for user data or may be identification information for control information.

In addition, an APN is identification information to identify the core network_A 90 and an external network such as an DN. In addition, the APN may be used as information to select a gateway, such as the PGW_A 30, used for connecting the core network A_90.

Note that the APN may be identification information to identify such a gateway or may be identification information to an external network such as a DN. Note that in a case where multiple gateways are provided to connect the core network_A 90 to the DN, at least two of the multiple gateways may be selectable by the APN. In addition, one of the multiple gateways may be selected by a different method using the identification information other than the APN.

The UE Radio Access Capability is identification information indicating a radio access capability of the UE_A 10. The UE Network Capability includes an algorithm of security supported by the UE_A 10 and a key derivation function. MS Network Capability is information including one or more pieces of information needed for the SGSN_A 42 concerning the UE_A 10 having a GERAN_A 25 and/or of the UTRAN_A 20 function. The Access Restriction is registration information for access restriction. An eNB Address is an IP address of the eNB_A 45. An MMEUE S1AP ID is information to identify the UE_A 10 in the MME_A 40. An eNB UE S1AP ID is identification information to identify the UE_A 10 in the eNB_A 45.

An APN in Use is the APN that was recently utilized. The APN in Use may be a Data Network Identifier. This APN may include identification information about the network and identification information about a default operator. In addition, the APN in Use may be information to identify a DN with which a PDU session is established.

An Assigned Session Type is information indicating a type of the PDU session. The Assigned Session Type may be an Assigned PDN Type. The type of the PDU session may be the IP, or may be a non-IP. In a case where the type of the PDU session is the IP, the Assigned Session Type may further contain information indicating the PDN type assigned by the network. Note that the Assigned Session Type may be the IPv4, the IPv6, or the IPv4v6.

Unless otherwise noted, the IP Address refers to the IP address assigned to the UE. The IP address may be an IPv4 address, an IPv6 address, or an IPv6 prefix. In a case where the Assigned Session Type indicates a non-IP, the Assigned Session Type may contain no IP Address element.

An SCEF ID is the IP address of the SCEF_A 46 used in a PDU session. A Default Bearer is information acquired and/or generated when a PDU session is established. The Default Bearer is EPS bearer identification information to identify a default bearer corresponding to the PDU session.

An EPS Bearer ID is the identification information of an EPS bearer. The EPS Bearer ID may be the identification information to identify a Signalling Radio Bearer (SRB) and/or a Control-plane Radio bearer (CRB), or may be the identification information to identify a Data Radio Bearer (DRB). A Transaction Identifier (TI) is the identification information to identify a bidirectional message flow (Transaction). Note that the EPS Bearer ID may be the EPS bearer identification information to identify a dedicated bearer. Hence, the EPS Bearer ID may be the identification information to identify an EPS bearer that is different from the default bearer. A TFT indicates all the packet filters associated with the EPS bearer. The TFT is information to identify part of the transmitted and/or received user data. The UE_A 10 transmits and/or receives, by use of the EPS bearer associated with the TFT, the user data identified by the TFT. To put it differently, the UE_A 10 transmits and/or receives, by use of the Radio Bearer (RB) associated with the TFT, the user data identified by the TFT. The TFT may be information to associate the user data, such as the transmitted and/or received application data, with an appropriate transfer path, or may be the identification information to identify the application data. In addition, the UE_A 10 may transmit and/or receive, by use of the default bearer, the user data that cannot be identified by the TFT. In addition, the UE_A 10 may store beforehand the TFT associated with the default bearer.

A Default Bearer is EPS bearer identification information to identify the default bearer associated with a PDU session. Note that the EPS bearer may be a logical communication path which is to be established between the UE_A 10 and the PGW_A 30. In addition, the EPS bearer may be the default bearer, or may be a dedicated bearer. In addition, the EPS bearer may include an RB which is to be established between the UE_A 10 and at least one of the base station and the access point in the access network. In addition, the RB and the EPS bearer may be associated with each other on a one-to-one basis. Hence, the identification information of the RB may be associated with the identification information of the EPS bearer on a one-to-one basis, or alternatively, may be the same identification information as that of the EPS bearer. Note that the RB may be an SRB and/or a CRB, or alternatively may be a DRB. In addition, the Default Bearer may be information that is to be acquired by the UE_A 10 and/or SGW_A 35 and/or PGW_A 30 from the core network_A 90 when a PDU session is established.

A User Identity is the information to identify a subscriber. The User Identity may be an IMSI, or may be an MSISDN. In addition, the User Identity may be identification information other than the IMSI or the MSISDN. A Serving Node Information is the information to identify the MME_A 40 used in a PDU session, and may be the IP address of the MME_A 40.

An eNB Address is the IP address of an eNB_A 45. An eNB ID is the information to identify a UE in the eNB_A 45. The MME Address is an IP address of the MME_A 40. An MMEID is the information to identify a UE in the MME_A 40. A NextGen BS Address is the IP address of a NextGen BS_A 122. A NextGen BS ID is the information to identify a UE in the NextGen BS_A 122. A WAG Address is the IP address of a WAG_A 126. A WAG ID is the information to identify a UE in the WAG_A 126.

A Mobility Type is the information to indicate the granularity of Mobility. In addition, the Mobility Type may be the information to indicate the type of Service Continuity, may be the information to indicate the type of Mobility to be supported, or may be the information about the handover. For example, the Mobility Type may be a Mobility Type corresponding to UE-initiated handover, or may be a Mobility Type corresponding to a state where no execution of UE-initiated handover is allowed. Alternatively, the Mobility Type may be a Mobility Type corresponding to a state where no execution of network-led handover is allowed. Note that the Mobility Type may be a Mobility Class, or may be a Mobility level.

Handover Information is the information about the handover of the UE_A 10 and/or the network (the access network and/or the core network_A 90). The Handover Information may be the information to indicate the type of handover to be supported, or may be the permission information about the handover in each state.

Note that the type of handover to be supported may be the handover in the 3GPP access network or in the non-3GPP access network. Alternatively, the type of handover to be supported may be the handover between the 3GPP access network and the non-3GPP access network. In addition, the permission information about the handover in each state may be the information to indicate that the handover in the active mode and/or in the idle mode is permitted, or may be the information to indicate that no handover in the active mode and/or in the idle mode is permitted.

In addition, the Handover Information may be information containing at least one of UE UE-initiated Handover Capability, NW UE-initiated Handover Capability, UE-initiated Handover allowed, and NW-initiated Handover allowed.

Note that the UE UE-initiated Handover Capability is the capability information to indicate whether or not the UE_A 10 supports the UE-initiated handover. In addition, the NW UE-initiated Handover Capability is the capability information to indicate whether or not the network and/or an apparatus in the network supports the UE-initiated handover.

In addition, the UE-initiated Handover allowed is the information to indicate whether or not the UE-initiated handover is permitted. The UE-initiated Handover allowed may be the information to indicate whether or not the UE-initiated handover is permitted in at least one of the cell being connected, the tracking area, and the access network. Alternatively, the UE-initiated Handover allowed may be the information to indicate whether or not a temporary permission for such handover is given.

In addition, the NW-initiated Handover allowed is the information to indicate whether or not the network-led handover is permitted. The NW-initiated Handover allowed may be the information to indicate whether or not the network-led handover is permitted in at least one of the cell being connected, the tracking area, and the access network. Alternatively, the NW-initiated Handover allowed may be the information to indicate whether or not a temporary permission for such handover is given.

The configuration of each apparatus will be described below.

1.2.1 Configuration of UE

Figure 4A:
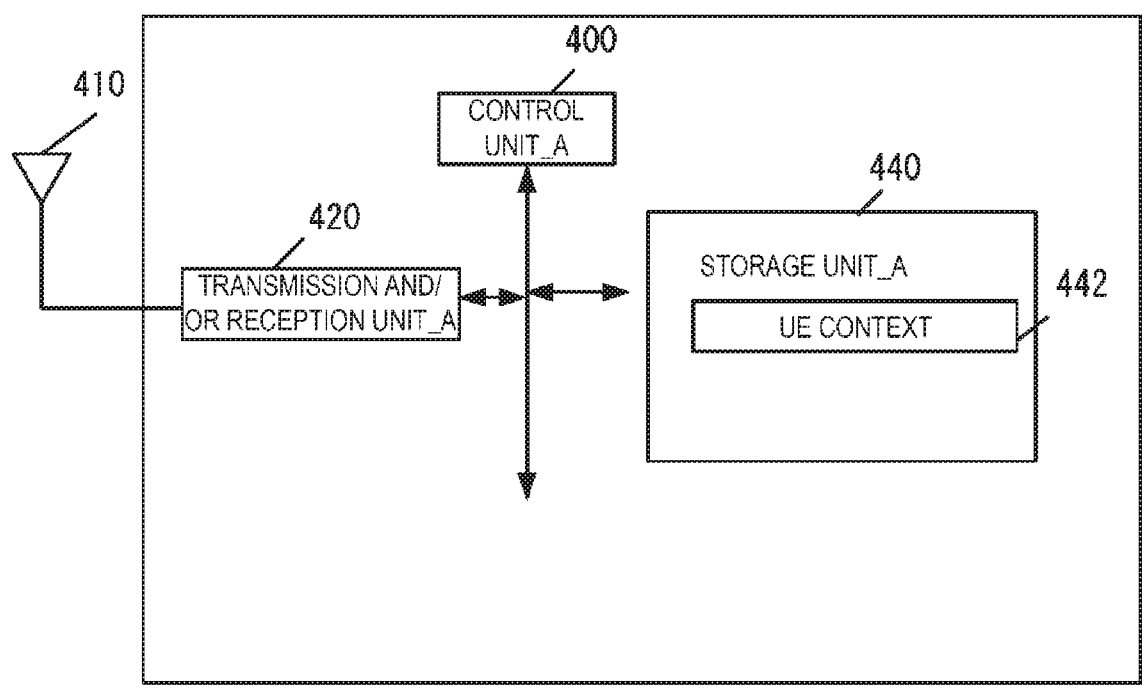
FIG. 4A is a diagram illustrating an apparatus configuration of a UE.

FIG. 4 illustrates an apparatus configuration of the UE_A 10. As illustrated in FIG. 4, the UE_A 10 comprises a transmission and/or reception unit_A 420, a controller_A 400, and a storage unit_A 440. The transmission and/or reception unit_A 420 and the storage unit_A 440 are connected to the controller_A 400 via a bus.

The control unit_A 400 is a function unit to control the UE_A 10. The control unit_A 400 implements various processes by reading out various programs stored in the storage unit_A 440 and performing the programs.

The transmission and/or reception unit_A 420 is a function unit configured to allow the UE_A 10 to be connected to a base station and/or an access point in the access network and thus to be connected to the access network. Furthermore, an external antenna_A 410 is connected to the transmission and/or reception unit_A 420. To put it differently, the transmission and/or reception unit_A 420 is a function unit configured to allow the UE_A 10 to be connected to the base station and/or the access point in the access network. In addition, the transmission and/or reception unit_A 420 is a transmission and/or reception function unit configured to allow the UE_A 10 to transmit and/or receive user data and/or control information to and/or from a base station and/or an access point in the access network.

The storage unit_A 440 is a function unit configured to store programs, data, and the like necessary for each operation of the UE_A 10. The storage unit_A 440 includes, for example, a semiconductor memory, a Hard Disk Drive (HDD), or the like. The storage unit_A 440 may store at least one of the identification information, the control information, the flag, and/or the parameter included in a control message transmitted to and/or received from in the communication procedure, which will be described later. As illustrated in FIG. 4, the storage unit_A 440 stores a UE context 542. Information elements stored in the storage unit_A440 will be described below.

FIG. 5B illustrates information elements included in the UE context stored for each UE. As illustrated in FIG. 5B, the UE context stored for each UE includes an IMSI, an EMM State, a GUTI, and an ME Identity.

In addition, UE context stored for each UE may contain the Mobility Type and/or the Handover Information.

Next, FIG. 5C illustrates the UE context corresponding to each PDU session and stored for each PDU session. As illustrated in FIG. 5C, the UE context corresponding to each PDU session contains the APN in Use, the Assigned Session Type, the IP Address(es), and the Default Bearer.

In addition, the UE context stored for each PDU session may contain the Mobility Type and/or the Handover Information.

FIG. 5D illustrates the UE context for each bearer stored in the storage unit of the UE. As illustrated in FIG. 5D, the UE context for each bearer includes the EPS Bearer ID, the TI, and the TFT.

1.2.2. eNB/NextGen BS/WAG Configuration

Figure 6A:
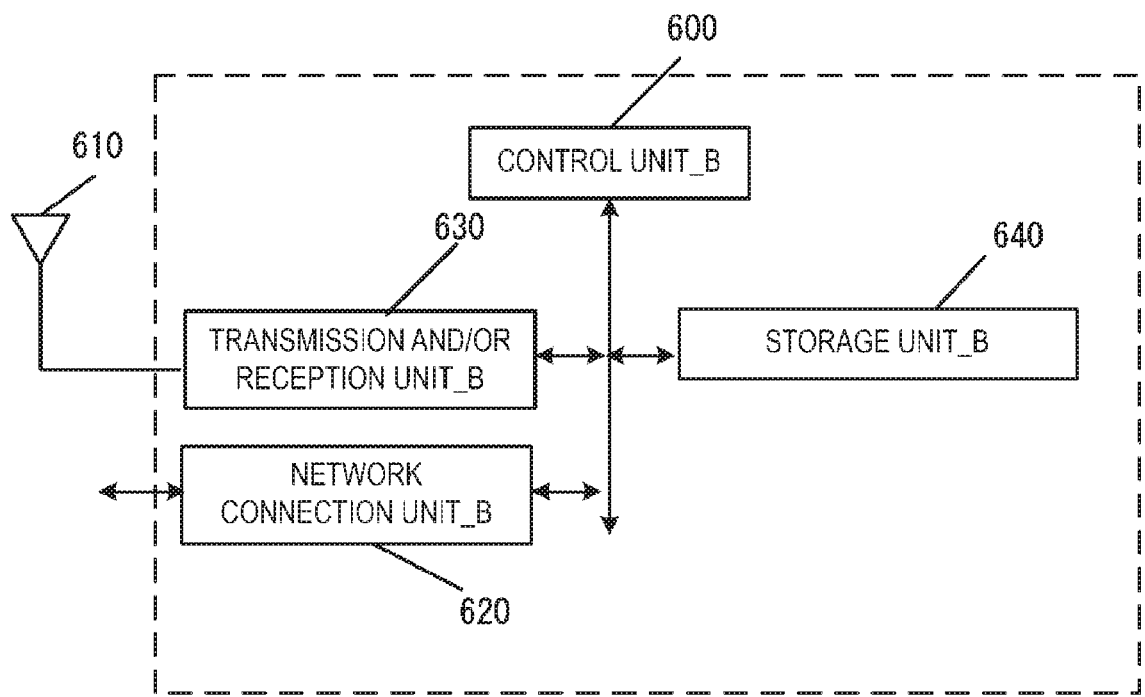
FIG. 6A is a diagram illustrating an apparatus configuration of an eNB/NextGen BS/WAG.

A configuration of the eNB_A 45, the NextGen BS_A 122, and the WAG_A 126 will be described below. FIG. 6A illustrates apparatus configurations of the eNB_A 45, the NextGen BS_A 122, and the WAG_A 126. As illustrated in FIG. 6A, the eNB_A 45, the NextGen BS_A 122, and the WAG_A 126 comprise a network connection unit_B 620, a transmission and/or reception unit_B 630, a controller_B 600, and a storage unit_B 640. The network connection unit_B 620, the transmission and/or reception unit_B 630, and the storage unit_B 640 are connected to the controller_B 600 via a bus.

The control unit_B 600 is a function unit configured to control the eNB_A 45. The control unit_B 600 implements various processes by reading out and performing various programs stored in the storage unit_B 640.

The network connection unit_B 620 is a function unit configured to allow the eNB_A 45, the NextGen BS_A 122, and the WAG_A 126 to be connected to the MME_A 40 and/or the SGW_A 35. In addition, the network connection unit_B 620 is a transmission and/or reception unit allowing the eNB_A 45, the NextGen BS_A 122, and the WAG_A 126 to transmit and/or receive user data and/or control information to and/or from the MME_A 40 and/or the SGW_A 35.

The transmission and/or reception unit_B 630 is a function unit configured to allow the eNB_A 45, the NextGen BS_A 122, and the WAG_A 126 to be connected to the UE_A 10. In addition, the transmission and/or reception unit_B 630 is a transmission and/or reception function unit configured to transmit and/or receive user data and/or control information to and/or from the UE_A 10. Furthermore, an external antenna_B 610 is connected to the transmission and/or reception unit_B 630.

The storage unit_B 640 is a functional unit configured to store the programs and the data needed for the operations of the eNB_A 45, the NextGen BS_A 122, and the WAG_A 126. The storage unit_B 640 includes, for example, a semiconductor memory, an HDD, or the like. The storage unit_B 640 may store at least one of the identification information, the control information, the flag, and the parameter included in the control message transmitted and/or received in the communication procedure, which will be described later. The storage unit_B 640 may store, for each UE_A 10, these pieces of information as a context.

In addition, the storage unit_B 640 may contain the Mobility Type, and/or the Handover Information.

1.2.3 Configuration of MME

Figure 7A:
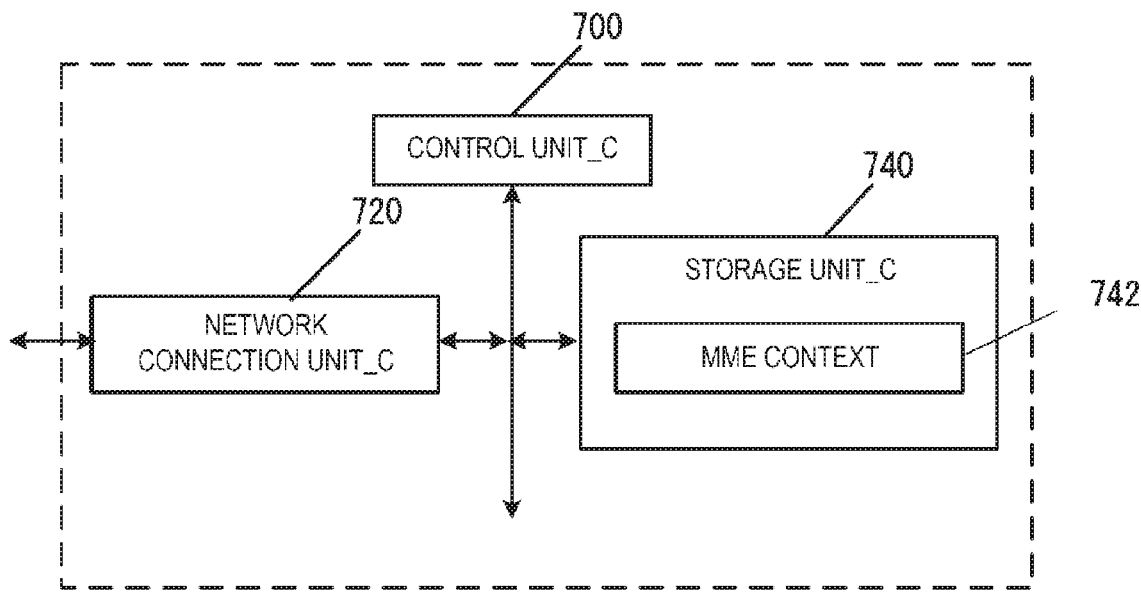
FIG. 7A is a diagram illustrating an apparatus configuration of an MME.

A configuration of the MME_A 40 will be described below. FIG. 7A illustrates an apparatus configuration of the MME_A 40. As illustrated in FIG. 7A, the MME_A 40 comprises a network connection unit_C 720, a control unit_C 700, and a storage unit_C 740. The network connection unit_C 720 and the storage unit_C 740 are connected to the control unit_C 700 via a bus.

The control unit_C 700 is a function unit configured to control the MME_A 40. The control unit_C 700 implements various processes by reading out and performing various programs stored in the storage unit_C 740.

The network connection unit_C720 is a function unit configured to allow the MME_A 40 to connect at least one of a base station in the access network, an access point in the access network, the SCEF_A 46, the HSS_A 50, and the SGW_A 35. In addition, the network connection unit_C720 is a transmission and/or reception unit configured to allow the MME_A 40 to transmit and/or receive user data and/or control information to and/or from at least one of a base station in the access network, an access point in the access network, the SCEF_A 46, the HSS_A 50, and the SGW_A 35.

The storage unit_C 740 is a function unit configured to store programs, data, and the like necessary for each operation of the MME_A 40. The storage unit_C 740 includes, for example, a semiconductor memory, an HDD, or the like. The storage unit_C 740 may store at least one of the identification information, the control information, the flag, and the parameter included in the control message transmitted and/or received in the communication procedure, which will be described later.

As illustrated in the FIG. 7A, the storage unit_C 740 stores an MME context 742. Information elements stored in the storage unit-C 740 will be described below. FIG. 8B illustrates information elements included in the UE context stored for each UE. As illustrated in FIG. 8B, the MME context stored for each UE contains one or more of the IMSI, the MSISDN, the MM State, the GUTI, the ME Identity, the UE Radio Access Capability, the UE Network Capability, the MS Network Capability, the Access Restriction, the MME F-TEID, the SGW F-TEID, the eNB Address, the MME UE S1AP ID, the eNB UE S1AP ID, the NextGen BS Address, the NextGen BSID, the WAG Address, and the WAG ID.

In addition, the MME context stored for each UE may contain the Mobility Type and/or the Handover Information.

Next, FIG. 9C illustrate the MME context corresponding to each PDU session and stored for each PDU session. As illustrated in FIG. 9C, the MME context for each PDU session contains the APN in Use, the Assigned Session Type, the IP Address(es), the PGW F-TEID, the SCEF ID, and the Default bearer.

In addition, the MME context for each PDU session may contain the Mobility Type and/or the Handover Information.

FIG. 9D illustrates the MME context corresponding to each bearer and stored for each bearer. As illustrated in FIG. 9D, the MME context stored for each bearer contains one or more of the EPS Bearer ID, the TI, the TFT, the SGW F-TEID, the PGW F-TEID, the MME F-TEID, the eNB Address, the NextGen BS Address, the WAG Address, the eNB ID, the NextGenBS ID, and the WAG ID. Here, the information elements contained in the MME context illustrated in FIG. 8B to FIG. 9D may be contained and stored in either the MM context or the EPS bearer context.

1.2.4. SGW Configuration

Figure 10A:
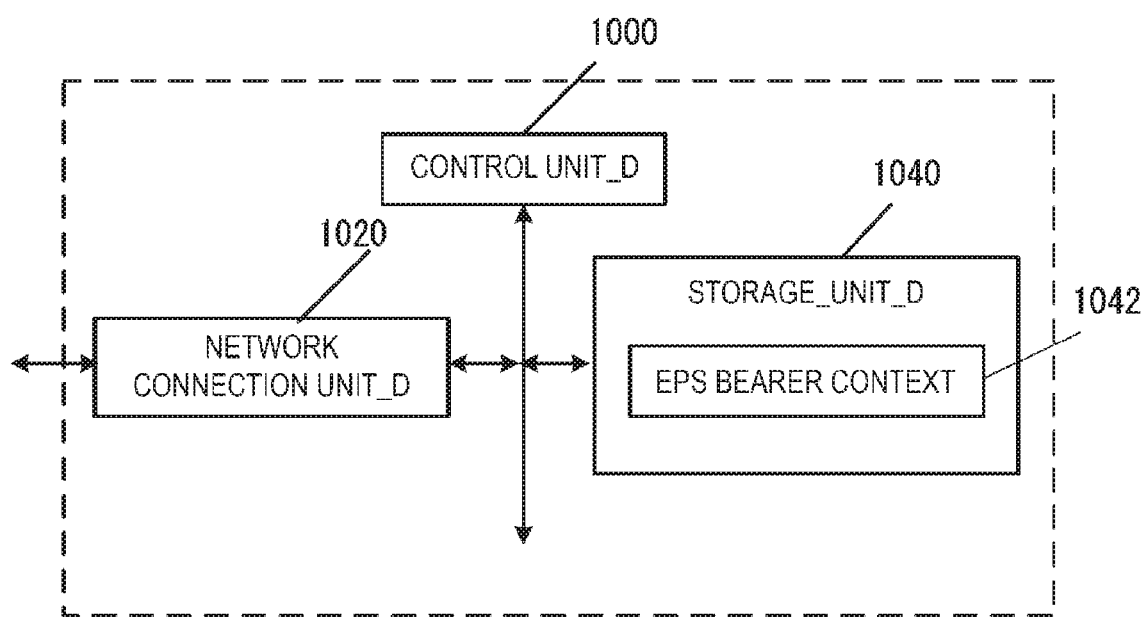
FIG. 10A is a diagram illustrating an apparatus configuration of a SGW/PGW/SCEF.

FIG. 10 illustrates the apparatus configuration of the SGW_A 35. As illustrated in FIG. 10A, the SGW_A 35 comprises a network connection unit_D 1020, a control unit_D 1000, and a storage unit_D 1040. The network connection unit_D 1020 and the storage unit_D 1040 are connected to the control unit_D 1000 via a bus.

The control unit_D 1000 is a function unit configured to control the SGW_A 35. The control unit_D 1000 implements various processes by reading out and performing various programs stored in the storage unit_D 1040.

The network connection unit_D 1020 is a function unit configured to allow the SGW_A 35 to connect to one or more of a base station in the access network, an access point in the access network, the MME_A 40, the PGW_A 30, and the SGSN_A 42. Furthermore, the network connection unit_D 1020 is a transmission and/or reception function unit configured to allow the SGW_A 35 to transmit and/or receive the user data and/or control information to and/or from one or more of the MME_A 40, the PGW_A 30, and the SGSN_A 42.

The storage unit_D 1040 is a function unit configured to store programs, data, and the like necessary for each operation of the SGW_A 35. The storage unit_D 1040 includes, for example, a semiconductor memory, an HDD, or the like. The storage unit_D 1040 may store at least one of the identification information, the control information, the flag, and the parameter included in the control message transmitted and/or received in the communication procedure, which will be described later.

As illustrated in FIG. 10A, the storage unit_D 1040 stores an EPS bearer context 1042. Note that the EPS bearer context 1042 includes an EPS bearer context stored for each UE, an EPS bearer context stored for each PDU session, and an EPS bearer context stored for each bearer.

Firstly, FIG. 11B illustrates information elements of the EPS bearer context stored for each UE. As illustrated in FIG. 11B, the EPS bearer context stored for each UE contains an IMSI, an ME Identity, an MSISDN, an MME F-TEID, and an SGW F-TEID.

Furthermore, the EPS bearer context includes an EPS bearer context corresponding to each PDU session and stored for each PDU session. FIG. 11C illustrates the EPS bearer context for each PDU session. As illustrated in FIG. 11C, the EPS bearer context for each PDU session contains an APN in Use, an Assigned Session Type, an SGW F-TEID, a PGW F-TEID, a Default Bearer, and an IP Address(es).

In addition, the EPS bearer context includes the EPS bearer context for each bearer. FIG. 11D illustrates the EPS bearer context for each bearer. As illustrated in FIG. 11D the EPS bearer context for each bearer contains one or more of the EPS Bearer ID, the TFT, the PGW F-TEID, the SGWF-TEID, the eNB F-TEID, the MME Address, the NextGen BS Address, the WAG Address, the MME ID, the NextGen BS ID, and the WAG ID.

1.2.5. PGW Configuration

FIG. 10A illustrates an apparatus configuration of the PGW_A 30. As illustrated in FIG. 10A, the PGW_A 30 comprises a network connection unit_D 1020, a control unit_D 1000, and a storage unit_D 1040. The network connection unit_D 1020 and the storage unit_D 1040 are connected to the control unit_D 1000 via a bus.

The control unit_D 1000 is a function unit configured to control the PGW_A 30. The control unit_D 1000 implements various processes by reading out and performing various programs stored in the storage unit_D 1040.

The network connection unit_D 1020 is a function unit configured to allow the PGW_A 30 to be connected to at least one of the SGW_A 35, the PCRF_A 60, the ePDG_A 65, the AAA_A 55, the TWAG_A 74, and the PDN_A 5. The network connection unit_D 1020 is a transmission and/or reception unit configured to allow the PGW_A 30 to transmit and/or receive the user data and/or control information to or from at least one of the SGW_A 35, the PCRF_A 60, the ePDG_A 65, the AAA_A 55, the TWAG_A 74, and the PDN_A 5.

The storage unit_D 1040 is a function unit configured to store programs, data, and the like necessary for each operation of the PGW_A 30. The storage unit_D 1040 includes, for example, a semiconductor memory, an HDD, or the like. The storage unit_D 1040 may store at least one of the identification information, the control information, the flag, and the parameter included in the control message transmitted and/or received in the communication procedure, which will be described later.

As illustrated in FIG. 10A, the storage unit_D 1040 stores an EPS bearer context 1042. Note that the EPS bearer context 1042 may be stored in such a manner that an EPS bearer context stored for each UE, an EPS bearer context stored for each APN, an EPS bearer context stored for each PDU session, and an EPS bearer context stored for each bearer are separately stored.

FIG. 12B illustrates information elements included in the EPS bearer context stored for each UE. As illustrated in FIG. 12B, the EPS bearer context stored for each UE contains an IMSI, an ME Identity, an MSISDN, and a RAT type.

Next, FIG. 12C illustrates the EPS bearer context stored for each APN. As illustrated in FIG. 12C, the EPS bearer context stored for each APN of the PGW storage unit contains an APN in use. Note that the EPS bearer context stored for each APN may be stored for each Data Network Identifier.

In addition, FIG. 12D illustrates the EPS bearer context stored for each PDU session. As illustrated in FIG. 12D, the EPS bearer context for each PDU session contains an Assigned Session Type, an IP Address(es), an SGW F-TEID, a PGW F-TEID, and a Default Bearer.

In addition, FIG. 12E illustrates the EPS bearer context stored for each EPS bearer. As illustrated in FIG. 12E, the EPS bearer context contains an EPS Bearer ID, a TFT, an SGWF-TEID, and a PGW F-TEID.

1.2.6. SCEF Configuration

FIG. 10A illustrates the apparatus configuration of the SCEF_A 46. As illustrated in FIG. 10A, the SCEF_A 46 comprises a network connection unit_D 1020, a control unit_D 1000, and a storage unit_D 1040. The network connection unit_D 1020 and the storage unit_D 1040 are connected to the control unit_D 1000 via a bus.

The control unit_D 1000 is a function unit configured to control the SCEF_A 46. The control unit_D 1000 implements various processes by reading out and performing various programs stored in the storage unit_D 1040. The network connection unit_D 1020 is a function unit configured to allow the SCEF_A 46 to be connected to the core network_A 90. To put it differently, the network connection unit_D 1020 is a function unit configured to allow the SCEF_A 46 to be connected to the MME_A 40. In addition, the network connection unit_D 1020 is a transmission and/or reception unit configured to allow the SCEF_A 46 to transmit and/or receive the user data and/or control information to or from the MME_A 40.

The storage unit_D 1040 is a function unit configured to store programs, data, and the like necessary for each operation of the SCEF_A 46. The storage unit_D 1040 includes, for example, a semiconductor memory, an HDD, or the like. The storage unit_D 1040 may store at least one of the identification information, the control information, the flag, and the parameter included in the control message transmitted and/or received in the communication procedure, which will be described later.

As illustrated in FIG. 10A, the storage unit_D 1040 stores an EPS bearer context 1042. Information elements stored in the storage unit_D 1040 will be described below. FIG. 13B illustrates information elements included in the EPS bearer context. As illustrated in FIG. 13B, the EPS bearer context contains a User Identity, an APN in Use, an EPS Bearer ID, and Serving Node Information.

1.3. Description of Communication Procedure

Figure 15:
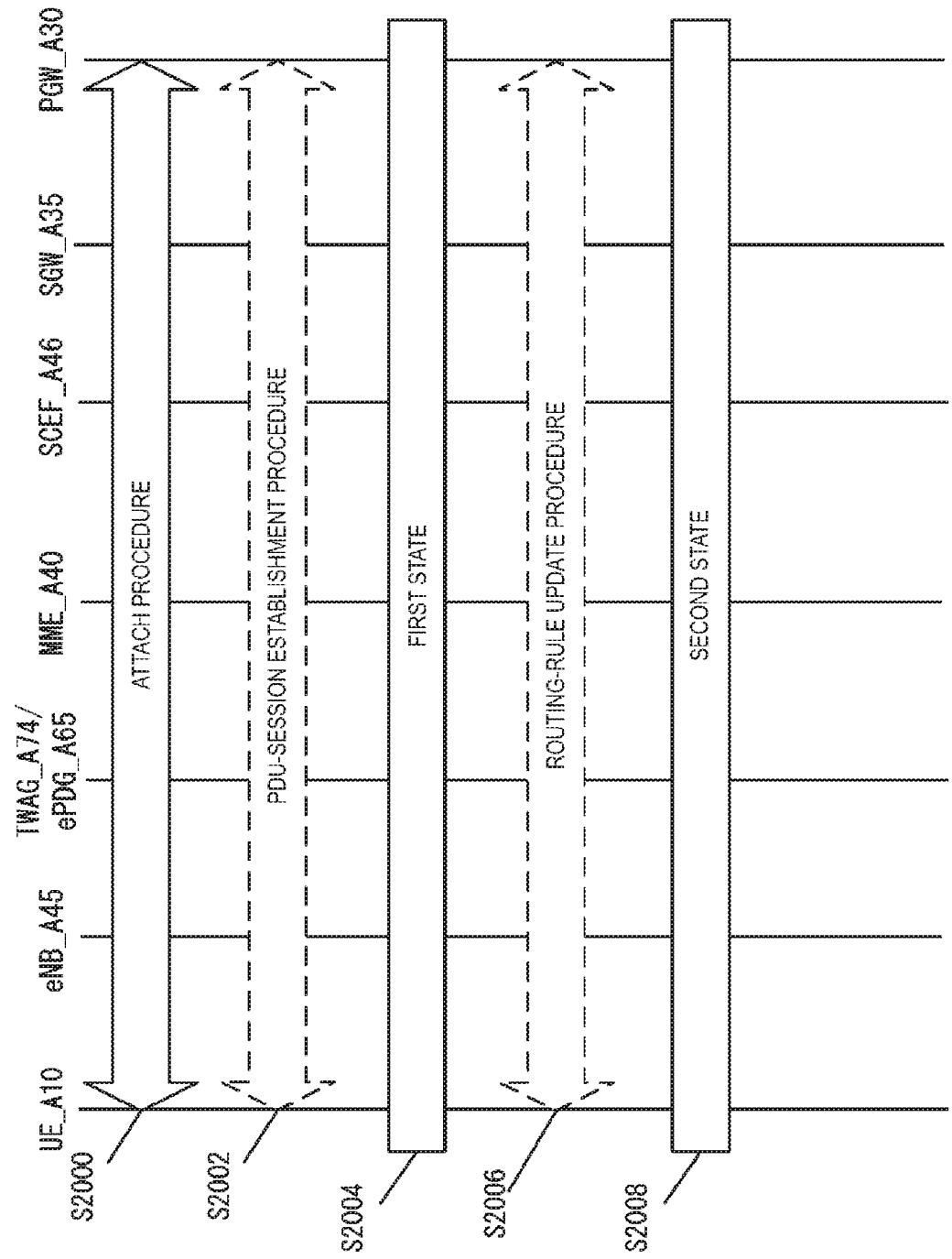
FIG. 15 is a diagram illustrating an overview of a communication procedure.

Next, a communication procedure according to the present embodiment will be described using FIG. 15. Here, before describing the detailed steps of each procedure, in order to avoid redundant descriptions, terminology specific to the present embodiment and important identification information used in each procedure will be described beforehand.

The flow in the present embodiment refers to a group of data units identified by the 5-tuple, application ID, etc. Note that the five-tuple may include a source IP address, a destination IP address, a source port number, a destination port number, and a protocol number.

In the present embodiment, the first access may be a 3GPP access. In addition, in the description of the present embodiment, the 3GPP access may refer to a 3GPP access network or may refer to a 3GPP access system. Note that the 3GPP access system may be a radio access system configured to form various kinds of 3GPP access networks.

In addition, in the present embodiment, the second access may be a non-3GPP access. In addition, in the description of the present embodiment, the non-3GPP access may refer to a non-3GPP access network or may refer to a non-3GPP access system. Note that the non-3GPP access system may be a radio access system configured to form various kinds of non-3GPP access networks.

In addition, the Access Traffic Steering refers to a procedure where: an access network that is the most suitable for the transmission and/or reception of a data flow is selected; and a data-flow traffic is transmitted and/or received through the selected access network. Note that the most suitable access network may be selected based on the network load, the radio signal quality, the application associated with the data flow, etc. In addition, the Access Traffic Steering may be adaptable between the 3GPP access and the non-3GPP access.

In addition, the Access Traffic Switching is a procedure to switch the traffic of the whole data flow that is progressing to a different access network while the continuity of the data flow is not interrupted. Note that the Access Traffic Switching may be adaptable between the first access and the second access.

Hence, the Access Traffic Switching may be a function or a communication procedure to transmit and/or receive user data by selecting, for each of one or more data flows transmitted and/or received by use of an IP address associated with a session, either a communication path through the first access or another communication path through the second access. To put it differently, in a case where: communications of multiple flows are performed by use of a single IP address; and the communications of multiple flows are used for transmitting and receiving user data, either a communication path through the first access or another communication path through the second access can be selected for each flow. Hence, at a certain point of time, multiple flows can be transmitted and/or received by use of both a communication path through the first access and another communication path through the second access. Note that the Access Traffic Switching may be implemented by an IP Flow Mobility based on network mobility protocols (NBIFOM).

In addition, the Access Traffic Splitting is a function to separate, into multiple paths or PDU sessions, a communication traffic associated with a single application or a single service. In addition, the Access Traffic Splitting may be a procedure to implement such a function. For example, the above-mentioned plurality of paths may be a path through a first access and a path through a second access. In addition, the above-mentioned plurality of PDU sessions may be a PDU session through a first access and another PDU session through a second access. In this way, by means of the Access Traffic Splitting, a traffic may be transmitted and/or received in a distributed manner through a first access and through a second access.

Note that the path or the PDU session through the first access may be associated with a first IP address. Note that the path or the PDU session through the second access may be associated with a second IP address. The UE_A 10 may have a first IP address and a second IP address, and may communicate by use of these addresses.

Note that when the UE_A 10 performs the communication using each of the IP addresses, the communication is performed using the path or the PDU session associated with the IP address to be used. Hence, by selecting an IP address, the UE_A 10 can select either a path/PDU session through a first access or a path/PDU session through a second access to transmit each data unit to the UP GW. On the other hand, the UP GW, which serves as the peer on the other side, may select, as the destination address, either a first IP address or a second IP address assigned to the destination UE_A 10, and thus may select either a path/PDU session through a first access or a path/PDU session through a second access to transmit each data unit to the UE_A 10.

Note that each data unit of the traffic to be transmitted and/or received in a communication associated with a single application or a service is delivered via either a communication path through a first access or a communication path through a second access. To put it differently, no single data unit is duplicated to be delivered through multiple paths or PDU sessions.

In addition, a communication traffic associated with a single application or a single service may be managed as a single data flow. In addition, a group of data units separated into paths or PDU sessions may be managed anew as different data flows. Specifically, a single data flow may be managed by being separated into a first data flow and a second data flow. In addition, a first data flow may be managed by being associated with a path or a PDU session through a first access and a second data flow may be managed by being associated with a path or a PDU session through a second access.

Alternatively, a communication traffic associated with a single application or a single service may be managed as a single data flow. In this case, the group of data units formed by separating a single data flow into paths or PDU sessions may continue to be managed as a single data flow. In this case, each data unit in the single data flow may be transmitted and/or received by use of either a path/PDU session through a first access or a path/PDU session through a second access. Note that the path/PDU session for the transmission and/or the reception of each data unit may be selected based on a routing rule.

Note that the Access Traffic Splitting may be implemented by use of the Multipath TCP (Transmission Control Protocol) (MPTCP). In this case, the single data flow may be a group of transmitted and/or received data units that are set to be communicated by use of a TCP connection to be established by use of the MPTCP. In this way, the data flow may be a group of data units associated with a TCP communication.

In addition, the MPTCP refers to a technology to implement communications between peers by simultaneous use of multiple paths. In addition, the MPTCP may be implemented by an extension of an existing Transmission Control Protocol (TCP) or may be implemented by providing an application with a service and/or a function that is similar to the TCP. In addition, the MPTCP may provide a function to establish multiple communication paths that are independent of one another, and a function to implement a communication by use of the multiple such independent communication paths. Note that the above-mentioned peer refers to an endpoint node for a user-data transmission and/or reception. In addition, the peer may be an endpoint node of a connection based on an MPTCP. Specifically, the term "between peers" may refer to "between the UE_A 10 and a UP GW". Note that the UP GW may be an apparatus in the core network_A 90, and may or may not support the SGi interface. In addition, the path may be a communication path configured to be used for user-data transmission and/or reception, or may be a PDU session. In addition, the MPTCP may be a technique to bundle multiple TCP connections together to form a seemingly single TCP connection. To put it differently, the MPTCP may bundle multiple TCP connections by managing the association of the source IP addresses and the destination IP addresses to their respective port numbers. Note that the port numbers may be the TCP port numbers.

Hence, each apparatus can use the MPTCP to implement, by use of multiple TCP connections, the communications associated with the same port number. Note that at a certain point of time, each data unit transmitted and/or received may be associated with any of the paths or the PDU sessions included in a multi-access session or may be communicated by use of the associated path or PDU session. To put it differently, no single data unit is duplicated to be delivered through multiple paths. Note that each apparatus may implement the Access Traffic Splitting by use of the MPTCP.

In addition, a routing filter is information to identify one or more IP flows for the purpose of the routing. Specifically, a routing filter may be a group of parameters or ranges for IP header to be used in the communication of each flow.

To put it differently, a routing filter is information that makes each flow identifiable, and may include a group of IP-header parameters transmitted and/or received in each flow. Note that the group of IP-header parameters may be information where one or more the following items of the five-tuple are combined: the source IP address, the destination IP address, the source port number, the destination port number, the protocol number, etc.

In addition, routing access type may be information indicating the type of the access network through which one or more IP flows transmittable and/or receivable by being associated with a session are transmitted and/or received. Note that the access network type may be either a first access or a second access.

In addition, the routing rule may be information that enables the association of the routing filter with the routing access type. The routing rule is information to associate the routing filter with the routing access type, and may be information to make identifiable the routing access type to be used in the transmission and/or reception for each of one or more flows to be transmitted and/or received session by being associated with a session. In addition, the routing rule is information to make identifiable the routing access type to be used in the transmission and/or reception of each data unit associated with the data flow. Note that the UE_A 10 and the core network_A 90 can select, based on the routing rule, the communication path used in the transmission and/or reception of each flow from either a communication path through a first access or a communication path through a second access.

Alternatively, the routing rule may associate multiple routing access types with the routing filter, and may indicate that the communication of a certain flow should be transmitted and/or received by use of multiple communication paths. In this case, when the certain flow is transmitted and/or received, the communication can be performed by use of both a communication path through a first access and a communication path through a second access. To put it differently, the communication path to be used in the transmission and/or reception of each data flow can be determined based on the routing rule. Note that each data unit to be transmitted and/or received in the communication of a certain single flow is delivered by use of either a first access or a second access. To put it differently, no single data unit is duplicated to be delivered through multiple communication paths. In addition, the access network or the communication path may be selected based on the network load, the radio signal quality, the application associated with the data flow, etc. Alternatively, such a selection may be based on the UE policy and/or an operator policy.

In the present embodiment, the multi-access session is a session capable of delivering a traffic either through at one of a first access and a second access, or through both of them. Note that the multi-access session may include a first type multi-access session and may include a second type multi-access session. Note that the above-mentioned session may be a PDU session.

In the present embodiment, a first type multi-access session is a session capable of delivering a traffic either through at one of a first access and a second access, or through both of them. Specifically, the first type multi-access session may be a single PDU session having a communication path through one or more accesses. In this case, the PDU session may be a PDU session configured to deliver a traffic through multiple accesses. In addition, the first type multi-access session may associate the communication paths through individual accesses with the same IP address. In this case, the UE_A 10 and/or the network may communicate multiple flows by use of the multiple communication paths associated with the same IP address, or may communicate multiple flows by use of a single IP address.

Note that each flow is associated with either a first access or a second access and that each flow is communicated through the access associated at a point of time. In addition, which of the accesses is to be used for the transmission and/or reception of each flow may be determined based on the routing rule. Note that the routing rule may be determined based on an operator policy and/or a UE policy.

In addition, the first type multi-access session may be a session based on an NBIFOM. In addition to or in lieu of this, the first type multi-access session may be a session that supports the Access Traffic Switching function. In addition, the first type multi-access session may be a single session capable of communicating multiple flows by use of a single IP address associated with the session. In addition to or in lieu of this, in the present embodiment, a second type multi-access session is a session capable of delivering a traffic either through at one of a first access and a second access, or through both of them. Specifically, the second type multi-access session may be a session including one or more PDU sessions. In this case, each PDU session may be a PDU session configured to deliver a traffic through different accesses. In addition, each PDU session may be associated with different IP addresses. In this case, the UE_A 10 and/or network may communicate multiple flows by use of one or more PDU sessions included in the second type multi-access session, or may communicate multiple flows by use of one or more IP addresses.

In addition, the second type multi-access session may be a single PDU session. Note that this PDU session may have multiple IP addresses assigned thereto. In addition, each of these IP addresses may be assigned from different UP GWs from one another. Such multiple UP GWs may be connected to a single DN, or may be connected different DNs from one another. In addition, the UE_A 10 and the UP GW may perform communications using each of these IP addresses through different accesses from one another.

Note that each flow can be communicated by use of either one of the first access and the second access, and in addition, that each flow can be communicated by simultaneous use of multiple accesses at a point of time. In addition, each data unit to be transmitted and/or received in the communication of each flow is delivered by use of either a first access or a second access. Note that which of the accesses is to be used for the transmission and/or reception of each data unit may be determined based on the routing rule. Note that the routing rule may be determined based on an operator policy and/or a UE policy.

In addition, the second type multi-access session may be a session based on an MPTCP. In addition to or in lieu of this, the second type multi-access session may be a session that supports the Access Traffic Splitting function. In addition, the second type multi-access session may be a single session capable of communicating multiple flows by use of one or more IP addresses associated with the session.

Note that the second type multi-access session is not limited to the one described above, and that may be a PDU session including a communication path through the first access and/or a communication path through the second access. The above-mentioned communication path may be a PDU session or a logical connection including multiple bearers.

In addition, a first state in the present embodiment is a state where the UE_A 10 is connected to and registered in the core network_A 90, and in addition, where each apparatus has established a PDU session. Note that each apparatus may perform a procedure to register the UE_A 10 in the core network_A 90 and a procedure to establish a PDU session either simultaneously or separately.

Figure 14:
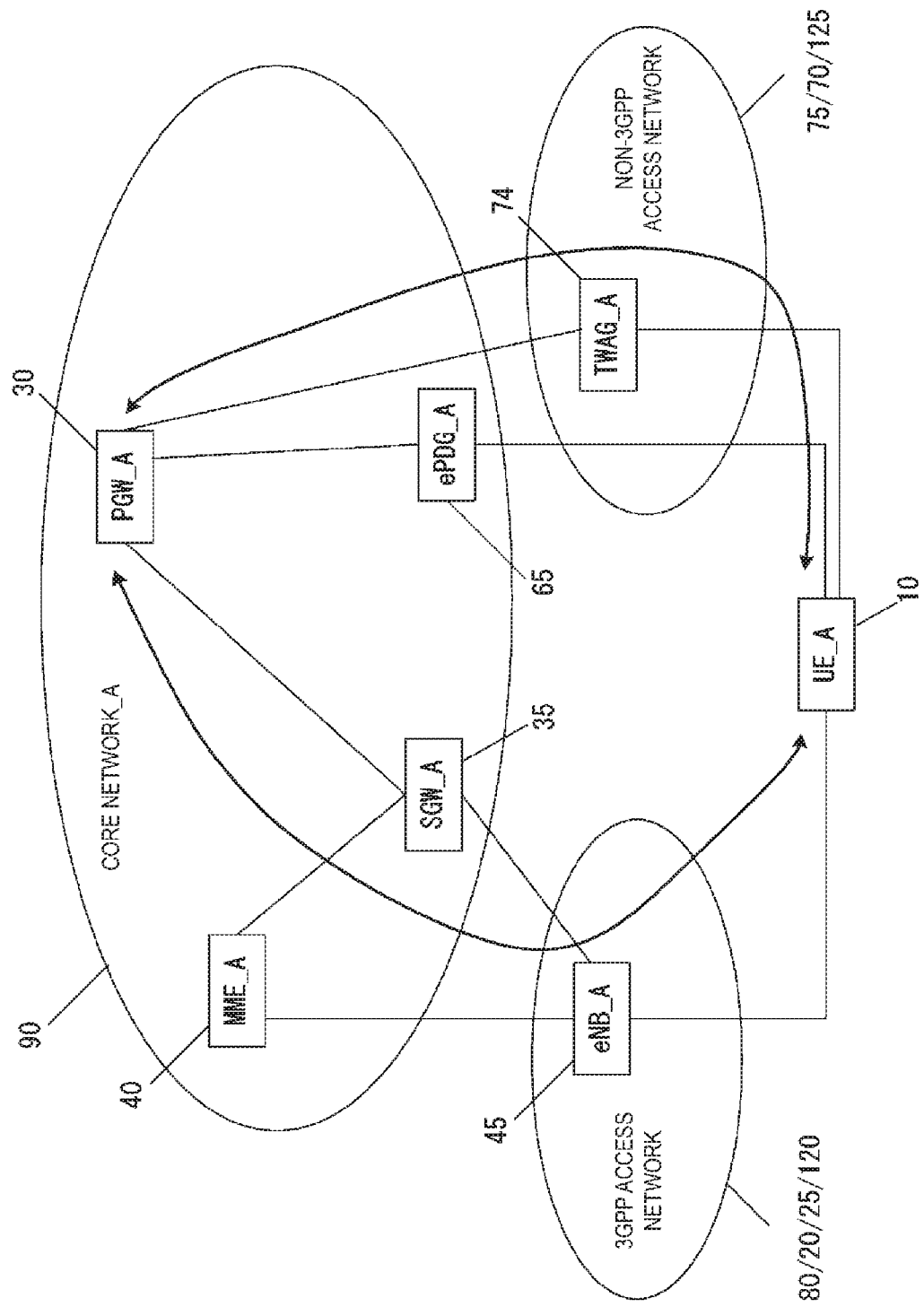
FIG. 14 is a diagram illustrating a state where a PDU session is established.

In addition, the first state in the present embodiment is a state where each apparatus has established a PDU session through the first access and the second access as illustrated in FIG. 14. Specifically, the first state is a state where each apparatus has established: a PDU session that is established between the UE_A 10 and the PGW_A 30 through the eNB_A 45 and the SGW_A 35; and a PDU session that is established between the UE_A 10 and the PGW_A 30 through the TWAG_A 74 and/or the ePDG_A 65. To put it differently, the first state may be a state where each apparatus has established a multi-access session or may be a state where each apparatus has established a PDU session through the first access and a PDU session through the second access.

In addition, the second state in the present embodiment is a state where each apparatus has established a multi-access session through the first access and the second access. Specifically, the second state is a state where each apparatus has established: a PDU session and/or a communication path that is established between the UE_A 10 and the PGW_A 30 through the eNB_A 45 and the SGW_A 35; and a PDU session and/or a communication path that is established between the UE_A 10 and the PGW_A 30 through the TWAG_A 74 and/or the ePDG_A 65.

In addition, the second state may be a state where each apparatus is capable of communicating user data by means of the Access Traffic Switching and/or the Access Traffic Splitting. To put it differently, the second state may be a state where the transmission and/or reception of user data by use of the Access Traffic Switching function and/or the Access Traffic Splitting function has already been started or may be a state where such transmission and/or reception is being performed.

In addition, the Session and Service Continuity (SSC) mode in the present embodiment indicates a mode of the Session and Service Continuity supported by the system and/or each apparatus in the NextGen system. Specifically, the Session and Service Continuity (SSC) mode may be a mode indicating the type of the Session and Service Continuity supported by the PDU session established between the UE_A 10 and the Terminating User-Plane Function (TUPF). Note that the SSC mode may be a mode indicating the type of the Session and Service Continuity set for each PDU session. In addition, the SSC mode may include the following three modes: an SSC mode 1; an SSC mode 2; and an SSC mode 3.

The above-mentioned TUPF may be a Network Function (NF) for the User Plane (U-Plane). In addition, the TUPF may be provided in the core network_A 90, or may be provided in the access network.

In addition, the SSC mode 1 in the present embodiment is a Session and Service Continuity (SSC) mode where the same TUPF continues to be maintained irrespective of the access technology, such as the Radio Access Technology (RAT) and cell, which is to be used when the UE_A 10 is connected to the network. Specifically, the SSC mode 1 may be a mode where the Session and Service Continuity is achieved without changing the TURF used by the established PDU session even in a case of the occurrence of a mobility of the UE_A 10.

In addition, the SSC mode 2 in the present embodiment is a Session and Service Continuity (SSC) mode where the same TURF continues to be maintained only within a serving area of the TUPF. Specifically, the SSC mode 2 may be a mode where the Session and Service Continuity is achieved without changing the TURF used by the established PDU session as long as the UE_A 10 stays within the serving area of the TUPF. In addition, the SSC mode 2 may be a mode where in a case where a mobility in which the UE_A 10 moves out of the TURF serving area occurs, the Session and Service Continuity is implemented by changing the TUPF used by the established PDU session.

The above-mentioned TUPF serving area may be an area where a single TUPF can provide a Session and Service Continuity function, or may be a subset of access networks, such as a RAT and a cell, which are used when the UE_A 10 is connected to the network. In addition, the above-mentioned subset of access networks may be a network including one or more RATs and/or cells.

In addition, the SSC mode 3 in the present embodiment is a Session and Service Continuity (SSC) mode where, before a PDU session and/or a communication path established between the UE_A 10 and the TUPF is cut off, a permission is given to establish a new PDU session and/or a new communication path through a new TUPF for the same DN. In addition, the SSC mode 3 is a Session and Service Continuity mode where the UE_A 10 is allowed to become a multi-homing apparatus.

In addition to and/or in lieu of this, the SSC mode 3 may be a mode where a Session and Service Continuity using multiple PDU sessions and/or multiple TUPFs associated with multiple PDU sessions. To put it differently, in the case of the SSC mode 3, each apparatus may implement the Session and Service Continuity by use of multiple PDU sessions or may implement the Session and Service Continuity by use of multiple TUPFs.

In a case where each apparatus establishes a new PDU session and/or a new communication path, a new TUPF may be selected by the network, or a new TUPF is selected so that the selected new TUPF is the most suitable one for the location where the UE_A 10 is connected to the network. In addition, multiple PDU sessions and/or multiple TUPFs used by the PDU session are in effect, the UE_A 10 may immediately associate the application and/or the communication of the flow with the newly established PDU session, or may perform such association based on the completion of the communication.

In addition, a Default SSC mode in the present embodiment is an SSC mode to be used by the UE_A 10 and/or by the network in a case where no specific SSC mode is determined. Specifically, the Default SSC mode may be an SSC mode to be used by the UE_A 10 in a case where there is no SSC mode request from the application, and/or in a case where there is no policy of the UE_A 10 concerning the determination of the SSC mode for the application. In addition to and/or in lieu of this, the Default SSC mode may be the SSC mode which is to be used by the network in a case where there is no SSC mode request from the UE_A 10.

Note that the Default SSC mode may be set for each PDN_A 5 based on at least one of the information on subscribers, the operator policy, and the policy of the UE_A 10, or may be set for each UE_A 10 and/or for each subscriber. In addition, the Default SSC mode may be information indicating any one of the SSC mode 1, the SSC mode 2 and the SSC mode 3.

In addition, the term "Multihoming" in the present embodiment refers to a state where the UE_A 10 is connected to multiple PDN_As 5 that are identical with or different from one another. Specifically, the Multihoming may refer to a state where the UE_A 10 is connected to identical or different PDN_As 5 via multiple, different PGWs and/or User Plane Gateways (UP GWs). To put it differently, the Multihoming may refer to a state where each apparatus establishes multiple PDU sessions for multiple PDN_As 5 that are either identical with or different from one another. Specifically, the Multihoming may refer to a state where each apparatus establishes, through multiple different PGWs and/or UP GWs, multiple PDU sessions for multiple PDN_As 5 that are either identical with or different from one another. Note that all the multiple PDU sessions established by each apparatus may be established through a single access or may be established through different accesses individually for different PDU sessions. In addition, the PDU sessions may be associated individually with different IP addresses. In addition, the PDU session supporting the Multihoming and/or the multi-access session established in an environment enabling the Multihoming may be a multi-homed PDU Session.

For example, in a case where the UE_A 10 establishes a PDU session A for a first PDN_A 5 and a PDU session B for a PDN_A 5, the PDU session A and the PDU session B may be established through a single access or may be established through different accesses from each other. In addition, the PDU session A and/or the PDU session B may be established through the first access or may be established through the second access.

In addition, the IP address associated with the PDU session A may be an IP address that is different from the IP address associated with the PDU session B. Note that the first PDN_A 5 and the second PDN_A 5 may be the same PDN_A 5 or may be different PDN_As 5.

Next, identification information in the present embodiment will be described. First identification information in the present embodiment is information indicating that the UE_A 10 has a function to enable a communication using one or more IP addresses and to enable establishment of a communication path through a first access and a communication path through a second access. To put it differently, the first identification information may be information indicating that the UE_A 10 has a function to establish a first type multi-access session and/or a second type multi-access session. Alternatively, the first identification information may be information indicating that the UE_A 10 has a function to communicate by use of a first type multi-access session and/or a second type multi-access session. Alternatively, the first identification information may be information indicating that the UE_A 10 has a function to perform an Access Traffic Switching and/or an Access Traffic Splitting. Alternatively, the first identification information may be information that the UE_A 10 has a function to perform a communication by means of an Access Traffic Switching and/or an Access Traffic Splitting.

Second identification information in the present embodiment may be information indicating that the UE_A 10 has a function to establish a first type multi-access session. In addition to or in lieu of this, the second identification information may be information indicating that the UE_A 10 has a function to communicate by use of a first type multi-access session. In addition to or in lieu of this, the second identification information may be information indicating that the UE_A 10 has a function to perform an Access Traffic Switching. In addition to or in lieu of this, the second identification information may be information indicating that the UE_A 10 has a function to perform a communication by means of an Access Traffic Switching. In addition to or in lieu of this, the second identification information may be information indicating that the UE_A 10 has a function to perform the NBIFOM. In addition to or in lieu of this, the second identification information may be information indicating that the UE_A 10 has a function to perform a communication by means of the NBIFOM.

Third identification information in the present embodiment is information indicating that the UE_A 10 has a function to establish a second type multi-access session. In addition to or in lieu of this, the third identification information is information indicating that the UE_A 10 has a function to integrate multiple PDU sessions and thus establish a second type multi-access session. In addition to or in lieu of this, the third identification information may be information indicating that the UE_A 10 has a function to communicate by use of a second type multi-access session.

In addition to or in lieu of this, the third identification information may be information indicating that the UE_A 10 has a function to perform an Access Traffic Splitting, or may be information indicating that the UE_A 10 has a function to perform a communication by means of an Access Traffic Splitting. In addition to or in lieu of this, the third identification information may be information indicating that the UE_A 10 has a function to perform the MPTCP, or may be information indicating that the UE_A 10 has a function to perform a communication by means of the MPTCP. In addition to or in lieu of this, the third identification information may be information indicating that the UE_A 10 supports the Access Traffic Splitting function and/or supports the MPTCP function.

Fourth identification information in the present embodiment is information indicating that the network has a function to enable a communication using one or more IP addresses and to enable establishment of a communication path through a first access and a communication path through a second access. To put it differently, the fourth identification information may be information indicating that the network has a function to establish a first type multi-access session and/or a second type multi-access session. Alternatively, the fourth identification information may be information indicating that the network has a function to communicate by use of a first type multi-access session and/or a second type multi-access session. Alternatively, the fourth identification information may be information indicating that the network has a function to perform an Access Traffic Switching and/or an Access Traffic Splitting. Alternatively, the fourth identification information may be information that the network has a function to perform a communication by means of an Access Traffic Switching and/or an Access Traffic Splitting.

Note that in the present embodiment, the statement like "the network has a certain function" may mean that the core network_A 90 and/or an apparatus included in the core network_A 90, such as the MME_A 40 and the PGW_A 30, has the certain function.

Fifth identification information in the present embodiment may be information indicating that the network has a function to establish a first type multi-access session. In addition to or in lieu of this, the fifth identification information may be information indicating that the network has a function to communicate by use of a first type multi-access session. In addition to or in lieu of this, the fifth identification information may be information indicating that the network has a function to perform an Access Traffic Switching. In addition to or in lieu of this, the fifth identification information may be information indicating that the network has a function to perform a communication by means of an Access Traffic Switching. In addition to or in lieu of this, the fifth identification information may be information indicating that the network has a function to perform the NBIFOM. In addition to or in lieu of this, the fifth identification information may be information indicating that the network has a function to perform a communication by means of the NBIFOM.

Sixth identification information in the present embodiment may be information indicating that the network has a function to establish a second type multi-access session. In addition to or in lieu of this, the sixth identification information may be information indicating that the network has a function to integrate multiple PDU sessions and thus establish a second type multi-access session. In addition to or in lieu of this, the sixth identification information may be information indicating that the network has a function to communicate by use of a second type multi-access session.

In addition to or in lieu of this, the sixth identification information may be information indicating that the network has a function to perform an Access Traffic Splitting, or may be information indicating that the network has a function to perform a communication by means of an Access Traffic Splitting. In addition to or in lieu of this, the sixth identification information may be information indicating that the network has a function to perform the MPTCP, or may be information indicating that the network has a function to perform a communication by means of the MPTCP. In addition to or in lieu of this, the sixth identification information may be information indicating that the network supports the Access Traffic Splitting function and/or supports the MPTCP function.

Seventh identification information in the present embodiment is information requesting the establishment of a first type multi-access session. In addition to or in lieu of this, the seventh identification information may be information requesting the establishment of a PDU session supporting the Access Traffic Switching function and/or the NBIFOM function.

Eighth identification information in the present embodiment is information requesting the establishment of a second type multi-access session and/or a PDU session that can be configured as a second type multi-access session. In addition to or in lieu of this, the eighth identification information may be information requesting a PDU session supporting the Access Traffic Splitting function.

Ninth identification information in the present embodiment is information permitting the establishment of a first type multi-access session. In addition to or in lieu of this, the ninth identification information may be status information indicating that the request for the establishment of a first type multi-access session has been accepted. In addition to or in lieu of this, the ninth identification information may be information indicating that a first type multi-access session has been established. In addition to or in lieu of this, the ninth identification information may be information indicating that the established session is a first type multi-access session. In addition to or in lieu of this, the ninth identification information may be session identification information to identify the established session. In addition to or in lieu of this, the ninth identification information may be information indicating that the PDU session to be established supports the Access Traffic Switching function and/or the NBIFOM function.

Tenth identification information in the present embodiment is information permitting the establishment of a second type multi-access session and/or a PDU session that can be configured as a second type multi-access session. In addition to or in lieu of this, the tenth identification information may be status information indicating that the request for the establishment of a second type multi-access session and/or a PDU session that can be configured as a second type multi-access session has been accepted. In addition to or in lieu of this, the tenth identification information may be information indicating that a second type multi-access session and/or a PDU session that can be configured as a second type multi-access session has been established. In addition to or in lieu of this, the tenth identification information may be information indicating that the established session is a second type multi-access session and/or a PDU session that can be configured as a second multi-access session, or may be information indicating that the established PDU session is a PDU session that is configured as a second type multi-access session. In addition to or in lieu of this, the tenth identification information may be session identification information to identify the established PDU session. In addition to or in lieu of this, the tenth identification information may be information indicating that the PDU session to be established supports the Access Traffic Splitting function.

Eleventh identification information in the present embodiment is information indicating that the network rejects the establishment of a first type multi-access session. In addition to or in lieu of this, the eleventh identification information may be cause information indicating that the establishment of a first type multi-access session is rejected (Reject Cause). In addition to or in lieu of this, the eleventh identification information may be cause information indicating that the first type multi-access session is not supported (Reject Cause). In addition to or in lieu of this, the eleventh identification information may be cause information indicating that at least one of the Access Traffic Switching function and the NBIFOM function is not supported (Reject Cause).

Twelfth identification information in the present embodiment is information indicating that the network rejects the establishment of a second type multi-access session and/or a PDU session that can be configured as a second type multi-access session. In addition to or in lieu of this, the twelfth identification information may be cause information indicating that the establishment of a second type multi-access session and/or a PDU session that can be configured as a second type multi-access session is rejected (Reject Cause). In addition to or in lieu of this, the twelfth identification information may be cause information indicating that at least one of the second type multi-access session and the PDU session that can be configured as a second type multi-access session is rejected (Reject Cause). In addition to or in lieu of this, the twelfth identification information may be cause information indicating that at least one of the Access Traffic Splitting function and the MPTCP function is not supported (Reject Cause).

Thirteenth identification information in the present embodiment is information requesting the changing or the setting of an access to be used for the communication of one or more flows that can be communicated by use of a first type multi-access session. In addition to or in lieu of this, the thirteenth identification information may be information requesting the implementation of the Access Traffic Switching function or the NBIFOM function. In addition to or in lieu of this, the thirteenth identification information may be information indicating that an access for communication using a first type multi-access session is to be changed or set. Note that the thirteenth identification information may contain a routing rule associated with a first type multi-access session. In addition, the routing rule may be a rule for the UE_A 10 to request the changing, or may be a rule based on the UE policy.

Fourteenth identification information in the present embodiment is information indicating that the UE_A 10 requests to bundle one or more PDU sessions together and thus consider the bundled PDU sessions as a second type multi-access session. In addition, the fourteenth identification information may contain information to identify each PDU session to be bundled. Note that the information to identify the PDU session may be a session ID or may be an EPS bearer ID to identify the EPS bearer. For example, in a case where a PDU session A and a PDU session B are bundled together, the fourteenth identification information may contain information to identify the PDU session A and information to identify the PDU session B. In addition, the fourteenth identification information may contain information associated with each PDU session to be bundled. Note that the information associated with a PDU session may be information, like a token for each PDU session, indicating that each PDU session can be bundled together to form a multi-access session.

In addition, the fourteenth identification information may be information requesting the implementation or the stop of the Access Traffic Splitting function and/or the MPTCP function for the communication of one or more flows that can be communicated by use of a second type multi-access session. In addition, the fourteenth identification information may be information indicating which communication of the flow is requested to perform the Access Traffic Splitting function and/or the MPTCP function. In addition to or in lieu of this, the fourteenth identification information may be information indicating that the UE_A 10 requests that the Access Traffic Splitting function and/or the MPTCP function by use of multiple PDU sessions and/or multiple communication paths is to be started or stopped, or may be information indicating that the UE_A 10 requests that the user-data transmission and/or reception by use of the Access Traffic Splitting function and/or the MPTCP function is to be started or stopped. Note that the fourteenth identification information may contain a routing rule associated with a second type multi-access session. In addition, the routing rule may be a rule for the UE_A 10 to request the changing, or may be a rule based on the UE policy.

Fifteenth identification information in the present embodiment is information permitting the changing or the setting of an access used for the communication of one or more flows that can be communicated by use of a first type multi-access session. In addition to or in lieu of this, the fifteenth identification information may be information indicating that the Access Traffic Switching function or the NBIFOM function has been performed. In addition to or in lieu of this, the fifteenth identification information may be information indicating that an access for communication using a first type multi-access session has been changed or set. Note that the fifteenth identification information may contain a routing rule associated with a first type multi-access session. The above-mentioned routing rule may be a routing rule whose implementation has been permitted or may be a routing rule that has been performed. In addition, the routing rule may be a rule whose change has been requested for by the UE_A 10 and whose implementation has been permitted by the network, or may be a rule whose implementation has been permitted based on the operator policy.

Sixteenth identification information in the present embodiment is information indicating that the network permits one or more PDU sessions to be bundled together and thus considered as a second type multi-access session. In addition, the sixteenth identification information may contain information to identify the multi-access session. Note that the identification information to identify the multi-access session may be a session ID assigned to the multi-access session, may be information to identify each PDU session included in the multi-access session, or may be information to identify the EPS bearer included in each PDU session.

In addition, the sixteenth identification information may be information indicating that the implementation or the stop of the Access Traffic Splitting function and/or the MPTCP function requested by the UE_A 10 is permitted for the communication of one or more flows that can be communicated by use of a second type multi-access session. In addition, the sixteenth identification information may be information indicating which communication of the flow is accepted to perform the Access Traffic Splitting function and/or the MPTCP function. In addition to or in lieu of this, the sixteenth identification information may be information indicating that the network permits to start or stop the Access Traffic Splitting function and/or the MPTCP function by use of multiple PDU sessions and/or multiple communication paths, or may be information indicating that the network permits to start or stop the user-data transmission and/or reception by use of the Access Traffic Splitting function and/or the MPTCP function. In addition to or in lieu of this, the sixteenth identification information may be information indicating that the Access Traffic Splitting function and/or the MPTCP function has been performed or stopped for the communication of one or more flows that can be communicated by use of a second type multi-access session. Note that the sixteenth identification information may contain a routing rule associated with a second type multi-access session. The above-mentioned routing rule may be a routing rule whose implementation has been permitted or may be a routing rule that has been performed. In addition, the routing rule may be a rule whose change has been requested for by the UE_A 10 and whose implementation has been permitted by the network, or may be a rule whose implementation has been permitted based on the operator policy.

Seventeenth identification information in the present embodiment is information indicating that no permission is given for the changing or the setting of any accesses used for the communication of one or more flows that can be communicated by use of a first type multi-access session. In addition to or in lieu of this, the seventeenth identification information may be information indicating the rejection of the implementation of the Access Traffic Switching function or the NBIFOM function. In addition to or in lieu of this, the seventeenth identification information may be information indicating that the changing or the setting of an access is not performed for communication using a first type multi-access session. In addition to or in lieu of this, the seventeenth identification information may be cause information indicating that no permission is given for the changing or the setting of an access that is used in the communication of the above-described one or more flows (Reject Cause). In addition to or in lieu of this, the seventeenth identification information may be cause information indicating the rejection of the implementation of the Access Traffic Switching function or the NBIFOM function (Reject Cause). In addition to or in lieu of this, the seventeenth identification information may be cause information indicating that neither the changing nor the setting of the access is performed for communication using a first type multi-access session (Reject Cause).

Eighteenth identification information in the present embodiment is information indicating that the network does not permit one or more PDU sessions to be bundled together and thus considered as a second type multi-access session. In addition, the eighteenth identification information may be cause information indicating the rejection of the UE_A 10's request to bundle one or more PDU sessions and thus consider the bundled PDU sessions as a second type multi-access session (Reject Cause).

In addition, the eighteenth identification information may be information indicating that the implementation or the stop of the Access Traffic Splitting function and/or the MPTCP function is not permitted for the communication of one or more flows that can be communicated by use of a second type multi-access session. In addition, the eighteenth identification information may be information indicating which communication of the flow is not accepted to perform the Access Traffic Splitting function and/or the MPTCP function. In addition to or in lieu of this, the eighteenth identification information may be information indicating that the network does not permit to start or stop the Access Traffic Splitting function and/or the MPTCP function by use of multiple PDU sessions and/or multiple communication paths, or may be information indicating that the network does not permit to start or stop the user-data transmission and/or reception by use of the Access Traffic Splitting function and/or the MPTCP function. In addition to or in lieu of this, the eighteenth identification information may be information indicating the rejection of the implementation of the Access Traffic Splitting function and/or the MPTCP function requested by the UE_A 10. In addition to or in lieu of this, the eighteenth identification information may be information indicating that the changing or the setting of an access is not performed for communication using a second type multi-access session. In addition to or in lieu of this, the eighteenth identification information may be cause information indicating that no permission is given for the changing or the setting of an access that is used in the communication of the above-described one or more flows (Reject Cause). In addition to or in lieu of this, the eighteenth identification information may be cause information indicating the rejection of the implementation of the Access Traffic Splitting function and/or the MPTCP function (Reject Cause). In addition to or in lieu of this, the eighteenth identification information may be cause information indicating that neither the changing nor the setting of the routing rule is performed for communication using a second type multi-access session (Reject Cause).

Nineteenth identification information in the present embodiment is information requesting the changing or the setting of an access to be used for the communication of one or more flows that can be communicated by use of a first type multi-access session. In addition to or in lieu of this, the nineteenth identification information may be information requesting the implementation of the Access Traffic Switching function or the NBIFOM function. In addition to or in lieu of this, the nineteenth identification information may be information indicating that an access for communication using a first type multi-access session is to be changed or set. Note that the nineteenth identification information may contain a routing rule associated with a first type multi-access session. In addition, the routing rule may be a rule for the network to request the changing, or may be a rule based on the operator policy.

Note that in the present embodiment, the statement like "the network requests the changing" may mean that the core network_A 90 and/or an apparatus included in the core network_A 90, such as the MME_A 40 and the PGW_A 30, requests the changing.

Twentieth identification information in the present embodiment is information indicating that the network requests to bundle one or more PDU sessions together and thus consider the bundled PDU sessions as a second type multi-access session. In addition, the twentieth identification information may contain information to identify each PDU session to be bundled. Note that the information to identify the PDU session may be a session ID or may be an EPS bearer ID to identify the EPS bearer. For example, in a case where a PDU session A and a PDU session B are bundled together, the twentieth identification information may contain information to identify the PDU session A and information to identify the PDU session B. In addition, the twentieth identification information may contain information associated with each PDU session to be bundled. Note that the information associated with a PDU session may be information, like a token for each PDU session, indicating that each PDU session can be bundled together to form a multi-access session.

In addition, the twentieth identification information may be information requesting the implementation or the stop of the Access Traffic Splitting function and/or the MPTCP function for the communication of one or more flows that can be communicated by use of a second type multi-access session. In addition, the twentieth identification information may be information indicating which communication of the flow is requested to perform the Access Traffic Splitting function and/or the MPTCP function. In addition to or in lieu of this, the twentieth identification information may be information indicating that the network requests to start or stop the Access Traffic Splitting function and/or the MPTCP function by use of multiple PDU sessions and/or multiple communication paths, or may be information indicating that the network requests to start or stop the user-data transmission and/or reception by use of the Access Traffic Splitting function and/or the MPTCP function. Note that the twentieth identification information may contain a routing rule associated with a second type multi-access session. In addition, the routing rule may be a rule for the network to request the changing, or may be a rule based on the operator policy.

Twenty-first identification information in the present embodiment is information permitting the changing or the setting of an access used for the communication of one or more flows that can be communicated by use of a first type multi-access session. In addition to or in lieu of this, the twenty-first identification information may be information indicating that the Access Traffic Switching function or the NBIFOM function has been performed. In addition to or in lieu of this, the twenty-first identification information may be information indicating that an access for communication using a first type multi-access session has been changed or set. Note that the twenty-first identification information may contain a routing rule associated with a first type multi-access session. The above-mentioned routing rule may be a routing rule whose implementation has been permitted or may be a routing rule that has been performed. In addition, the routing rule may be a rule whose change has been requested for by the network and whose implementation has been permitted by the UE_A 10, or may be a rule whose implementation has been permitted based on the UE policy.

Twenty-second identification information in the present embodiment is information indicating that the UE_A 10 permits one or more PDU sessions to be bundled together and thus considered as a second type multi-access session. In addition, the twenty-second identification information may contain information to identify the multi-access session. Note that the identification information to identify the multi-access session may be a session ID assigned to the multi-access session, may be information to identify each PDU session included in the multi-access session, or may be information to identify the EPS bearer included in each PDU session.

In addition, the twenty-second identification information may be information indicating that the implementation or the stop of the Access Traffic Splitting function and/or the MPTCP function requested by the network is permitted for the communication of one or more flows that can be communicated by use of a second type multi-access session. In addition, the twenty-second identification information may be information indicating which communication of the flow is accepted to perform the Access Traffic Splitting function and/or the MPTCP function. In addition to or in lieu of this, the twenty-second identification information may be information indicating that the UE_A 10 permits to start or stop the Access Traffic Splitting function and/or the MPTCP function by use of multiple PDU sessions and/or multiple communication paths, or may be information indicating that the UE_A 10 permits to start or stop the user-data transmission and/or reception by use of the Access Traffic Splitting function and/or the MPTCP function. In addition to or in lieu of this, the twenty-second identification information may be information indicating that the Access Traffic Splitting function and/or the MPTCP function has been performed or stopped for the communication of one or more flows that can be communicated by use of a second type multi-access session. Note that the twenty-second identification information may contain a routing rule associated with a second type multi-access session. The above-mentioned routing rule may be a routing rule whose implementation has been permitted or may be a routing rule that has been performed. In addition, the routing rule may be a rule whose change has been requested for by the network and whose implementation has been permitted by the UE_A 10, or may be a rule whose implementation has been permitted based on the UE policy.

Twenty-third identification information in the present embodiment is information indicating that no permission is given for the changing or the setting of any accesses used for the communication of one or more flows that can be communicated by use of a first type multi-access session. In addition to or in lieu of this, the twenty-third identification information may be information indicating the rejection of the implementation of the Access Traffic Switching function or the NBIFOM function. In addition to or in lieu of this, the twenty-third identification information may be information indicating that the changing or the setting of an access is not performed for communication using a first type multi-access session. In addition to or in lieu of this, the twenty-third identification information may be cause information indicating that no permission is given for the changing or the setting of an access that is used in the communication of the above-described one or more flows (Reject Cause). In addition to or in lieu of this, the twenty-third identification information may be cause information indicating the rejection of the implementation of the Access Traffic Switching function or the NBIFOM function (Reject Cause). In addition to or in lieu of this, the twenty-third identification information may be cause information indicating that neither the changing nor the setting of the access is performed for communication using a first type multi-access session (Reject Cause).

Twenty-fourth identification information in the present embodiment is information indicating that the UE_A 10 does not permit one or more PDU sessions to be bundled together and thus considered as a second type multi-access session. In addition, the twenty-fourth identification information may be cause information indicating the rejection of the network's request to bundle one or more PDU sessions and thus consider the bundled PDU sessions as a second type multi-access session (Reject Cause).

In addition, the twenty-fourth identification information may be information indicating that the implementation or the stop of the Access Traffic Splitting function and/or the MPTCP function is not permitted for the communication of one or more flows that can be communicated by use of a second type multi-access session. In addition, the twenty-fourth identification information may be information indicating which communication of the flow is not accepted to perform the Access Traffic Splitting function and/or the MPTCP function. In addition to or in lieu of this, the twenty-fourth identification information may be information indicating that the UE_A 10 does not permit to start or stop the Access Traffic Splitting function and/or the MPTCP function by use of multiple PDU sessions and/or multiple communication paths, or may be information indicating that the UE_A 10 does not permit to start or stop the user-data transmission and/or reception by use of the Access Traffic Splitting function and/or the MPTCP function. In addition to or in lieu of this, the twenty-fourth identification information may be information indicating the rejection of the implementation of the Access Traffic Splitting function and/or the MPTCP function requested by the network. In addition to or in lieu of this, the twenty-fourth identification information may be information indicating that the changing or the setting of an access is not performed for communication using a second type multi-access session. In addition to or in lieu of this, the twenty-fourth identification information may be cause information indicating that no permission is given for the changing or the setting of an access that is used in the communication of the above-described one or more flows (Reject Cause). In addition to or in lieu of this, the twenty-fourth identification information may be cause information indicating the rejection of the implementation of the Access Traffic Splitting function and/or the MPTCP function (Reject Cause). In addition to or in lieu of this, the twenty-fourth identification information may be cause information indicating that neither the changing nor the setting of the routing rule is performed for communication using a second type multi-access session (Reject Cause).

Twenty-fifth identification information in the present embodiment is information indicating that the UE_A 10 supports the Session and Service Continuity in the SSC mode 3. In addition to or in lieu of this, the twenty-fifth identification information may be information indicating that the UE_A 10 is capable of establishing a PDU session supporting the SSC mode 3. In addition to or in lieu of this, the twenty-fifth identification information may be information indicating that the UE_A 10 supports the Multihoming. In addition to or in lieu of this, the twenty-fifth identification information may be information indicating that the UE_A 10 is capable of establishing a PDU session supporting the Multihoming. In addition to or in lieu of this, the twenty-fifth identification information may be information indicating that the UE_A 10 supports the user-data transmission and/or reception in the Multihoming environment.

Twenty-sixth identification information in the present embodiment is information indicating that the UE_A 10 supports the Multihoming using the IPv4. In addition to or in lieu of this, the twenty-sixth identification information may be information indicating that the UE_A 10 is capable of establishing a PDU session supporting the Multihoming using the IPv4. In addition to or in lieu of this, the twenty-sixth identification information may be information indicating that the UE_A 10 supports the user-data transmission and/or reception in the Multihoming environment using the IPv4.

Twenty-seventh identification information in the present embodiment is information indicating that the UE_A 10 supports the Multihoming using the IPv6. In addition to or in lieu of this, the twenty-seventh identification information may be information indicating that the UE_A 10 is capable of establishing a PDU session supporting the Multihoming using the IPv6. In addition to or in lieu of this, the twenty-seventh identification information may be information indicating that the UE_A 10 supports the user-data transmission and/or reception in the Multihoming environment using the IPv6.

Twenty-eighth identification information in the present embodiment is information indicating a Default SSC mode of the UE_A 10. In addition to or in lieu of this, the twenty-eighth identification information may be information indicating that the UE_A 10 has the Default SSC mode. In addition to or in lieu of this, the twenty-eighth identification information may be the Default SSC mode requested by the UE_A 10.

Twenty-ninth identification information in the present embodiment is information indicating that the network supports the Session and Service Continuity in the SSC mode 3. In addition to or in lieu of this, the twenty-ninth identification information may be information indicating that the network is capable of establishing a PDU session supporting the SSC mode 3. In addition to or in lieu of this, the twenty-ninth identification information may be information indicating that the network supports the Multihoming. In addition to or in lieu of this, the twenty-ninth identification information may be information indicating that the network is capable of establishing a PDU session supporting the Multihoming. In addition to or in lieu of this, the twenty-ninth identification information may be information indicating that the network supports the user-data transmission and/or reception in the Multihoming environment.

Thirtieth identification information in the present embodiment is information indicating that the network supports the Multihoming using the IPv4. In addition to or in lieu of this, the thirtieth identification information may be information indicating that the network is capable of establishing a PDU session supporting the Multihoming using the IPv4. In addition to or in lieu of this, the thirtieth identification information may be information indicating that the network supports the user-data transmission and/or reception in the Multihoming environment using the IPv4.

Thirty-first identification information in the present embodiment is information indicating that the network supports the Multihoming using the IPv6. In addition to or in lieu of this, the thirty-first identification information may be information indicating that the network is capable of establishing a PDU session supporting the Multihoming using the IPv6. In addition to or in lieu of this, the thirty-first identification information may be information indicating that the network supports the user-data transmission and/or reception in the Multihoming environment using the IPv6.

Thirty-second identification information in the present embodiment is information indicating a Default SSC mode of the network. In addition to or in lieu of this, the thirty-second identification information may be information indicating that the network has the Default SSC mode. In addition to or in lieu of this, the thirty-second identification information may be the Default SSC mode requested and/or permitted by the network. Note that the Default SSC mode of the UE_A 10 and the Default SSC mode of the network may be Default SSC modes indicating the same SSC mode, or may be Default SSC modes indicating different SSC modes from one another.

Next, a communication procedure according to the present embodiment will be described using FIG. 15. Details of each procedure will be described later. Firstly, each apparatus performs an attach procedure (S2000) to shift the state into a state where the UE_A 10 is connected to the network. Next, each apparatus performs a PDU session establishment procedure (S2002), and transitions into a first state (S2004). Note that in the attach procedure and/or in the PDU session establishment procedure, each apparatus may exchange, with other apparatuses, information on various capabilities of each apparatus and/or information on various requests of each apparatus.

In addition, to transition into the first state, each apparatus performs not only the initial procedures (i.e., the attach procedure and/or the PDU session establishment procedure) through a first access but also other initial procedures through a second access. Note that each apparatus may perform the initial procedures through the second access after performing the initial procedures through the first access, or alternatively, each apparatus may perform the initial procedures through the first access after performing the initial procedures through the second access. In addition, each apparatus may perform the exchange of the information on various capabilities of each apparatus and/or the information on various requests of each apparatus by means of either the initial procedures through the first access or the initial procedures through the second access, or may perform the exchange by means of both of the initial procedures.

Note that in a case where each apparatus performs the exchange of various kinds of information and/or the negotiation of various kinds of requests by means of the attach procedure, the exchange of various kinds of information and/or the negotiation of various kinds of requests do not have to be performed by means of the PDU session establishment procedure. In contrast, in a case where each apparatus does not perform the exchange of various kinds of information and/or the negotiation of various kinds of requests by means of the attach procedure, the exchange of various kinds of information and/or the negotiation of various kinds of requests may be performed by means of the PDU session establishment procedure. Still alternatively, even in a case where each apparatus does perform the exchange of various kinds of information and/or the negotiation of various kinds of requests by means of the attach procedure, the exchange of various kinds of information and/or the negotiation of various kinds of requests may be performed by means of the PDU session establishment procedure.

For example, each apparatus may exchange one or more pieces of the first to the eighteenth identification information during the attach procedure and during the PDU session establishment procedure. In addition, each apparatus may exchange one or more pieces of the first to the eighteenth identification information during the attach procedure, while each apparatus may exchange none during the PDU session establishment procedure. In contrast, each apparatus may exchange one or more pieces of the first to the eighteenth identification information during the PDU session establishment procedure, while each apparatus may exchange none during the attach procedure. In addition, each apparatus may exchange one or more pieces of the first to eighteenth identification information during the PDU session establishment procedure as long as that one or more pieces have not been exchanged during the attach procedure.

In addition, in a case where these pieces of identification information are managed by being associated with the UE_A 10, each apparatus may exchange them in the attach procedure. In a case where these pieces of identification information are managed by being associated with the PDU session and/or the EPS bearer, each apparatus may exchange them during the PDU session establishment procedure.

In addition, each apparatus may perform the PDU session establishment procedure during the attach procedure or may perform it after the attach procedure is completed. Note that in a case where the PDU session establishment procedure is performed during the attach procedure, each apparatus may establish a PDU session based on the completion of the attach procedure and thus may transition to the first state.

Then, each apparatus performs a routing-rule update procedure (S2006). Note that the routing-rule update procedure may be performed at any time after the transition to the first state. In addition, each apparatus may exchange the information on various requests during the routing-rule update procedure. For example, each apparatus may exchange one or more pieces of the thirteenth to twenty-fourth identification information during the routing-rule update procedure.

Then, based on the completion of the routing-rule update procedure, each apparatus transitions to a second state (S2008). Note that each apparatus may transition to the second state not only at the time of the completion of the routing-rule update procedure but also at the time when the establishment of a PDU session through a second access is completed. To put it differently, each apparatus may transition further to the second state by bundling, at the time of transitioning to the first state, the established PDU session through the first access and the established PDU session through the second access, and by considering the bundled PDU sessions as a multi-access session.

In addition, for the purpose of transitioning to the second state, each apparatus may establish a multi-access session by establishing PDU sessions through the first access and the second access, and by performing the routing-rule update procedure. Alternatively, each apparatus may establish a multi-access session by bundling, at the time when a PDU session through the second access is established, the already-established PDU session through the first access and the PDU session through the second access.

By the procedures described thus far, each apparatus completes the procedures in question. Note that each apparatus involved in the procedures in question may transmit and/or receive each control message described in the description of the procedures in question, may thus transmit and/or receive one or more pieces of identification information contained in each control message, and may then store, as a context, each piece of identification information having been transmitted and/or received.

1.3.1. Attach Procedure Overview

Firstly, an overview of the attach procedure will be described. This procedure is a procedure led by the UE_A 10 to connect to a network (i.e., the access network, the core network_A 90, and/or the PDN_A 5). While the UE_A 10 is not connected to the core network_A 90, the UE_A 10 can perform this procedure at any time, such as when the terminal apparatus is powered on. To put it differently, the UE_A 10 may start this procedure at any time as long as the UE_A 10 is in a not-registered state (EMM-DEREGISTERED). In addition, each apparatus may transition to a registered state (EMM-REGISTERED) based on the completion of the attach procedure.

In addition, this procedure may be a procedure through the first access or may be a procedure through the second access. The UE_A 10 may start this procedure through the second access while the UE_A 10 is connected to the core network_A 90 through the first access. Alternatively, the UE_A 10 may start this procedure through the first access while the UE_A 10 is connected to core network_A 90 through the second access.

Note that in the following description, this procedure through the first access is taken as an exemplar attach procedure while this procedure through the second access is taken as an exemplar attach procedure through the second access. Note that details of each exemplar attach procedure will be described later.

1.3.2. Exemplar PDU session Establishment Procedure

Next, an exemplar PDU session establishment procedure will be described below. This procedure is a procedure for each apparatus to establish a PDU session. Note that each apparatus may perform this procedure after the completion of the attach procedure, or may perform this procedure during the attach procedure. In addition, each apparatus may start this procedure at any time after the attach procedure. In addition, each apparatus may establish a PDU session based on the completion of the PDU session establishment procedure. In addition, each apparatus may establish a multiple PDU session by performing this procedure multiple times.

Note that at the time of establishing a PDU session by this procedure, there may be an already-established multi-access session or there may be no such session. In addition, by performing this procedure multiple times, each apparatus may add communication paths through multiple accesses to a single multi-access session, may establish a new multi-access session, or may establish multiple PDU sessions that can be configured as a multi-access session. Note that this procedure may be a procedure through the first access or may be a procedure through the second access.

In addition, this procedure may be performed by being led by the UE_A 10. For example, this procedure may be performed by being led by the UE_A 10 at the time of initial connection, such as when the terminal apparatus is powered on. In addition, the UE_A 10 may start this procedure through the first access and/or the second access while the UE_A 10 is connected to the core network_A 90 through the first access and/or the second access.

Note that by performing this procedure through the second access after the establishment of a multi-access session through the first access, each apparatus may add a communication path through the second access to the multi-access session, or each apparatus may be enabled to perform a communication using a communication path through the first access and a communication path using the second access. In addition, each apparatus in this case may establish, through the second access, a PDU session that can be configured as a multi-access session. Alternatively, each apparatus may bundle the established PDU session through the second access with the already-established PDU session through the first access, and may thus consider the bundled PDU sessions as a multi-access session.

In addition, by performing this procedure through the first access after the establishment of a multi-access session through the second access, each apparatus may add a communication path through the first access to the multi-access session, or each apparatus may be enabled to perform a communication using a communication path through the first access and a communication path using the second access. In addition, each apparatus in this case may establish, through the first access, a PDU session that can be configured as a multi-access session. Alternatively, each apparatus may bundle the established PDU session through the first access with the already-established PDU session through the second access, and may thus consider the bundled PDU sessions as a multi-access session.

In addition, by performing this procedure through the first access and/or the second access while no multi-access session has been established yet, each apparatus may establish a new multi-access session, or may establish, through the first access or the second access, a PDU session that can be configured as a multi-access session.

Note that this is not the only condition for adding, to the multi-access session, a communication path through a new access and/or for establishing a new multi-access session. In addition, in the following description, this procedure through the first access is taken as an exemplar UE-initiated PDU session establishment procedure while this procedure through the second access is taken as an exemplar UE-initiated PDU session establishment procedure through the second access.

1.3.2.1. Exemplar UE-Initiated PDU Session Establishment Procedure

Figure 17:
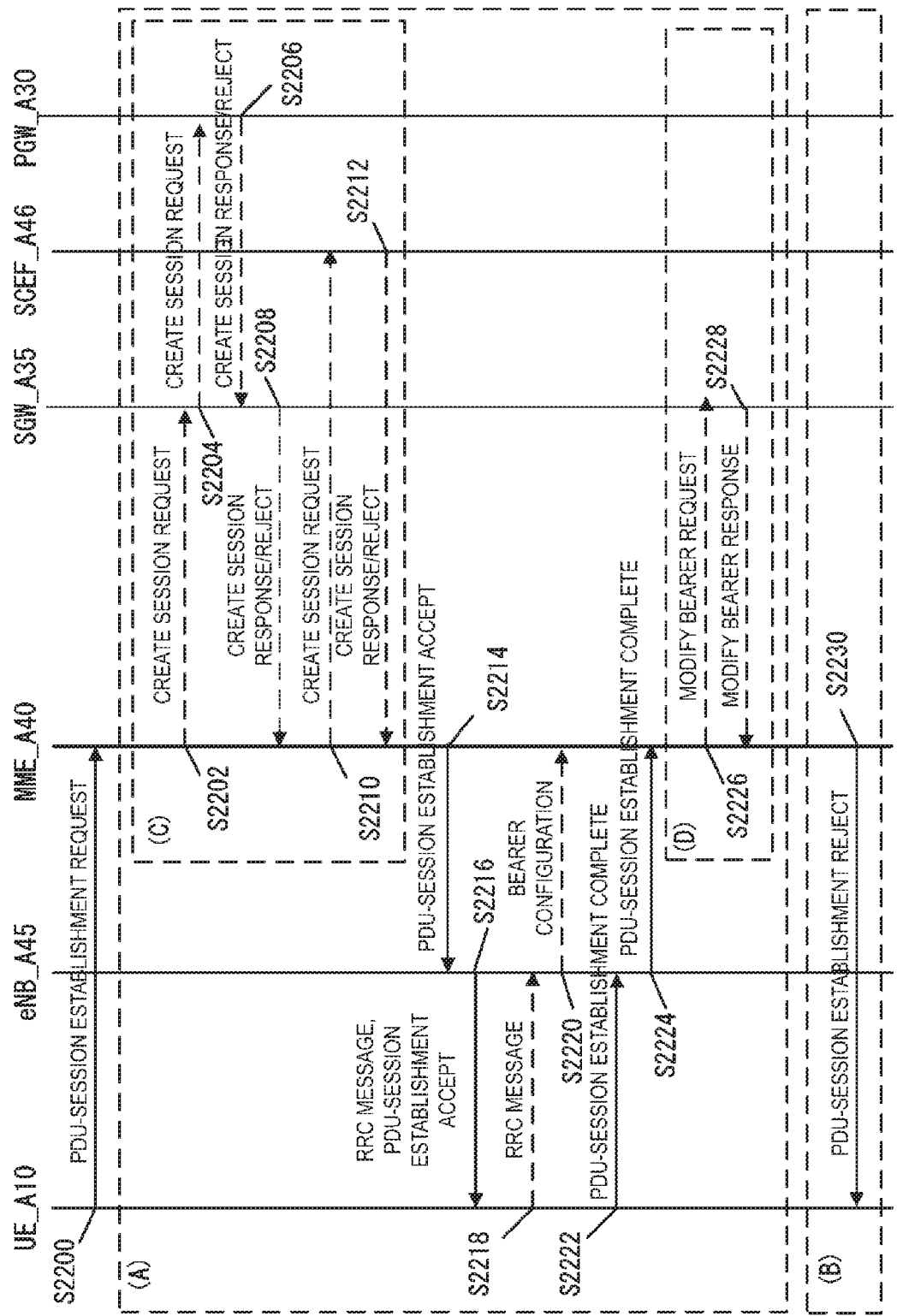
FIG. 17 is a diagram illustrating a UE-initiated PDU session establishment procedure.

An exemplar procedure for performing a PDU session establishment procedure led by the UE_A 10 will be described below with reference to FIG. 17. Each step of this procedure will be described below. Firstly, the UE_A 10 starts a UE-initiated PDU session establishment procedure by transmitting PDU Session Establishment Request message to the MME_A 40 through the eNB_A 45 (S2200). Note that in a case where the PDU session is a PDN connection, the PDU Session Establishment Request message may be a PDN connectivity request message. In addition, this is not the only possible form of the PDU Session Establishment Request message. Instead, the PDU Session Establishment Request message has only to be a message requesting the establishment of a PDU session.

Note that this procedure may be an exemplar UE-initiated PDU session establishment procedure through the first access. Note that the UE_A 10 may incorporate, into the PDU Session Establishment Request message, one or more pieces of the first identification information, the second identification information, the third identification information, the seventh identification information, the eighth identification information, the thirteenth identification information, and the fourteenth identification information. By incorporating these pieces of identification information into the PDU Session Establishment Request message, the UE_A 10 may request the establishment of a multi-access session and/or a PDU session that can be configured as a multi-access session.

In addition, by transmitting and/or receiving one or more pieces of the first identification information, the second identification information, the seventh identification information, and the thirteenth identification information, each apparatus may request the establishment of a first type multi-access session, may request a communication performed by use of the Access Traffic Switching, or may request a communication by use of the NBIFOM.

In addition, by transmitting and/or receiving one or more pieces of the first identification information, the second identification information, the seventh identification information, and the thirteenth identification information, each apparatus may indicate that the UE_A 10 supports the Access Traffic Switching, or may request the establishment of a PDU session supporting the Access Traffic Switching.

In addition, by transmitting and/or receiving the thirteenth identification information, each apparatus may request the setting of an access for the communication using the first type multi-access session and/or the setting of a routing rule associated with the first type multi-access session.

In addition, by transmitting and/or receiving one or more pieces of the first identification information, the third identification information, the eighth identification information, and the fourteenth identification information, each apparatus may request the establishment of a second type multi-access session and/or a PDU session that can be configured as a second type multi-access session, or each apparatus may request performing the communication using the Access Traffic Splitting and/or the MPTCP. In addition, by transmitting and/or receiving one or more pieces of the first identification information, the third identification information, the eighth identification information, and the fourteenth identification information, each apparatus may bundle one or more PDU sessions and may consider the bundled PDU sessions as a second type multi-access session.

In addition, by transmitting and/or receiving one or more pieces of the first identification information, the third identification information, the eighth identification information, and the fourteenth identification information, each apparatus may indicate that the UE_A 10 supports the Access Traffic Splitting and/or the MPTCP, or may request the establishment of a PDU session supporting the Access Traffic Splitting.

In addition, by transmitting and/or receiving the fourteenth identification information, each apparatus may request to bundle one or more PDU sessions and thus consider the bundled PDU sessions as a second type multi-access session. In addition, by transmitting and/or receiving the fourteenth identification information, each apparatus may request the implementation or no implementation of Access Traffic Splitting function for each of the one or more flows, or may request the setting of a routing role associated with a second type multi-access session. In addition, by transmitting and/or receiving the fourteenth identification information, each apparatus may indicate which communication of the flow is requested to perform the Access Traffic Splitting function and/or the MPTCP function.

In addition, by transmitting and/or receiving the fourteenth identification information, each apparatus may request to start or stop the Access Traffic Splitting and/or the MPTCP function by use of a second type multi-access session, or may request to start or stop the transmission and/or reception of user data by use of the Access Traffic Splitting and/or the MPTCP function.

In addition, in a case where a multi-access session has already been established, the UE_A 10 may request to add a communication path through the first access to the already-established multi-access session by incorporating, into the PDU Session Establishment Request message, information indicating that it is not an initial request, and/or an APN used in a multi-access session. Note that the information indicating that it is not an initial request may be information indicating that it is a handover.

In contrast, the UE_A 10 may transmit the PDU Session Establishment Request message by incorporating, into the PDU Session Establishment Request message, information indicating that it is an initial request. In addition, by incorporating such identification information, the UE_A 10 may request to establish a new multi-access session through the first access.

In addition, the UE_A 10 may transmit the PDU Session Establishment Request message by including information indicating the PDU session type that is being requested in the PDU Session Establishment Request message. In addition, by incorporating information indicating the PDU session type that is being requested, the UE_A 10 may request a certain kind of IP address to be assigned to the PDU session that is to be established. Note that the type of the PDU session may be the IPv4, the IPv6, the IPv4v6, or a non-IP.

MME_A 40 receives the PDU Session Establishment Request message, and then performs a first-condition determination. In the first-condition determination, the MME_A 40 determines whether the first condition is true or false. In a case where the first condition is true, the MME_A 40 starts the procedure (A) in this procedure. In contrast, in a case where the first condition is false, the MME_A 40 starts the procedure (B) in this procedure. Note that the steps of case of a false first condition will be described later.

Now, a description will be provided about the steps of a case where the first condition is true, that is, the steps included in the procedure (A) of this procedure. MME_A 40 performs the procedure (C) in this procedure to start the procedure (A) in this procedure. A further description will be provided below about each step in the procedure (C) in this procedure. The MME_A 40 performs a second-condition determination to start the procedure (C) in this procedure. In the second-condition determination, the MME_A 40 determines whether the second condition is true or false. In a case where the second condition is true, the MME_A 40 may transmit a create session request message to the SGW_A 35 (S2202). In addition, in a case where the second condition is false, the MME_A 40 may transmit a create session request message to the SCEF_A 46 (S2210).

The first-condition determination described above allows the MME_A 40 to determine whether the MME_A 40 will or will not accept the request from the UE_A 10. A true first condition corresponds to a case where the request from the UE_A 10 will be accepted, which may be a case where the request from the UE_A 10 is permitted. In addition, a false first condition corresponds to a case where the request from the UE_A 10 will be rejected, which may be a case where it is determined that the first condition is not true.

In addition, the second-condition determination allows the MME_A 40 to determine the type of the PDU session to be established. A true second condition corresponds to a case where the PDU session to be established is a first type PDU session, which may be a case where: the UE_A 10 has requested for the establishment of a first type PDU session; and the MME_A 40 has permitted the request, and/or the MME_A 40 has determined to establish a first type PDU session. In addition, a false second condition corresponds to a case where the PDU session to be established is a second type PDU session, which may be a case where: the UE_A 10 has requested the establishment of a second type PDU session: and the MME_A 40 has permitted the request, and/or the MME_A 40 has determined to establish a second type PDU session, or which may be a case where it is determined that the second condition is not true.

The above-mentioned first type PDU session refers to the connectivity between the UE_A 10 and the PDN_A 5 through at least one of the eNB_A 45, the SGW_A 35, and the PGW_A 30. On the other hand, the second type PDU session refers to the connectivity between the UE_A 10 and the PDN_A 5 through at least one of the eNB_A 45, the MME_A 40, and the SCEF_A 46.

Note that in a case where the SGW_A 35 has received a create session request message, the SGW_A 35 transmits a create session request message to the PGW_A 30 (S2204). Then, once the PGW_A 30 receives the create session request message, the PGW_A 30 performs a third-condition determination.

Note that the MME_A 40 and/or the SGW_A 35 may incorporate, into the create session request message, one or more pieces of the first identification information, the second identification information, the third identification information, the seventh identification information, the eighth identification information, the thirteenth identification information, and the fourteenth identification information. In addition, the MME_A 40 and/or the SGW_A 35 may incorporate, into the create session request message, one or more of the information indicating that it is or it is not an initial request, the APN, and the type of the requested PDU session. Thus, by the incorporation of such pieces of identification information, the MME_A 40 and/or the SGW_A 35 may convey the request from the UE_A 10.

In addition, the third-condition determination may be performed by the PCRF_A 60 instead of by the PGW_A 30. In such a case, the PGW_A 30, together with the PCRF_A 60, performs IP-CAN session establishment procedure. Specifically, the PGW_A 30 transmits, to the PCRF_A 60, a request message in the IP-CAN session establishment procedure. Then, once the PCRF_A 60 receives the request message in the IP-CAN session establishment procedure, the PCRF_A 60 performs a third-condition determination. In addition, the PCRF_A 60 transmits, to the PGW_A 30, a response message in the IP-CAN session establishment procedure. Then, once the PGW_A 30 receives the response message in the IP-CAN session establishment procedure, the PGW_A 30 recognizes the result of the third-condition determination.

Note that the PGW_A 30 may incorporate, into the request message in the IP-CAN session establishment procedure, one or more pieces of the first identification information, the second identification information, the third identification information, the seventh identification information, the eighth identification information, the thirteenth identification information, and the fourteenth identification information. In addition, the PGW_A 30 may incorporate, into the request message in the IP-CAN session establishment procedure the information indicating that it is or it is not an initial request. Thus, by the incorporation of such pieces of identification information, the PGW_A 30 may convey the request from the UE_A 10.

In addition, the PCRF_A 60 may incorporate, into the response message in the IP-CAN session establishment procedure, at least the result of the third-condition determination. Thus, by the incorporation of this result, the PCRF_A 60 may notify the PGW_A 30 of the result of the third-condition determination.

In addition, the PCRF_A 60 may incorporate, into the response message in the IP-CAN session establishment procedure, one or more pieces of the fourth identification information, the fifth identification information, the sixth identification information, the ninth identification information, the tenth identification information, fifteenth identification information, and the sixteenth identification information. Thus, by the incorporation of such pieces of identification information, the PCRF_A 60 may indicate that the request from the UE_A 10 has been permitted.

In addition, the PCRF_A 60 may incorporate, into the response message during the IP-CAN session establishment procedure, one or more pieces of the eleventh identification information, the twelfth identification information, the seventeenth identification information, and the eighteenth identification information. Thus, by the incorporation of such pieces of identification information, the PCRF_A 60 may indicate that the request from the UE_A 10 has been rejected.

In the third-condition determination, the PGW_A 30 determines whether the third condition is true or false. In a case where the third condition is true, the PGW_A 30 transmits a create session response message to the SGW_A 35 (S2206). Then, the SGW_A 35 receives the create session response message, and transmits a create session response message to the MME_A 40 (S2208). Furthermore, the MME_A 40 receives the create session response message.

In addition, the PGW_A 30 and/or the SGW_A 35 may incorporate, into the create session response message, one or more pieces of the fourth identification information, the fifth identification information, the sixth identification information, the ninth identification information, the tenth identification information, the fifteenth identification information, and the sixteenth identification information. In addition, the PGW_A 30 and/or the SGW_A 35 may incorporate the APN and/or the IP address into the create session response message. Thus, by the incorporation of such pieces of identification information, the PGW_A 30 and/or the SGW_A 35 may indicate that the request from the UE_A 10 has been permitted.

In addition, in a case where the third condition is false, the PGW_A 30 transmits a create session reject message to the SGW_A 35 (S2206). In addition, once the SGW_A 35 receives the create session reject message, the SGW_A 35 transmits the create session reject message to the MME_A 40 (S2208). Note that the create session reject message may be a create session response message containing a Reject cause.

In addition, the PGW_A 30 and/or the SGW_A 35 may incorporate, into the create session reject message, one or more pieces of the eleventh identification information, the twelfth identification information, the seventeenth identification information, and the eighteenth identification information. Thus, by the incorporation of such pieces of identification information, the PGW_A 30 and/or the SGW_A 35 may indicate that the request from the UE_A 10 has been rejected.

In addition, in a case where the SCEF_A 46 receives a create session request message, the SCEF_A 46 performs a third-condition determination. In the third-condition determination, the SCEF_A 46 determines whether the third condition is true or false. In a case where the third condition is true, the SCEF_A 46 transmits a create session response message to the MME_A 40 (S2212). The MME_A 40 receives the create session response message. In addition, in a case where the third condition is false, the SCEF_A 46 transmits a create session reject message to the MME_A 40 (S2212). Based on the transmission and/or reception of the create session response message and/or of the create session reject message, each apparatus completes the procedure (C) of this procedure.

Note that the third-condition determination allows the PGW_A 30 and/or the SCEF_A 46 to determine whether or not to accept the request from the UE_A 10. A true third condition corresponds to a case where the request from the UE_A 10 will be accepted, which may be a case where the request from the UE_A 10 is permitted. In addition, a false third condition corresponds to a case where the request from the UE_A 10 will be rejected, which may be a case where it is determined that the third condition is not true.

Note that in a case where the PCRF_A 60 performs a third-condition determination, the PGW_A 30 may perform a third-condition determination based on the result of the third-condition determination received from the PCRF_A 60. For example, in a case where the PCRF_A 60 accepts the request from the UE_A 10, the PCRF_A 60 and the PGW_A 30 may determine that the third condition is true. In a case where the PCRF_A 60 rejects the request from the UE_A 10, the PCRF_A 60 and the PGW_A 30 may determine that the third condition is false.

Based on the reception of the create session response message, the MME_A 40 transmits a PDU session establishment accept message to the eNB_A 45 (S2214). Note that once the MME_A 40 has received the create session reject message, the MME_A 40 may discontinue the procedure (A) in this procedure and start the procedure (B) in this procedure. In addition, in a case where the PDU session is a PDN connection, the PDU session establishment accept message may be a PDN Connectivity Accept message, or may be an Activate default EPS bearer context request message. In addition, as the PDU session establishment accept message has only to be a response message to the PDU Session Establishment Request message, the PDU session establishment accept message is not limited to the ones mentioned above. Hence, the PDU session establishment accept message may be a message indicating the acceptance of the PDU session establishment request.

The eNB_A 45 receives the PDU session establishment accept message, and transmits, to UE_A 10, an RRC message (which may be, for example, an RRC Connection Reconfiguration message, an RRC Connection Setup message, an RRC Direct Transfer message, or the like), and/or a PDU session establishment accept message (S2216). Note that the PDU session establishment accept message may be transmitted and/or received by being incorporated in an RRC message.

Note that the MME_A 40 may include one or more pieces of the fourth identification information, the fifth identification information, the sixth identification information, the ninth identification information, the tenth identification information, the fifteenth identification information, and the sixteenth identification information in the PDU session establishment accept message. In addition, the MME_A 40 may incorporate, into the PDU session establishment accept message, one or more of the APN, the IP address, and the type of the PDU session. Thus, by the incorporation of such pieces of identification information, the MME_A 40 may indicate that the request from the UE_A 10 has been accepted, and/or may indicate that the establishment of a multi-access session and/or a PDU session that can be configured as a multi-access session is permitted.

In addition, by transmitting and/or receiving one or more pieces of the fourth identification information, the fifth identification information, the ninth identification information, and the fifteenth identification information, each apparatus may indicate that the request for the establishment of a first type multi-access session has been accepted, may indicate that the request for performing a communication using the Access Traffic Switching has been accepted, and/or may indicate that the request for performing a communication using the NBIFOM has been accepted.

In addition, by transmitting and/or receiving one or more pieces of the fourth identification information, the fifth identification information, the ninth identification information, and the fifteenth identification information, each apparatus may indicate that the network supports the Access Traffic Switching, and/or may indicate that a PDU session supporting the Access Traffic Switching has been established.

In addition, by transmitting and/or receiving the fifteenth identification information, each apparatus may indicate that an access for performing a communication using a first type multi-access session has been set, and/or may indicate that a routing rule associated with a first type multi-access session has been set.

In addition, by transmitting and/or receiving one or more pieces of the fourth identification information, the sixth identification information, the tenth identification information, and the sixteenth identification information, each apparatus may indicate that the request for the establishment of a second type multi-access session and/or a PDU session that can be configured as a second type multi-access session has been accepted, and/or may indicate that the request for performing a communication using the Access Traffic Splitting and/or the MPTCP has been accepted. In addition, by transmitting and/or receiving one or more pieces of the fourth identification information, the sixth identification information, the tenth identification information, and the sixteenth identification information, each apparatus may indicate that the request to bundle one or more PDU sessions and thus consider the bundled PDU sessions as a second type multi-access session has been accepted.

In addition, by transmitting and/or receiving one or more pieces of the fourth identification information, the sixth identification information, the tenth identification information, and the sixteenth identification information, each apparatus may indicate that the network supports the Access Traffic Splitting and/or the MPTCP, and/or may indicate that a PDU session supporting the Access Traffic Splitting has been established.

In addition, by transmitting and/or receiving the sixteenth identification information, each apparatus may indicate whether it is permitted that one or more PDU sessions are bundled together and thus the bundled PDU sessions are considered as a second type multi-access session. In addition, by transmitting and/or receiving the sixteenth identification information, each apparatus may indicate whether or not an Access Traffic Splitting function is to be performed for each of one or more flows, and/or may indicate that a routing rule associated with a second type multi-access session has been set. In addition, by transmitting and/or receiving the sixteenth identification information, each apparatus may indicate which communication of the flow is accepted to perform the Access Traffic Splitting function and/or the MPTCP function.

In addition, by transmitting and/or receiving the sixteenth identification information, each apparatus may indicate that the request to start or stop the Access Traffic Splitting and/or the MPTCP function using a second type multi-access session has been permitted, and/or may indicate that the request to start or stop the transmission and/or reception of user data by use of the Access Traffic Splitting and/or MPTCP function has been permitted.

In addition, by transmitting and/or receiving the same APN and/or the same IP address as those of the multi-access session having already been established before the start of this procedure, each apparatus may indicate that a communication path through the first access has been added to the multi-access session. In contrast, by transmitting and/or receiving a new APN and/or a new IP address, each apparatus may indicate that a new multi-access session through the first access has been established, and/or may indicate that a PDU session that can be configured as a multi-access session through the first access has been established.

In a case where the UE_A 10 has received an RRC message, the UE_A 10 transmits an RRC message (which may be, for example, an RRC Connection Reconfiguration Complete message, an RRC Connection Setup Complete message, an RRC Direct Transfer message, or the like) to the eNB_A 45 (S2218). The eNB_A 45 receives an RRC message, and transmits a bearer configuration message to the MME_A 40 (S2220). Then, the MME_A 40 receives the bearer configuration message.

Once the UE_A 10 has received a PDU session establishment accept message, the UE_A 10 transmits a PDU session establishment complete message to the MME_A 40 through the eNB_A 45 (S2222) (S2224). Then, once the MME_A 40 has received the PDU session establishment complete message, the MME_A 40 starts the procedure (D) in this procedure. Note that in a case where the PDU session is a PDN connection, PDU session establishment complete message may be a PDN Connectivity complete message, or may be an Activate default EPS bearer context accept message. In addition, as the PDU session establishment complete message has only to be a response message to the PDU session establishment accept message, the PDU session establishment complete message is not limited to the ones mentioned above. Hence, the PDU session establishment complete message may be a message indicating that the PDU session establishment procedure is to be finished.

A description will be provided below about each step in the procedure (D) in this procedure. In a case where the second condition is true, the MME_A 40 transmits a modify bearer request message to the SGW_A 35 (S2226), and thus starts the procedure (D) in this procedure. Then, once the SGW_A 35 has received the modify bearer request message, the SGW_A 35 transmits a modify bearer response message to the MME_A 40 (S2228). Then, once the MME_A 40 has received the modify bearer response message, the MME_A 40 completes the procedure (D) in this procedure. In addition, based on the transmission and/or reception of the PDU session establishment complete message, and/or on the completion of the procedure (D) in this procedure, each apparatus completes the procedure (A) in this procedure.

Next, a description will be provided below about each step in the procedure (B) in this procedure. The MME_A 40 transmits a PDU session establishment reject message to the UE_A 10 through the eNB_A 45 (S2230), and thus starts the procedure (B) in this procedure. Then, the UE_A 10 receives the PDU session establishment reject message, and thus recognizes that the request from the UE_A 10 has been rejected. Based on the transmission and/or reception of the PDU session establishment reject message, each apparatus completes the procedure (B) in this procedure. The PDU session establishment reject message may contain an appropriate Reject cause. Note that in a case where the PDU session is a PDN connection, the PDU session establishment reject message may be a PDN Connectivity reject message. In addition, as the PDU session establishment reject message has only to be a response message to the PDU Session Establishment Request message, the PDU session establishment accept message is not limited to the one mentioned above. Hence, the PDU session establishment reject message may be a message indicating the rejection of the PDU session establishment request.

In addition, the MME_A 40 may incorporate, into the PDU session establishment reject message, one or more pieces of the eleventh identification information, the twelfth identification information, the seventeenth identification information, and the eighteenth identification information. By incorporating such pieces of identification information, the MME_A 40 may indicate that the request from the UE_A 10 has been rejected, and/or may indicate that the network of the connection destination does not support the establishment of a multi-access session and/or a PDU session that can be configured as a multi-access session. In addition, the MME_A 40 may indicate that the establishment of a multi-access session and/or a PDU session that can be configured as a multi-access session is not permitted.

In addition, by transmitting and/or receiving the eleventh identification information and/or the seventeenth identification information, each apparatus may indicate that the request for the establishment of a first type multi-access session has been rejected. In addition, each apparatus may indicate that the request for performing a communication using the Access Traffic Switching has been rejected, and/or may indicate that the request for performing a communication using the NBIFOM has been rejected. In addition, each apparatus may notify of the reason why each request has been rejected.

In addition, by transmitting and/or receiving the seventeenth identification information, each apparatus may indicate that the setting of the access for performing a communication using a first type multi-access session has not been permitted, and/or may indicate that the setting of a routing rule associated with the first type multi-access session has not been permitted.

In addition, by transmitting and/or receiving the twelfth identification information and/or the eighteenth identification information, each apparatus may indicate that the request for the establishment of a second type multi-access session and/or a PDU session that can be configured as a second type multi-access session has been rejected, and/or may indicate that the request for performing a communication using the Access Traffic Splitting and/or the MPTCP has been rejected. In addition, by transmitting and/or receiving the twelfth identification information and/or the eighteenth identification information, each apparatus may indicate that the request for bundling one or more PDU sessions and then considering the bundled PDU sessions as a second type multi-access session has been rejected, or may notify of the reason why each request has been rejected.

In addition, by transmitting and/or receiving the eighteenth identification information, each apparatus may indicate that bundling one or more PDU sessions and then considering the bundled PDU sessions as a second type multi-access session is not permitted. In addition, by transmitting and/or receiving the eighteenth identification information, each apparatus may indicate that no implementation of the Access Traffic Splitting, and/or the MPTCP function is permitted for each of one or more flows, and/or may indicate that no setting of a routing rule associated with a second type multi-access session has been permitted. In addition, by transmitting and/or receiving the eighteenth identification information, each apparatus may indicate which communication of the flow is not accepted to perform the Access Traffic Splitting function and/or the MPTCP function.

In addition, by transmitting and/or receiving the eighteenth identification information, each apparatus may indicate that the request to start or stop the Access Traffic Splitting and/or the MPTCP function using a second type multi-access session has not been permitted, and/or may indicate that the request to start or stop the transmission and/or reception of user data by use of the Access Traffic Splitting and/or MPTCP function has not been permitted.

Based on the completion of the procedure (A) or (B) in this procedure, each apparatus completes this procedure. Note that based on the completion of procedure (A) in this procedure, each apparatus may transition into a state where the PDU session has been established. Alternatively, based on the completion of the procedure (B) in this procedure, each apparatus may recognize that this procedure has been rejected.

In addition, based on the completion of this procedure, each apparatus may establish a multi-access session and/or a PDU session that can be configured as a multi-access session. To put it differently, in a case where each apparatus has transmitted and/or received one or more pieces of the fourth identification information, the fifth identification information, the sixth identification information, the ninth identification information, the tenth identification information, the fifteenth identification information, and the sixteenth identification information, each apparatus may establish a multi-access session and/or a PDU session that can be configured as a multi-access session. In contrast, in a case where each apparatus has transmitted and/or received one or more pieces of the eleventh identification information, the twelfth identification information, the seventeenth identification information, and the eighteenth identification information, each apparatus does not have to establish such a session. In addition, by establishing a multi-access session, each apparatus may be capable of performing a communication using a communication path through the first access and a communication path through the second access.

In addition, in a case where each apparatus has transmitted and/or received one or more pieces of the fourth identification information, the fifth identification information, the ninth identification information, and the fifteenth identification information, each apparatus may establish a first type multi-access session, or may establish a PDU session supporting the Access Traffic Switching. In addition, in a case where each apparatus has transmitted and/or received one or more pieces of the fourth identification information, the fifth identification information, the ninth identification information, and the fifteenth identification information, each apparatus may recognize that the established PDU session is a first type multi-access session, or may recognize that the Access Traffic Switching and/or the NBIFOM has been applied to the established PDU session.

In addition, in a case where each apparatus has transmitted and/or received one or more pieces of the fourth identification information, the sixth identification information, the tenth identification information, and the sixteenth identification information, each apparatus may establish a second type multi-access session, or may recognize that the established PDU session is a second type multi-access session.

In addition, in a case where each apparatus has transmitted and/or received one or more pieces of the fourth identification information, the sixth identification information, the tenth identification information, and the sixteenth identification information, each apparatus may establish a PDU session that can be configured as a second type multi-access session, or may recognize that the established PDU session is a PDU session that can be configured as a second type multi-access session.

In addition, in a case where each apparatus has transmitted and/or received one or more pieces of the fourth identification information, the sixth identification information, the tenth identification information, and the sixteenth identification information, each apparatus may establish a PDU session supporting the Access Traffic Splitting, or may recognize that the Access Traffic Splitting and/or the MPTCP has been applied to the established PDU session.

In addition, in a case where each apparatus has transmitted and/or received the fifteenth identification information, each apparatus may recognize and store the access and/or the routing rule to be used in the established PDU session. In addition, in a case where each apparatus has transmitted and/or received the sixteenth identification information, each apparatus may recognize and store one or more of the following items: the information permitting the bundling of one or more PDU sessions and considering the bundled PDU sessions as a second type multi-access session; the information indicating whether or not to perform the Access Traffic Splitting and/or the MPTCP function for each of one or more flows of user data to be transmitted and/or received; and the routing rule to be used in the established PDU session. In addition, in a case where each apparatus has transmitted and/or received the sixteenth identification information, each apparatus may recognize which communication of the flow the Access Traffic Splitting function and/or the MPTCP function can be applied to.

In addition, in a case where each apparatus has transmitted and/or received the sixteenth identification information, each apparatus may start or stop the Access Traffic Splitting and/or the MPTCP function using a second type multi-access session, or may start or stop the transmission and/or reception of user data by use of the Access Traffic Splitting and/or the MPTCP function. In addition, in a case where each apparatus has transmitted and/or received the sixteenth identification information, each apparatus may transition into a state where the Access Traffic Splitting and/or the MPTCP function can be performed.

In addition, in a case where each apparatus has transmitted and/or received the eleventh identification information and/or the seventeenth identification information, each apparatus may recognize that the setting of an access for performing a communication using a first type multi-access session has not been permitted, or may recognize that the setting of a routing rule associated with a first type multi-access session has not been permitted. In addition, in a case where each apparatus has transmitted and/or received the eleventh identification information and/or the seventeenth identification information, each apparatus may recognize that at least one of the Access Traffic Switching function and the NBIFOM function is not supported.

In addition, in a case where each apparatus has transmitted and/or received the twelfth identification information and/or the eighteenth identification information, each apparatus may recognize that the implementation of the Access Traffic Splitting and/or the MPTCP function is not permitted for each of one or more flows, or may recognize that the setting of a routing rule associated with a second type multi-access session has not been permitted. In addition, by transmitting and/or receiving the eighteenth identification information, each apparatus may indicate which communication of the flow is not supported to perform the Access Traffic Splitting function and/or the MPTCP function. In addition, in a case where each apparatus has transmitted and/or received the twelfth identification information and/or the eighteenth identification information, each apparatus may authenticate that at least one of the Access Traffic Splitting function and the MPTCP function is not supported.

In addition, in a case where each apparatus has transmitted and/or received the twelfth identification information and/or the eighteenth identification information, each apparatus may recognize that at least one of the Access Traffic Splitting function and the MPTCP function using a second type multi-access session has not been started or stopped, or may recognize that the transmission and/or reception of user data by use of the Access Traffic Splitting function and/or the MPTCP function has not been started or stopped.

In addition, in a case where each apparatus has transmitted and/or received one or more pieces of the eleventh identification information, the twelfth identification information, the seventeenth identification information, and the eighteenth identification information, each apparatus may recognize that the request from the UE_A 10 has been rejected, or may recognize the reason why the request from the UE_A 10 has been rejected. In addition, based on the reason why the request from the UE_A 10 has been rejected, each apparatus may perform this procedure for a second time.

In addition, based on the completion of this procedure, each apparatus may determine whether: a communication path through the first access has been added to a multi-access session that had already been established before the start of this procedure; a new multi-access session through the first access has been established; or a PDU session that can be configured as a multi-access session has been established through the first access.

For example, in a case where each apparatus has transmitted and/or received the same APN and/or IP address as that of the already-established multi-access session, each apparatus may recognize that a communication path through the first access has been added to the already-established multi-access session. In addition, in a case where each apparatus has transmitted and/or received an APN and/or an IP address that is different from its counterpart of the already-established multi-access session, each apparatus may recognize that a new multi-access session through the first access and/or a PDU session that can be configured as a multi-access session through the first access has been established.

In addition, the first-condition determination to the third-condition determination may be performed based on the identification information, the subscriber information, and/or the operator policy contained in the PDU Session Establishment Request message. In addition, the criteria for the determination of the truth/falsehood of the first to the third conditions do not have to be limited to the ones described earlier.

For example, the first condition and/or the third condition may be true in a case where the UE_A 10 requests the establishment of a multi-access session and the network permits the request. In addition, the first condition and/or the third condition may be false in a case where the UE_A 10 requests the establishment of a multi-access session and the network does not permit the request. In addition, the first condition and/or the third condition may be false in a case where the destination network to which the UE_A 10 is connected and/or the apparatus in that network does not support the establishment of a multi-access session.

Specifically, the first condition and/or the third condition may be true in a case where the request, from the UE_A 10, for the establishment of a first type multi-access session, a second type multi-access session, and/or a PDU session that can be configured as a second type multi-access session is accepted. Otherwise, the first condition and/or the third condition may be false.

In addition, the first condition and/or the third condition may be true in a case where the request, from the UE_A 10, for the access type and/or the routing rule to be used in the multi-access session is accepted. Otherwise, the first condition and/or the third condition may be false.

In addition, the first condition and/or the third condition may be true in a case where the request, from the UE_A 10, for whether or not to enable one or more of the Access Traffic Switching function, the NBIFOM function, the Access Traffic Splitting function, and the MPTCP is accepted. Otherwise, the first condition and/or the third condition may be false.

In addition, the first condition and/or the third condition may be true in a case where the request for the start or the stop of the Access Traffic Splitting and/or the MPTCP function by use of a second type multi-access session is accepted. Otherwise, the first condition and/or the third condition may be false. In addition, the first condition and/or the third condition may be true in a case where the request for the start or the stop of the transmission and/or reception of user data by use of the Access Traffic Splitting and/or the MPTCP function is accepted. Otherwise, the first condition and/or the third condition may be false.

Figure 18:
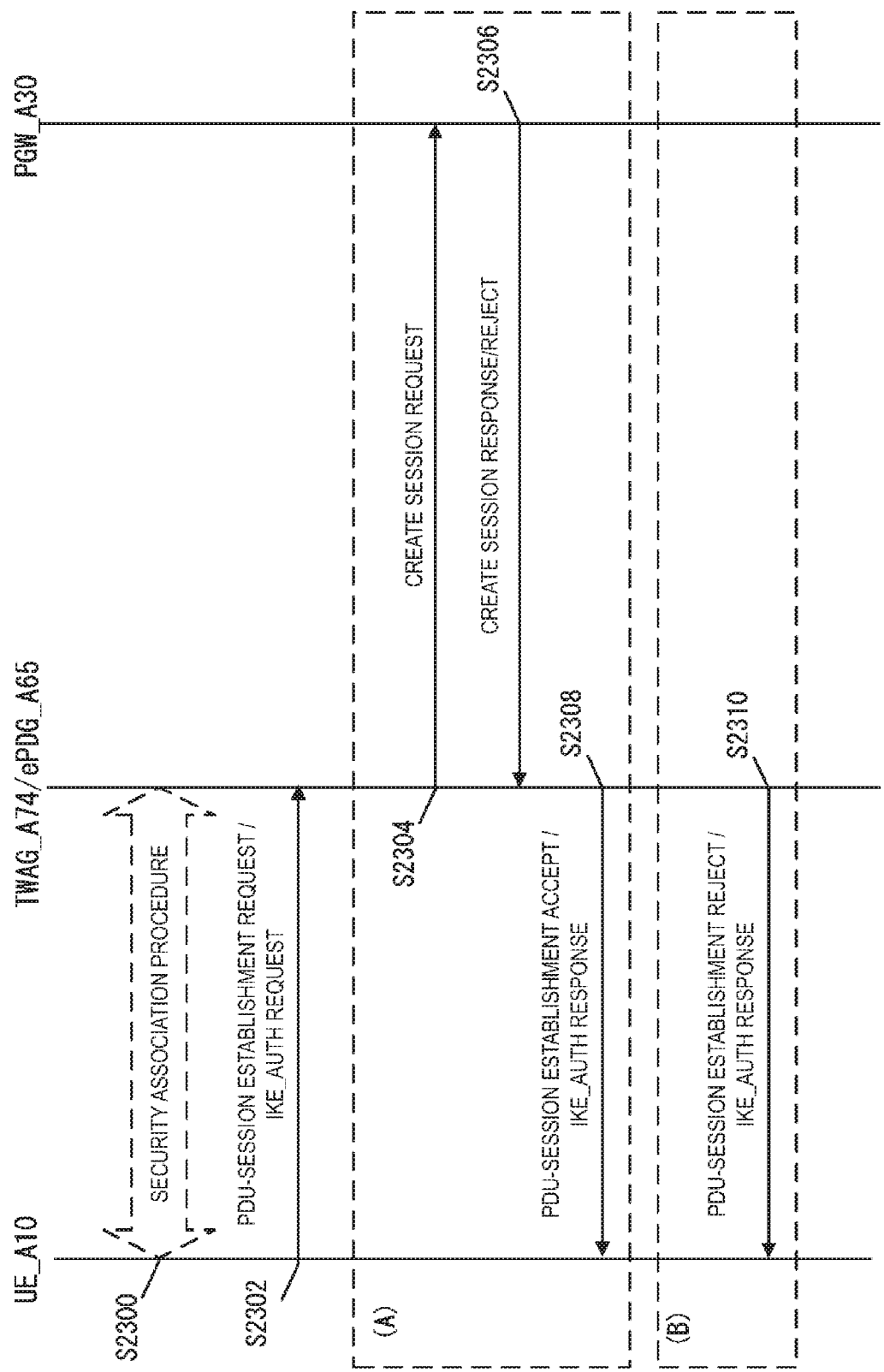
FIG. 18 is a diagram illustrating a UE-initiated PDU session establishment procedure via a second access.

1.3.2.2. Exemplar UE-Initiated PDU Session Establishment Procedure Through Second Access An exemplar procedure for performing, through the second access, a PDU session establishment procedure led by the UE_A 10 will be described below with reference to FIG. 18. Each step of this procedure will be described below. Firstly, the UE_A 10 performs a procedure for establishing a security association between the UE_A 10 and at least one of the access network and the core network_A 90 (S2300). Note that in a case where a security association has already been established between the UE_A 10 and the network, the UE_A 10 may omit the security association procedure.

Then, the UE_A 10 transmits a control message to the counterpart apparatus in the access network. Specifically, in a case where the access network of the connection destination is the second access and/or the WLAN ANa 70, the UE_A 10 transmits a PDU Session Establishment Request message to the TWAG_A 74 (S2302). In addition, in a case where the access network of the connection destination is the second access and/or the WLAN ANb 75, the UE_A 10 transmits an IKE_AUTH request message to the ePDG_A 65 (S2302).

Note that this procedure may be an exemplar UE-initiated PDU session establishment procedure through the second access. Note that the UE_A 10 may incorporate, into the PDU Session Establishment Request message and/or the IKE_AUTH request message, one or more pieces of the first identification information, the second identification information, the third identification information, the seventh identification information, the eighth identification information, the thirteenth identification information, and the fourteenth identification information. Thus, by incorporating such pieces of identification information into the above-mentioned messages, the UE_A 10 may request the establishment of a multi-access session and/or a PDU session that can be configured as a multi-access session.

In addition, by transmitting and/or receiving one or more pieces of the first identification information, the second identification information, the third identification information, the seventh identification information, the eighth identification information, the thirteenth identification information, and the fourteenth identification information, each apparatus may take similar actions to the actions taken by the corresponding apparatus in the exemplar UE-initiated PDU session establishment procedure described earlier.

In addition, in a case where a multi-access session has already been established, the UE_A 10 may request to add a communication path through the second access to the already-established multi-access session by incorporating, into the PDU Session Establishment Request message and/or the IKE_AUTH request message, information indicating that it is not an initial request, and/or an APN used in a multi-access session. Note that the information indicating that it is not an initial request may be information indicating that it is a handover.

In contrast, the UE_A 10 may transmit the PDU Session Establishment Request message and/or the IKE_AUTH request message by incorporating, into the PDU Session Establishment Request message and/or the IKE_AUTH request message, information indicating that it is an initial request. In addition, by incorporating such identification information, the UE_A 10 may request to establish a new multi-access session through the second access.

In addition, the UE_A 10 may transmit the PDU Session Establishment Request message by incorporating, into the PDU Session Establishment Request message, information indicating the PDU session type that is being requested. In addition, by incorporating information indicating the PDU session type that is being requested, the UE_A 10 may request a certain kind of IP address to be assigned to the PDU session that is to be established.

In a case where the connection destination of the UE_A 10 is the second access and/or the WLAN ANa 70, the TWAG_A 74 receives the PDU Session Establishment Request message, and determines the first condition. In addition, in a case where the connection destination of the UE_A 10 is the second access and/or the WLAN ANb 75, the ePDG_A 65 receives the IKE_AUTH request message and determines the first condition. In a case where the first condition is true, the TWAG_A 74 and/or the ePDG_A 65 starts the procedure (A) in this procedure. In contrast, in a case where the first condition is false, the TWAG_A 74 and/or the ePDG_A 65 starts the procedure (B) in this procedure.

A description will be provided below about each step in the procedure (A) in this procedure. The TWAG_A 74 and/or the ePDG_A 65 transmits a create session request message to the PGW_A 30, and thus starts the procedure (A) in this procedure (S2304). Then, the PGW_A 30 receives the create session request message, and determines the third condition.

Note that the TWAG_A 74 and/or the ePDG_A 65 may incorporate, into the create session request message, one or more pieces of the first identification information, the second identification information, the third identification information, the seventh identification information, the eighth identification information, the thirteenth identification information, and the fourteenth identification information. In addition, the TWAG_A 74 and/or the ePDG_A 65 may incorporate, into the create session request message, one or more of the information indicating that it is or it is not an initial request, the APN, and the type of the requested PDU session. Thus, by the incorporation of such pieces of identification information, the TWAG_A 74 and/or the ePDG_A 65 may convey the request from the UE_A 10.

In addition, as in the case of the above-described UE-initiated PDU session establishment procedure, the third-condition determination may be performed by the PCRF_A 60 instead of by the PGW_A 30. Therefore, description of the steps will be omitted.

In a case where the third condition is true, the PGW_A 30 transmits a create session response message to the source of the create session request message (S2306). Then, the source of the create session request message receives the create session response message. Note that the source of the create session request message may be the TWAG_A 74, or may be the ePDG_A 65.

In addition, the PGW_A 30 may incorporate, into the create session response message, one or more pieces of the fourth identification information, the fifth identification information, the sixth identification information, the ninth identification information, the tenth identification information, the fifteenth identification information, and the sixteenth identification information. In addition, the PGW_A 30 may incorporate one or more of the APN, the IP address and the PDU session type into the create session response message. Thus, by the incorporation of such pieces of identification information, the PGW_A 30 may indicate that the request from the UE_A 10 has been permitted.

In contrast, in a case where the third condition is false, the PGW_A 30 transmits a create session reject message to the source of the create session request message (S2306). Then, the source of the create session request message receives the create session reject message. Note that the create session reject message may be a create session response message containing a Reject cause.

In addition, the PGW_A 30 may incorporate, into the create session reject message, one or more pieces of the eleventh identification information, the twelfth identification information, the seventeenth identification information, and the eighteenth identification information. Thus, by the incorporation of such pieces of identification information, the PGW_A 30 may indicate that the request from the UE_A 10 has been rejected.

Note that the third-condition determination allows the PGW_A 30 and/or the PCRF_A 60 to determine whether or not to accept the request from the UE_A 10. The third-condition determination may be similar to the third-condition determination in the case of the exemplar UE-initiated PDU session establishment procedure described earlier. Therefore, description of the steps will be omitted.

Then, once the TWAG_A 74 receives the create session response message, the TWAG_A 74 transmits a PDU session establishment accept message to the UE_A 10 (S2308). Alternatively, once the ePDG_A 65 receives the create session response message, the ePDG_A 65 transmits an IKE_AUTH response message to the UE_A 10 (S2308). Note that once the TWAG_A 74 and/or the ePDG_A 65 receives a create session reject message, the TWAG_A 74 and/or the ePDG_A 65 may discontinue the procedure (A) in this procedure, and may start the procedure (B) in this procedure.

Note that the TWAG_A 74 may incorporate, into the PDU session establishment accept message, one or more pieces of the fourth identification information, the fifth identification information, the sixth identification information, the ninth identification information, the tenth identification information, the fifteenth identification information, and the sixteenth identification information. In addition, the TWAG_A 74 may incorporate, into the PDU session establishment accept message, one or more of the APN, the IP address, and the PDU session type. By incorporating such pieces of identification information, the TWAG_A 74 may indicate that the request from the UE_A 10 has been accepted, and/or may indicate that the network of the connection destination supports the establishment of a multi-access session and/or a PDU session that can be configured as a multi-access session. In addition, the TWAG_A 74 may indicate that the establishment of a multi-access session and/or the establishment of a PDU session that can be configured as a multi-access session is permitted.

In addition, the ePDG_A 65 may incorporate, into the IKE_AUTH response message, one or more pieces of the fourth identification information, the fifth identification information, the sixth identification information, the ninth identification information, the tenth identification information, the fifteenth identification information, and the sixteenth identification information. In addition, the ePDG_A 65 may incorporate, into the IKE_AUTH response message, one or more pieces of the APN, the IP address, and the PDU session type. By incorporating such pieces of identification information, the ePDG_A 65 may indicate that the request from the UE_A 10 has been accepted. In addition, the ePDG_A 65 may indicate that the network of the connection destination supports the establishment of a multi-access session and/or the establishment of a PDU session that can be configured as a multi-access session. In addition, ePDG_A 65 may indicate that the establishment of the multi-access session and/or the establishment of a PDU session that can be configured as a multi-access session is permitted.

In addition, by transmitting and/or receiving one or more pieces of the fourth identification information, the fifth identification information, the sixth identification information, the ninth identification information, the tenth identification information, the fifteenth identification information, and the sixteenth identification information, each apparatus may take similar actions to the actions taken by the corresponding apparatus in the exemplar UE-initiated PDU session establishment procedure described earlier.

In addition, by transmitting and/or receiving the same APN and/or the same IP address as those of the multi-access session having already been established before the start of this procedure, each apparatus may indicate that a communication path through the second access has been added to the multi-access session. In contrast, by transmitting and/or receiving a new APN and/or a new IP address, each apparatus may indicate that a new multi-access session through the second access has been established, and/or may indicate that a PDU session that can be configured as a multi-access session through the second access has been established.

The UE_A 10 receives the PDU session establishment accept message and/or the IKE_AUTH response message, and completes the procedure (A) in this procedure.

Next, a description will be provided below about each step in the procedure (B) in this procedure. Once the TWAG_A 74 receives the PDU Session Establishment Request message and/or the create session reject message, the TWAG_A 74 transmits a PDU session establishment reject message to the UE_A 10 (S2310). Alternatively, once the ePDG_A 65 receives the IKE_AUTH request message and/or the create session reject message, the ePDG_A 65 transmits an IKE_AUTH response message to the UE_A 10 (S2310).

In addition, the TWAG_A 74 may incorporate, into the PDU session establishment reject message, one or more pieces of the eleventh identification information, the twelfth identification information, the seventeenth identification information, and the eighteenth identification information. By incorporating such pieces of identification information, the TWAG_A 74 may indicate that the request from the UE_A 10 has been rejected, and/or may indicate that the network of the connection destination does not support the establishment of a multi-access session and/or a PDU session that can be configured as a multi-access session. In addition, the TWAG_A 74 may indicate that the establishment of a multi-access session and/or a PDU session that can be configured as a multi-access session is not permitted.

In addition, the ePDG_A 65 may incorporate, into the IKE_AUTH response message, one or more pieces of the eleventh identification information, the twelfth identification information, the seventeenth identification information, and the eighteenth identification information. By incorporating such pieces of identification information, the ePDG_A 65 may indicate that the request from the UE_A 10 has been rejected, and/or may indicate that the network of the connection destination does not support the establishment of a multi-access session and/or the establishment of a PDU session that can be configured as a multi-access session. In addition, the ePDG_A 65 may indicate that the establishment of a multi-access session and/or the establishment of a PDU session that can be configured as a multi-access session is not permitted.

In addition, by transmitting and/or receiving one or more pieces of the eleventh identification information, the twelfth identification information, the seventeenth identification information, and the eighteenth identification information, each apparatus may take similar actions to the actions taken by the corresponding apparatus in the exemplar UE-initiated PDU session establishment procedure described earlier.

The UE_A 10 receives the PDU session establishment reject message and/or the IKE_AUTH response message, and completes the procedure (B) in this procedure.

Based on the completion of the procedure (A) or (B) in this procedure, each apparatus completes this procedure. Note that based on the completion of procedure (A) in this procedure, each apparatus may transition into a state where the PDU session has been established. Alternatively, based on the completion of the procedure (B) in this procedure, each apparatus may recognize that this procedure has been rejected.

In addition, based on the completion of this procedure, each apparatus may take similar actions to the actions taken by the corresponding apparatus in the exemplar UE-initiated PDU session establishment procedure described earlier. In addition, based on the completion of this procedure, each apparatus may determine whether: a communication path through the second access has been added to a multi-access session that had already been established before the start of this procedure; a new multi-access session through the second access has been established; or a PDU session that can be configured as a multi-access session has been established through the second access.

For example, in a case where each apparatus has transmitted and/or received the same APN and/or IP address as that of the already-established multi-access session, each apparatus may recognize that a communication path through the second access has been added to the already-established multi-access session. In addition, in a case where each apparatus has transmitted and/or received an APN and/or an IP address that is different from its counterpart of the already-established multi-access session, each apparatus may recognize that a new multi-access session through the second access and/or a PDU session that can be configured as a multi-access session through the second access has been established.

In addition, the first-condition determination and/or the third-condition determination may be similar to the corresponding determinations in the case of the exemplar UE-initiated PDU session establishment procedure described earlier.

1.3.3. Attach Procedure Example

Figure 16:
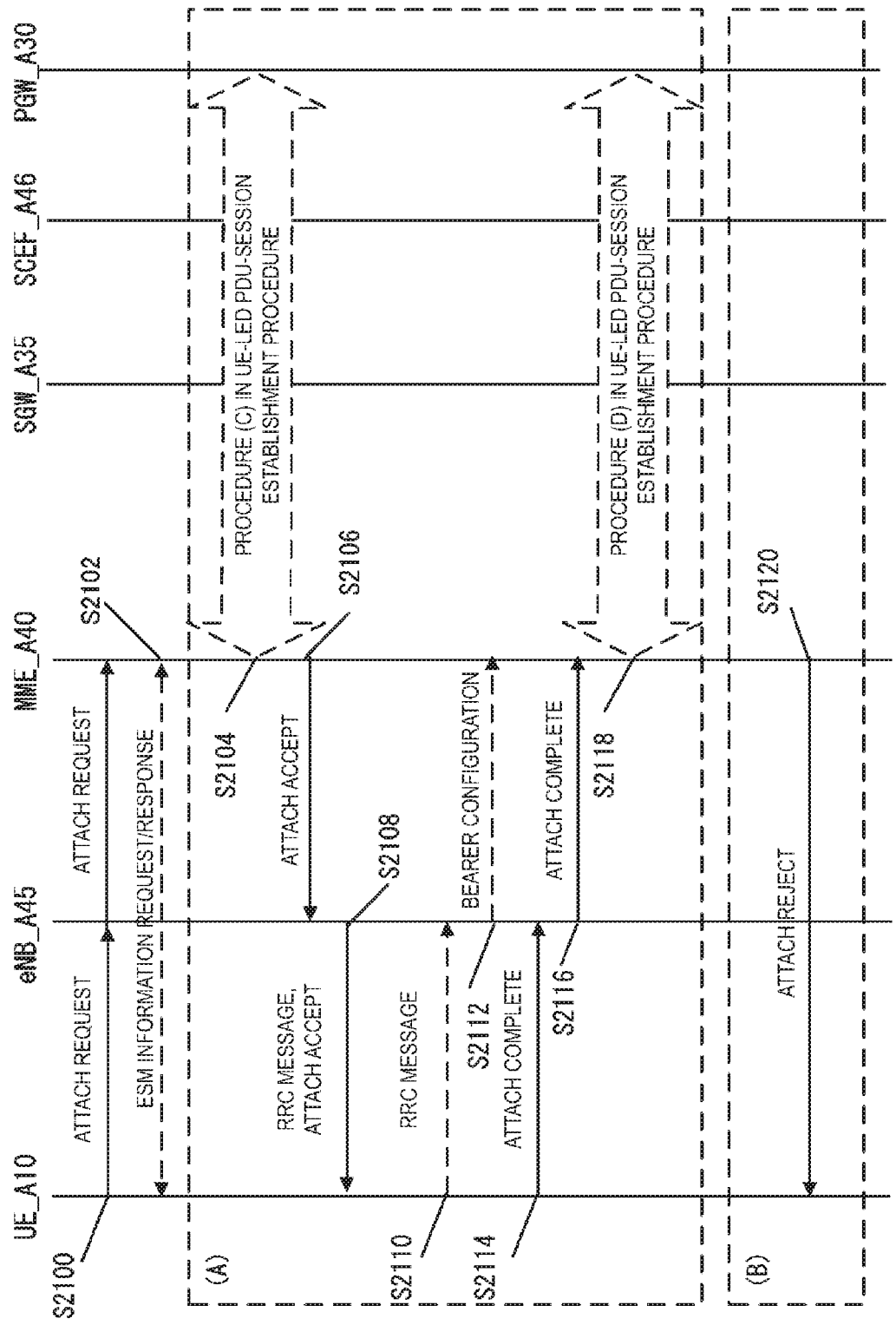
FIG. 16 is a diagram illustrating an attach procedure.

An exemplar procedure for performing the attach procedure will be described below with reference to FIG. 16. Each step of this procedure will be described below.

Firstly, the UE_A 10 transmits Attach request message to the MME_A 40 through the eNB_A 45 (S2100), and thus starts the attach procedure. The UE_A 10 may transmit the Attach request message by incorporating the PDU Session Establishment Request message described earlier into the Attach request message. By incorporating the PDU Session Establishment Request message, the UE_A 10 may request to perform the PDU session establishment procedure during the attach procedure.

Note that this procedure may be an exemplar attach procedure through the first access. Note that the UE_A 10 may incorporate, into the Attach request message, one or more pieces of the first identification information, the second identification information, the third identification information, the seventh identification information, the eighth identification information, the thirteenth identification information, and the fourteenth identification information. By incorporating these pieces of identification information into the Attach request message, the UE_A 10 may indicate that the UE_A 10 supports the establishment of a multi-access session and/or a PDU session that can be configured as a multi-access session.

In addition, the UE_A 10 may include one or more pieces of the twenty-fifth identification information, the twenty-sixth identification information, the twenty-seventh identification information, and the twenty-eighth identification information in the Attach request message. By including such pieces of identification information, the UE_A 10 may indicate that the UE_A 10 supports the Multihoming.

In addition, by transmitting and/or receiving one or more pieces of the first identification information, the second identification information, the seventh identification information, and the thirteenth identification information, the UE_A 10 may indicate that the apparatus supports the establishment of a first type multi-access session, may indicate that the UE_A 10 supports a communication performed by use of the Access Traffic Switching, and/or may indicate that the UE_A 10 supports a communication performed by use of the NBIFOM.

In addition, by transmitting and/or receiving one or more pieces of the first identification information, the second identification information, the seventh identification information, and the thirteenth identification information, each apparatus may indicate that the UE_A 10 supports the Access Traffic Switching, and/or may indicate that the UE_A 10 supports the establishment of a PDU session supporting the Access Traffic Switching.

In addition, by transmitting and/or receiving the thirteenth identification information, each apparatus may indicate a routing rule associated with an access capable of performing a communication by use of a first type multi-access session and/or a first type multi-access session that can be set by the UE_A 10.

In addition, by transmitting and/or receiving one or more pieces of the first identification information, the third identification information, the eighth identification information, and the fourteenth identification information, each apparatus may indicate that the UE_A 10 supports the establishment of a second type multi-access session and/or a PDU session that can be configured as a second type multi-access session, and/or may indicate that the UE_A 10 supports a communication using the Access Traffic Splitting and/or the MPTCP. In addition, by transmitting and/or receiving one or more pieces of the first identification information, the third identification information, the eighth identification information, and the fourteenth identification information, each apparatus may indicate that the apparatus supports the bundling of one or more PDU sessions and the considering of the bundled PDU sessions as a second type multi-access session.

In addition, by transmitting and/or receiving one or more pieces of the first identification information, the third identification information, the eighth identification information, and the fourteenth identification information, each apparatus may indicate that the UE_A 10 supports the Access Traffic Splitting and/or the MPTCP, and/or may indicate that the UE_A 10 supports the establishment of a PDU session supporting the Access Traffic Splitting.

In addition, by transmitting and/or receiving the fourteenth identification information, each apparatus may indicate that the apparatus supports the bundling of one or more PDU sessions and thus the considering of the bundled PDU sessions as a second type multi-access session. In addition, by transmitting and/or receiving the fourteenth identification information, each apparatus may indicate whether or not the Access Traffic Splitting and/or the MPTCP function can be performed for each of one or more flows, and/or may indicate a routing rule associated with a second type multi-access session that can be set by the UE_A 10. In addition, by transmitting and/or receiving the fourteenth identification information, each apparatus may indicate which communication of the flow is used to perform the Access Traffic Splitting function and/or the MPTCP function.

In addition, by transmitting and/or receiving the fourteenth identification information, each apparatus may indicate that UE_A 10 supports the start or the stop of the Access Traffic Splitting and/or the MPTCP function by use of a second type multi-access session, and/or may indicate that the UE_A 10 supports the start or the stop of the transmission and/or reception of user data by use of the Access Traffic Splitting and/or the MPTCP function.

In addition, by transmitting and/or receiving one or more pieces of the twenty-fifth identification information, the twenty-sixth identification information, the twenty-seventh identification information, and the twenty-eighth identification information, each apparatus may indicate that the UE_A 10 supports the Multihoming and/or that the UE_A 10 supports the transmission and/or reception of user data in the Multihoming environment.

In addition, by transmitting and/or receiving twenty-fifth identification information, each apparatus may indicate that the UE_A 10 supports the Session and Service Continuity in the SSC mode 3, and/or may indicate that the UE_A 10 supports the establishment of a PDU session supporting the SSC mode 3. In addition, by transmitting and/or receiving the twenty-fifth identification information, each apparatus may indicate the SSC mode that the UE_A 10 supports.

In addition, by transmitting and/or receiving the twenty-sixth identification information and/or the twenty-seventh identification information, each apparatus may indicate that the UE_A 10 supports the Multihoming using the IPv4 and/or the IPv6, and/or may indicate that the UE_A 10 supports the establishment of a PDU session supporting the Multihoming using the IPv4 and/or the IPv6. In addition, by transmitting and/or receiving the twenty-sixth identification information and/or the twenty-seventh identification information, each apparatus may indicate the type of the PDU session that the UE_A 10 supports when the Multihoming is performed.

In addition, by transmitting and/or receiving the twenty-eighth identification information, each apparatus may indicate a Default SSC mode that the UE_A 10 has, and/or may indicate the Default SSC mode that the UE_A 10 requests and/or supports.

Note that the UE_A 10 may transmit such pieces of identification information by incorporating them into a control message that is different from the Attach request message. For example, the UE_A 10 may transmit such pieces of identification information by incorporating them into an ESM information response message (S2102), which is a response message to an EPS Session Management (ESM) information request message.

Once the MME_A 40 receives the Attach request message and/or the ESM information response message, the MME_A 40 performs a first-condition determination. In a case where the first condition is true, the MME_A 40 starts the procedure (A) in this procedure. In contrast, in a case where the first condition is false, the MME_A 40 starts the procedure (B) in this procedure.

A description will be provided below about each step in the procedure (A) in this procedure. The MME_A 40 performs a fourth-condition determination to start the procedure (A) in this procedure. In the fourth-condition determination, the MME_A 40 determines whether the fourth condition is true or false. In a case where the fourth condition is true, the MME_A 40 starts the procedure (C) in the UE-initiated PDU session establishment procedure. In contrast, in a case where the fourth condition is false, the MME_A 40 omits the procedure (C) (S2104). In addition, based on the reception of the Attach request message and/or the create session response message, the MME_A 40 transmits an Attach accept message to the eNB_A 45 (S2106). Note that once the MME_A 40 has received the create session reject message, the MME_A 40 may discontinue the procedure (A) in this procedure and start the procedure (B) in this procedure.

The eNB_A 45 receives the Attach accept message, and transmits, to UE_A 10, an RRC message (which may be, for example, an RRC Connection Reconfiguration message, an RRC Connection Setup message, an RRC Direct Transfer message, or the like), and/or an Attach accept message (S2108). Note that the Attach accept message may be transmitted and/or received by being incorporated in an RRC message. In addition, in a case where the fourth condition is true, the MME_A 40 may transmit the Attach accept message by incorporating, into the Attach accept message, the PDU session establishment accept message described earlier. In addition, by incorporating the PDU session establishment accept message, the MME_A 40 may indicate that the PDU session establishment procedure has been accepted.

Note that the MME_A 40 may incorporate, into the Attach accept message, one or more pieces of the fourth identification information, the fifth identification information, the sixth identification information, the ninth identification information, the tenth identification information, the fifteenth identification information, and the sixteenth identification information. In addition, by incorporating such pieces of identification information, the MME_A 40 may indicate that the request from the UE_A 10 has been accepted, and/or may indicate that the network of the connection destination supports the establishment of a multi-access session and/or a PDU session that can be configured as a multi-access session. In addition, the MME_A 40 may indicate that the establishment of a multi-access session and/or the establishment of a PDU session that can be configured as a multi-access session is permitted.

In addition, the UE_A 10 may incorporate, into the Attach request message, one or more pieces of the twenty-ninth identification information, the thirtieth identification information, the thirty-first identification information, and the thirty-second identification information. By incorporating such pieces of identification information, the MME_A 40 may indicate that the request from the UE_A 10 has been accepted, and/or may indicate that the network supports the Multihoming.

In addition, by transmitting and/or receiving one or more pieces of the fourth identification information, the fifth identification information, the ninth identification information, and the fifteenth identification information, each apparatus may indicate that the network supports the establishment of a first type multi-access session, may indicate that the network supports a communication performed by use of the Access Traffic Switching, and/or may indicate that the network supports a communication performed by use of the NBIFOM.

In addition, by transmitting and/or receiving one or more pieces of the fourth identification information, the fifth identification information, the ninth identification information, and the fifteenth identification information, each apparatus may indicate that the network supports the Access Traffic Switching, and/or may indicate that the network supports the establishment of a PDU session supporting the Access Traffic Switching.

In addition, by transmitting and/or receiving the fifteenth identification information, each apparatus may indicate an access capable of performing a communication by use of a first type multi-access session, and/or may indicate a routing rule associated with a first type multi-access session that can be set by the network.

In addition, by transmitting and/or receiving one or more pieces of the fourth identification information, the sixth identification information, the tenth identification information, and the sixteenth identification information, each apparatus may indicate that the network supports the establishment of a second type multi-access session and/or a PDU session that can be configured as a second type multi-access session. In addition, each apparatus may indicate that the network supports a communication using the Access Traffic Splitting and/or the MPTCP. In addition, by transmitting and/or receiving one or more pieces of the fourth identification information, the sixth identification information, the tenth identification information, and the sixteenth identification information each apparatus may indicate that the apparatus supports the bundling of one or more PDU sessions and the considering of the bundled PDU sessions as a second type multi-access session.

In addition, by transmitting and/or receiving one or more pieces of the fourth identification information, the sixth identification information, the tenth identification information, and the sixteenth identification information, each apparatus may indicate that the network supports the Access Traffic Splitting and/or the MPTCP, and/or may indicate that the network supports the establishment of a PDU session supporting the Access Traffic Splitting.

In addition, by transmitting and/or receiving the sixteenth identification information, each apparatus may indicate whether or not the Access Traffic Splitting function can be performed for each of one or more flows, and/or may indicate a routing rule associated with a second type multi-access session that can be set by the network. In addition, transmitting and/or receiving the sixteenth identification information, each apparatus may indicate which communication of the flow is supported to perform the Access Traffic Splitting function and/or the MPTCP function.

In addition, by transmitting and/or receiving the sixteenth identification information, each apparatus may indicate that the apparatus supports the start or the stop of the Access Traffic Splitting and/or the MPTCP function by use of a second type multi-access session, and/or may indicate that the apparatus supports the start or the stop of the transmission and/or reception of user data by use of the Access Traffic Splitting and/or the MPTCP function.

In addition, by transmitting and/or receiving one or more pieces of the twenty-ninth identification information, the thirtieth identification information, the thirty-first identification information, and the thirty-second identification information, each apparatus may indicate that the network supports the Multihoming, and/or may indicate that the network supports the transmission and/or reception of user data in the Multihoming environment.

In addition, by transmitting and/or receiving twenty-ninth identification information, each apparatus may indicate that the network supports the Session and Service Continuity in the SSC mode 3, and/or may indicate that the network supports the establishment of a PDU session supporting the SSC mode 3. In addition, by transmitting and/or receiving the twenty-ninth identification information, each apparatus may indicate the SSC mode that the network supports.

In addition, by transmitting and/or receiving the thirtieth identification information and/or the thirty-first identification information, each apparatus may indicate that the network supports the Multihoming using the IPv4 and/or the IPv6, and/or may indicate that the network supports the establishment of a PDU session supporting the Multihoming using the IPv4 and/or the IPv6. In addition, by transmitting and/or receiving the thirtieth identification information and/or the thirty-first identification information, each apparatus may indicate the type of the PDU session that the network supports when the Multihoming is performed.

In addition, by transmitting and/or receiving the thirty-second identification information, each apparatus may indicate the Default SSC mode that the network has, and/or may indicate the Default SSC mode that the network requests and/or supports. In addition, by transmitting and/or receiving the thirty-second identification information, each apparatus may indicate the Default SSC mode that the network permits.

Note that the first-condition determination to the third-condition determination may be identical with the corresponding first-condition determination to the corresponding third-condition determination in the UE-initiated PDU session establishment procedure. In addition, the fourth-condition determination allows the MME_A 40 to determine whether or not to perform a PDU session establishment procedure. A true fourth condition corresponds to a case where the PDU Session Establishment Request message has been received, which may be a case where a UE-initiated PDU session establishment procedure is also performed during this procedure. In addition, a false fourth condition corresponds to a case where no PDU Session Establishment Request message has been received, which may be a case where no UE-initiated PDU session establishment procedure is performed in this procedure, and which may be a case where it is determined that the fourth condition is not true.

In a case where the UE_A 10 has received an RRC message from eNB_A 45, the UE_A 10 transmits an RRC connection message (which may be, for example, an RRC Connection Reconfiguration Complete message, an RRC Connection Setup Complete message, an RRC Direct Transfer message, or the like) to the eNB_A 45 (S2110). The eNB_A 45 receives an RRC message, and transmits a bearer configuration message to the MME_A 40 (S2112). Then, the MME_A 40 receives the bearer configuration message.

Once the UE_A 10 has received an Attach accept message from the MME_A 40 through the eNB_A 45, the UE_A 10 transmits an Attach complete message to the MME_A 40 through the eNB_A 45 (S2114) (S2116). Then, the MME_A 40 receives the Attach complete message. Then, in a case where the fourth condition is true, the MME_A 40 starts the procedure (D) in the UE-initiated PDU session establishment procedure (S2118). Based on the transmission and/or reception of the Attach complete message, and/or on the completion of the procedure (D) in the UE-initiated PDU session establishment procedure, each apparatus completes the procedure (A) in this procedure.

Note that once the UE_A 10 has received the PDU session establishment accept message, the UE_A 10 may transmit the Attach complete message by incorporating, into the Attach complete message, the PDU session establishment complete message described earlier. By incorporating the PDU session establishment complete message, the UE_A 10 may indicate that the PDU session establishment procedure is completed.

Next, a description will be provided below about each step in the procedure (B) in this procedure. The MME_A 40 transmits an Attach reject message to the UE_A 10 through the eNB_A 45, and thus starts the procedure (B) in this procedure (S2120). Then, the UE_A 10 receives the Attach reject message, and thus recognizes that the request from the UE_A 10 has been rejected. Based on the transmission and/or reception of the Attach reject message, each apparatus completes the procedure (B) in this procedure. Note that in a case where the fourth condition is true, the MME_A 40 may transmit the Attach reject message by incorporating, into the Attach reject message, the PDU session establishment reject message described earlier. In addition, by incorporating the PDU session establishment reject message, the MME_A 40 may indicate that the PDU session establishment procedure has been rejected. In this case, the UE_A 10 may further receive a PDU session establishment reject message, or may further authenticate that the PDU session establishment procedure has been rejected.

In addition, the MME_A 40 may incorporate, into the Attach reject message, one or more pieces of the eleventh identification information, the twelfth identification information, the seventeenth identification information, and the eighteenth identification information. By incorporating such pieces of identification information, the MME_A 40 may indicate that the request from the UE_A 10 has been rejected, and/or may indicate that the network of the connection destination does not support the establishment of a multi-access session and/or a PDU session that can be configured as a multi-access session. In addition, the MME_A 40 may indicate that the establishment of a multi-access session and/or a PDU session that can be configured as a multi-access session is not permitted.

In addition, by transmitting and/or receiving the eleventh identification information and/or the seventeenth identification information, each apparatus may indicate that the network does not support the establishment of a first type multi-access session. In addition, each apparatus may indicate that the network does not support a communication performed by use of the Access Traffic Switching, and/or may indicate that the network does not support a communication performed by use of the NBIFOM. In addition, each apparatus may notify of the reason why each request has been rejected.

In addition, by transmitting and/or receiving the twelfth identification information and/or the eighteenth identification information, each apparatus may indicate that the network does not support the establishment of a second type multi-access session and/or a PDU session that can be configured as a second type multi-access session. In addition, each apparatus may indicate that the network does not support a communication performed by use of the Access Traffic Splitting and/or the MPTCP. In addition, by transmitting and/or receiving the twelfth identification information and/or the eighteenth identification information, each apparatus may indicate that the network does not support the bundling of one or more PDU sessions and the considering of the bundled PDU sessions as a second type multi-access session. In addition, each apparatus may notify of the reason why each request has been rejected.

In addition, by transmitting and/or receiving the eighteenth identification information, each apparatus may indicate that the network does not support the implementation of at least one of the Access Traffic Splitting function and the MPTCP function for each of one or more flows. In addition, each apparatus may indicate that the network does not support the setting of a routing rule associated with a second type multi-access session. In addition, by transmitting and/or receiving the eighteenth identification information, each apparatus may indicate which communication of the flow is supported to perform the Access Traffic Splitting function and/or the MPTCP function.

In addition, by transmitting and/or receiving the eighteenth identification information, each apparatus may indicate that the network does not support the start or the stop of the Access Traffic Splitting and/or the MPTCP function by use of a second type multi-access session. In addition, each apparatus may indicate that the network does not support the start or the stop of the transmission and/or reception of user data by use of the Access Traffic Splitting and/or the MPTCP function.

Based on the completion of the procedure (A) or (B) in this procedure, each apparatus completes this procedure. Note that based on the completion of procedure (A) in this procedure, each apparatus may transition into a state where the UE_A is connected to the network and/or the into the registered state. Alternatively, based on the completion of the procedure (B) in this procedure, each apparatus may recognize that this procedure has been rejected. In addition, each apparatus may transition into each state based on the completion of this procedure and/or on the establishment of a PDU session.

In addition, based on the completion of this procedure, each apparatus may determine that it is possible to establish a multi-access session and/or a PDU session that can be configured as a multi-access session. To put it differently, in a case where each apparatus has transmitted and/or received one or more pieces of the fourth identification information, the fifth identification information, the sixth identification information, the ninth identification information, the tenth identification information, the fifteenth identification information, and the sixteenth identification information, each apparatus may determine that it is possible to establish a multi-access session and/or a PDU session that can be configured as a multi-access session. In contrast, in a case where each apparatus has transmitted and/or received one or more pieces of the eleventh identification information, the twelfth identification information, the seventeenth identification information, and the eighteenth identification information, each apparatus may determine that it is not possible to establish such sessions. In addition, by determining that it is possible to establish a multi-access session and/or a PDU session that can be configured as a multi-access session, each apparatus may determine that it is possible to perform a communication by use of a communication path through the first access and a communication path through the second access.

In addition, in a case where each apparatus has transmitted and/or received one or more pieces of the fourth identification information, the fifth identification information, the ninth identification information, and the fifteenth identification information, each apparatus may determine that it is possible to establish a first type multi-access session, and/or may determine that it is possible to establish a PDU session supporting the Access Traffic Switching. In addition, in a case where each apparatus has transmitted and/or received one or more pieces of the fourth identification information, the fifth identification information, the ninth identification information, and the fifteenth identification information, each apparatus may recognize that it is possible to establish a PDU session to which the Access Traffic Switching and/or the NBIFOM is applicable.

In addition, in a case where each apparatus has transmitted and/or received one or more pieces of the fourth identification information, the sixth identification information, the tenth identification information, and the sixteenth identification information, each apparatus may determine that it is possible to establish a second type multi-access session and/or a PDU session that can be configured as a second type multi-access session. In addition, each apparatus may determine that it is possible to establish a PDU session supporting the Access Traffic Splitting. In addition, in a case where each apparatus has transmitted and/or received one or more pieces of the fourth identification information, the sixth identification information, the tenth identification information, and the sixteenth identification information, each apparatus may recognize that it is possible to establish a PDU session to which the Access Traffic Splitting and/or the MPTCP is applicable.

In addition, in a case where each apparatus has transmitted and/or received the fifteenth identification information, each apparatus may recognize and store the access and/or the routing rule that is available in a first type multi-access session. In addition, in a case where each apparatus has transmitted and/or received the sixteenth identification information, each apparatus may recognize and store one or more of the following items: the information permitting the bundling of one or more PDU sessions and considering the bundled PDU sessions as a second type multi-access session; the information indicating whether or not it is possible to perform the Access Traffic Splitting and/or the MPTCP function for each of one or more flows of user data to be transmitted and/or received; and the routing rule available in the second type multi-access session. In addition, in a case where each apparatus has transmitted and/or received the sixteenth identification information, each apparatus may recognize which communication of the flow the Access Traffic Splitting function and/or the MPTCP function can be applied to.

In addition, in a case where each apparatus has transmitted and/or received the sixteenth identification information, each apparatus may start or stop the Access Traffic Splitting and/or the MPTCP function using a second type multi-access session, or may start or stop the transmission and/or reception of user data by use of the Access Traffic Splitting and/or the MPTCP function. In addition, in a case where each apparatus has transmitted and/or received the sixteenth identification information, each apparatus may transition into a state where the Access Traffic Splitting and/or the MPTCP function can be performed.

In addition, in a case where each apparatus has transmitted and/or received one or more pieces of the eleventh identification information, the twelfth identification information, the seventeenth identification information, and the eighteenth identification information, each apparatus may recognize the reason why the request from the UE_A 10 has been rejected. In addition, based on the reason why the request from the UE_A 10 has been rejected, each apparatus may perform this procedure for a second time.

In addition, in a case where each apparatus has transmitted and/or received one or more pieces of the twenty-fifth identification information, the twenty-sixth identification information, and the twenty-seventh identification information, each apparatus may authenticate that the UE_A 10 supports the Multihoming, and/or may authenticate the PDU session type supported by the UE_A 10 in the Multihoming. In a case where each apparatus has transmitted and/or received one or more pieces of the twenty-fifth identification information, the twenty-sixth identification information, and the twenty-seventh identification information, each apparatus may authenticate and store the fact that the UE_A 10 supports the Session and Service Continuity in the SSC mode 3, and/or may authenticate and store the SSC mode supported by the UE_A 10.

In addition, in a case where each apparatus has transmitted and/or received the twenty-eighth identification information, each apparatus may authenticate and store the Default SSC mode supported by the UE_A 10. In addition, each apparatus may set and/or change the Default SSC mode of the network to a mode indicated by the twenty-eighth identification information.

In addition, in a case where each apparatus has transmitted and/or received one or more pieces of the twenty-ninth identification information, the thirtieth identification information, and the thirty-first identification information, each apparatus may authenticate that the network supports the Multihoming, and/or may authenticate the PDU session type supported by the network in the Multihoming. In a case where each apparatus has transmitted and/or received one or more pieces of the twenty-ninth identification information, the thirtieth identification information, and the thirty-first identification information, each apparatus may authenticate and store the fact that the network supports the Session and Service Continuity in the SSC mode 3, and/or may authenticate and store the SSC mode supported by the network.

In addition, in a case where each apparatus has transmitted and/or received the thirty-second identification information, each apparatus may authenticate and store the Default SSC mode supported by the network. In addition, each apparatus may set and/or change the Default SSC mode of the UE_A 10 to a mode indicated by the thirty-second identification information.

In addition, the first-condition determination to the fourth-condition determination described earlier may be performed based on the identification information, the subscriber information, and/or the operator policy contained in the Attach request message. In addition, the criteria for the determination of the truth/falsehood of the first to the fourth conditions do not have to be limited to the ones described earlier.

For example, the first-condition determination and/or the third-condition determination may be similar to the corresponding determinations in the case of the exemplar UE-initiated PDU session establishment procedure described earlier. In addition, in a case where the network supports Multihoming and/or the Session and Service Continuity in the SSC mode 3, the first condition and/or the third condition may be true. Otherwise, the first condition and/or the third condition may be false. In addition, in a case where the network supports the Multihoming using the IPv4 and/or the IPv6, the first condition and/or the third condition may be true. Otherwise, the first condition and/or the third condition may be false. In addition, in a case where the Default SSC mode requested by the UE_A 10 is accepted, the first condition and/or the third condition may be true. In contrast, in a case where such Default SSC mode is rejected, the first condition and/or the third condition may be false. Note that the criteria for the determination of the first condition and/or the third condition are not limited to the ones described above.

1.3.3.1. Exemplar Attach Procedure through Second Access

Next, a description will be provided below about exemplar implementation of the attach procedure through the second access. Note that this procedure may be similar to the exemplar UE-initiated PDU session establishment procedure through the second access described earlier. Therefore, description of the steps will be omitted.

In addition, the UE_A 10 may incorporate, into the PDU Session Establishment Request message, and/or IKE_AUTH request message, one or more pieces of the twenty-fifth identification information, the twenty-sixth identification information, the twenty-seventh identification information, and the twenty-eighth identification information. By incorporating such pieces of identification information, the UE_A 10 may indicate that the UE_A 10 supports the Multihoming.

In addition, the TWAG_A 74 may incorporate, into the PDU session establishment accept message, one or more pieces of the twenty-ninth identification information, the thirtieth identification information, the thirty-first identification information, and the thirty-second identification information. By incorporating such pieces of identification information, the TWAG_A 74 may indicate that the request from the UE_A 10 has been accepted, and/or may indicate that the network supports the Multihoming.

In addition, the ePDG_A 65 may incorporate, into the IKE_AUTH response message, one or more pieces of the twenty-ninth identification information, the thirtieth identification information, the thirty-first identification information, and the thirty-second identification information. By incorporating such pieces of identification information, the ePDG_A 65 may indicate that the request from the UE_A 10 has been accepted, and/or may indicate that the network supports the Multihoming.

In addition, in a case where each apparatus has transmitted and/or received one or more pieces of the twenty-fifth identification information to the thirty-second identification information, each apparatus may take similar actions to the actions taken by the corresponding apparatus in the above-described exemplar attach procedure. Therefore, detailed description of the procedure will be omitted.

1.3.4. Exemplar Routing-Rule Update Procedure

Next, an exemplar routing-rule update procedure will be described below. This procedure is a procedure to update the routing rule for a multi-access session. Each apparatus can perform this procedure at any time as long as the UE_A 10 is connected to the core network_A 90 through multiple access networks and/or the UE_A 10 has established a multi-access session. To put it differently, each apparatus can start this procedure while the apparatus is in the first state. In addition, after the implementation of this procedure, each apparatus may transition into the second state. Note that once this procedure has been completed, each apparatus may be ready to permit the Access Traffic Switching in the multi-access session, and/or to permit the Access Traffic Splitting. In addition, by performing this procedure, each apparatus may bundle one or more PDU sessions and then consider the bundled PDU sessions as a second type multi-access session.

In addition, this procedure may be performed by being led by the UE_A 10 or by the network. For example, based on the detection of a change in the subscriber information and/or in the operator policy, the network may perform this procedure led by the network. Alternatively, based on the reception of a control message from the UE_A 10, the network may perform this procedure led by the network. Still alternatively, by detecting a change in the configuration and/or the state of the UE_A 10 itself, and/or by detecting a request from an application run by the UE_A 10, the UE_A 10 may perform this procedure led by the UE_A 10.

In addition, this procedure may be a procedure through the first access or may be a procedure through the second access. For example, in a case where each apparatus changes the routing rule and/or various configurations associated with the first access, the apparatus may perform this procedure through the first access. In a case where each apparatus changes the routing rule and/or various configurations associated with the second access, the apparatus may perform this procedure through the second access.

1.3.4.1. Exemplar Network-Led Routing-Rule Update Procedure

Figure 19:
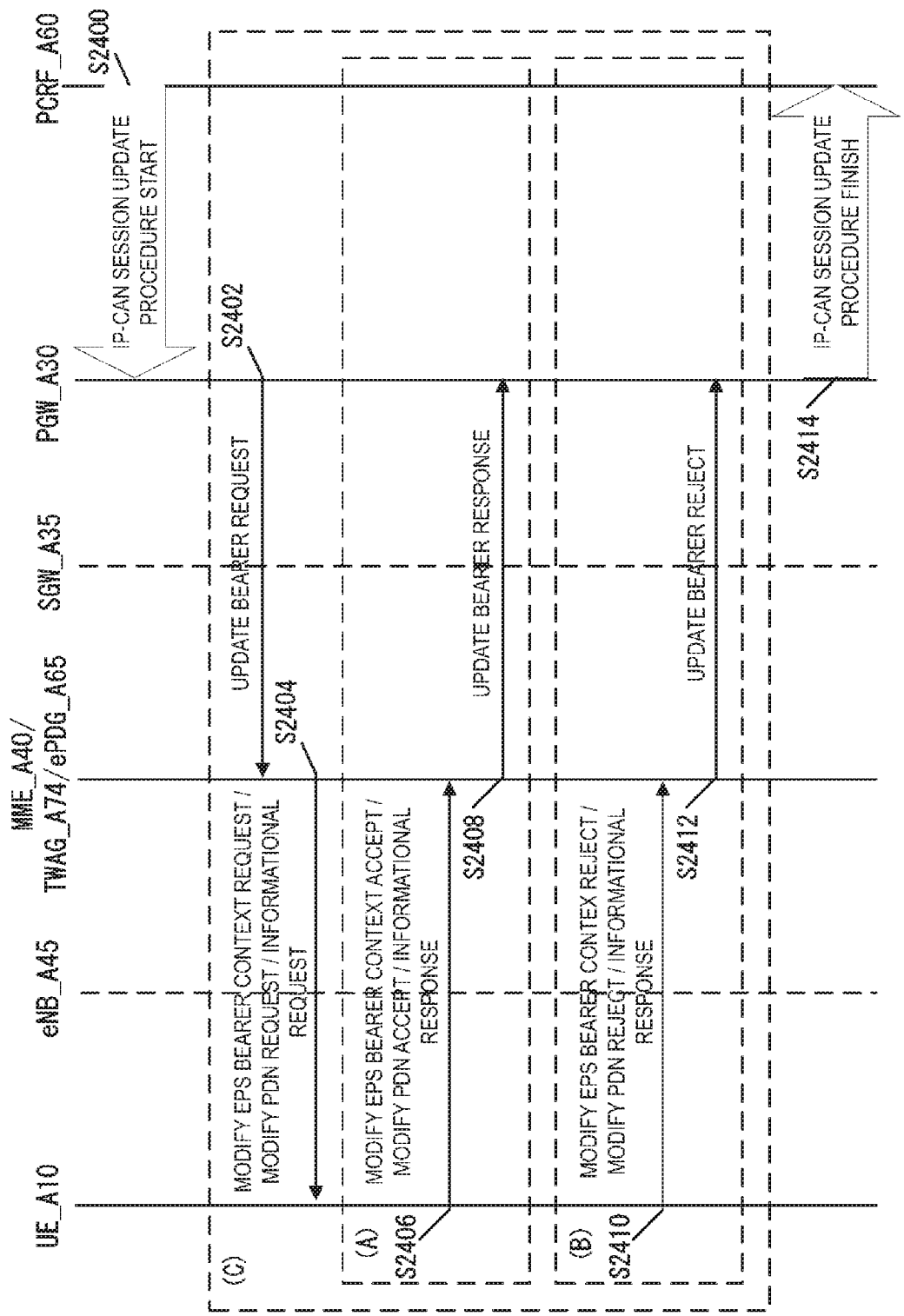
FIG. 19 is a diagram illustrating a network-led routing-rule update procedure.

A description will be provided below with reference to FIG. 19 about an exemplar procedure to perform a routing-rule update procedure led by the network. Each step of this procedure will be described below. Firstly, the PCRF_A 60, together with the PGW_A 30, starts an IP-CAN session update procedure (S2400). Specifically, the PCRF_A 60 transmits a request message in the IP-CAN session establishment procedure to the PGW_A 30. Then, the PGW_A 30 receives the request message in the IP-CAN session update procedure.

Note that the PCRF_A 60 may incorporate, into the request message in the IP-CAN session establishment procedure, at least the nineteenth identification information and/or the twentieth identification information. By incorporating such pieces of identification information, the PCRF_A 60 may request the updating of the routing rule, or may indicate the request from the network.

Then, the PGW_A 30 starts the procedure (C) in this procedure. A description will be provided below about each step in the procedure (C) in this procedure. The PGW_A 30 transmits an update bearer request message to one or more of the SGW_A 35, the TWAG_A 74, and the ePDG_A 65 to start the procedure (C) in this procedure (S2402). Then, that one or more of the SGW_A 35, the TWAG_A 74, and the ePDG_A 65 receive the update bearer request message. Note that the PGW_A 30 may select one or more destinations from the SGW_A 35, the TWAG_A 74, and the ePDG_A 65 based on a received bearer resource command message (to be described later) or on the context for the multi-access session held by the PGW_A 30 itself.

Note that the PGW_A 30 and/or the SGW_A 35 may incorporate, into the update bearer request message, at least one of the nineteenth identification information and the twentieth identification information. By incorporating such pieces of identification information, the PGW_A 30 and/or the SGW_A 35 may request an update of the routing rule or may indicate the request from the network.

Then, in a case where the SGW_A 35 has received the update bearer request message, the SGW_A 35 transmits an update bearer request message to the MME_A 40 (S2402). Then, the MME_A 40 receives the update bearer request message, and transmits an modify EPS bearer context request message to the UE_A 10 (S2404). In addition, in a case where the TWAG_A 74 has received the update bearer request message, the TWAG_A 74 transmits a PDN modification request message to the UE_A 10 (S2404). In addition, in a case where the ePDG_A 65 has received the update bearer request message, the ePDG_A 65 transmits an INFORMATIONAL request message to the UE_A 10 (S2404). Note that one or more of the modify EPS bearer context request message, the PDN modification request message, and the INFORMATIONAL request message may be update routing rule request messages.

Note that the MME_A 40 may incorporate, into the modify EPS bearer context request message, at least the nineteenth identification information and/or the twentieth identification information. By incorporating such pieces of identification information, the MME_A 40 may request the updating of the routing rule, or may indicate the request from the network.

In addition, the TWAG_A 74 may incorporate, into the PDN modification request message, at least the nineteenth identification information and/or the twentieth identification information. By incorporating such pieces of identification information, the TWAG_A 74 may request the updating of the routing rule, or may indicate the request from the network.

In addition, the ePDG_A 65 may incorporate, into the INFORMATIONAL request message, at least the nineteenth identification information and/or the twentieth identification information. By incorporating such pieces of identification information, the ePDG_A 65 may request the updating of the routing rule, or may indicate the request from the network.

In addition, by transmitting and/or receiving the nineteenth identification information, each apparatus may request the performing of the Access Traffic Switching function and/or the NBIFOM function in the multi-access session.

In addition, by transmitting and/or receiving the nineteenth identification information, each apparatus may request the setting or changing the access for performing a communication using a first type multi-access session, and/or may indicate the access type that is in effect after the setting or the change. Note that the access to be set or changed may be an access to be used in a communication of one or more flows that can be communicated by use of a first type multi-access session.

In addition, by transmitting and/or receiving the nineteenth identification information, each apparatus may request the setting or the changing of the routing rule associated with a first type multi-access session, or may indicate the routing rule to be associated with a first type multi-access session.

In addition, by transmitting and/or receiving the twentieth identification information, each apparatus may request to bundle one or more PDU sessions and thus consider the bundled PDU sessions as a second type multi-access session. In addition, by transmitting and/or receiving the twentieth identification information, each apparatus may indicate and/or identify each of the PDU sessions to be bundled.

In addition, by transmitting and/or receiving the twentieth identification information, each apparatus may request the performing of the Access Traffic Splitting function and/or the MPTCP function for the communication of one or more flows that can be communicated by use of a second type multi-access session. In addition, each apparatus may request the stopping of the Access Traffic Splitting function and/or the MPTCP function. In addition, by transmitting and/or receiving the twentieth identification information, each apparatus may indicate which communication of the flow is used to perform the Access Traffic Splitting function and/or the MPTCP function. In addition to or in lieu of this, by transmitting and/or receiving the twentieth identification information, each apparatus may request the starting or the stopping of the Access Traffic Splitting function and/or the MPTCP function using multiple PDU sessions, and/or multiple communication paths, and/or may request the starting or the stopping of the user-data transmission and/or reception by use of the Access Traffic Splitting function and/or the MPTCP function.

In addition, by transmitting and/or receiving twentieth identification information, each apparatus may request the setting or the changing of the routing rule associated with a second type multi-access session, or may indicate the routing rule to be associated with a second type multi-access session.

Then, the UE_A 10 receives one or more of the modify EPS bearer context request message, the PDN modification request message, and the INFORMATIONAL request message, and determines a fifth condition. In a case where the fifth condition is true, the UE_A 10 starts the procedure (A) in this procedure. In contrast, in a case where the fifth condition is false, the UE_A 10 starts the procedure (B) in this procedure.

The fifth-condition determination described above allows the UE_A 10 to determine whether the UE_A 10 will or will not accept the request from the network. A true fifth condition corresponds to a case where the request from the network is accepted, which may be a case where the request from the network is permitted. In addition, a false fifth condition corresponds to a case where the request from the network is rejected, which may be a case where it is not determined that the fifth condition is true.

Specifically, the fifth-condition determination allows the UE_A 10 to determine whether or not to accept the request for the routing-rule update procedure. A true fifth condition may correspond to a case where the UE_A 10 permits the updating of the routing rule, whereas a false fifth condition may correspond to a case where the UE_A 10 does not permit the updating of the routing rule.

For example, in a case where the network requests the updating of the routing rule and the UE_A 10 permits the request, the fifth condition may be true. In contrast, in a case where the network requests the updating of the routing rule but the UE_A 10 does not permit the request, the fifth condition may be false. In addition, in a case where the UE_A 10 does not support the updating of the routing rule, the fifth condition may be false.

Specifically, in a case the request by the network for the updating of the routing rule for the first type and/or the second type multi-access session is accepted, the fifth condition may be true, but otherwise, the fifth condition may be false.

In addition, the fifth condition may be true in a case where the request, from the network, for the access type and/or the routing rule to be used in the multi-access session is accepted. Otherwise, the fifth condition may be false.

In addition, the fifth condition may be true in a case where the request, from the network, for whether or not to enable one or more of the Access Traffic Switching function, the NBIFOM function, the Access Traffic Splitting function, and the MPTCP function is accepted. Otherwise, the fifth condition may be false.

In addition, the fifth may be true in a case where the request for the bundling of one or more PDU sessions and the considering of the bundled PDU sessions as a second type multi-access session is accepted. Otherwise, the fifth condition may be false.

A description will be provided below about each step in the procedure (A) in this procedure. The UE_A 10 transmits a response message for acceptance to the source of the control message, and thus starts the procedure (A) in this procedure (S2406). Specifically, in a case where the UE_A 10 has received a modify EPS bearer context request message, the UE_A 10 transmits an modify EPS bearer context accept message to the MME_A 40 (S2406). Then, the MME_A 40 receives the modify EPS bearer context accept message. In addition, in a case where the UE_A 10 has received a PDN modification request message, the UE_A 10 transmits a PDN modification accept message to the TWAG_A 74 (S2406). Then, the TWAG_A 74 receives the PDN modification accept message. In addition, in a case where the UE_A 10 has received an INFORMATIONAL request message, the UE_A 10 transmits an INFORMATIONAL response message to the ePDG_A 65 (S2406). Then, the ePDG_A 65 receives the INFORMATIONAL response message. Note that one or more of the modify EPS bearer context accept message, the PDN modification accept message, and the INFORMATIONAL response message may be update routing rule request messages.

Note that the UE_A 10 may incorporate the twenty-first identification information and/or the twenty-second identification information into one or more pieces of the modify EPS bearer context accept message, the PDN modification accept message and the INFORMATIONAL response message. By incorporating such pieces of identification information, the UE_A 10 may indicate that the updating of the routing rule and/or the request from the network is permitted.

In addition, by transmitting and/or receiving the twenty-first identification information, each apparatus may indicate that the Access Traffic Switching function and/or the NBIFOM function is performed in the multi-access session.

In addition, by transmitting and/or receiving the twenty-first identification information, each apparatus may indicate that the setting or the changing of the access for performing a communication using a first type multi-access session has been permitted, and/or may indicate the access type that is in effect after the setting or the change. Note that the access to be set or changed may be an access to be used in a communication of one or more flows that can be communicated by use of a first type multi-access session.

In addition, by transmitting and/or receiving the twenty-first identification information, each apparatus may indicate that the setting or the changing of the routing rule associated with a first type multi-access session has been permitted, or may indicate the routing rule associated with a first type multi-access session.

In addition, by transmitting and/or receiving the twenty-second identification information, each apparatus may indicate that bundling one or more PDU sessions and then considering the bundled PDU sessions as a second type multi-access session has been permitted. In addition, by transmitting and/or receiving the twenty-second identification information, each apparatus may indicate and/or identify the multi-access session.

In addition, by transmitting and/or receiving the twenty-second identification information, each apparatus may indicate that the performing of the Access Traffic Splitting function and/or the MPTCP function has been permitted for the communication of one or more flows that can be communicated by use of a second type multi-access session. In addition, each apparatus may indicate that the stopping of the Access Traffic Splitting function and/or the MPTCP function is permitted. In addition, by transmitting and/or receiving the twenty-second identification information, each apparatus may indicate which communication of the flow is used to perform the Access Traffic Splitting function and/or the MPTCP function. In addition to or in lieu of this, by transmitting and/or receiving the twenty-second identification information, each apparatus may request the starting or the stopping of the Access Traffic Splitting function and/or the MPTCP function using multiple PDU sessions, and/or multiple communication paths, and/or may indicate that the starting or the stopping of the user-data transmission and/or reception by use of the Access Traffic Splitting function and/or the MPTCP function has been permitted.

In addition, by transmitting and/or receiving the twenty-second identification information, each apparatus may indicate that the setting or the changing of the routing rule associated with a second type multi-access session has been permitted, or may indicate the routing rule associated with a second type multi-access session.

Then, in a case where the MME_A 40 has received the modify EPS bearer context accept message, the MME_A 40 transmits an update bearer response message to the SGW_A 35 (S2408). Then, the SGW_A 35 receives the update bearer response message, and then the SGW_A 35 transmits an update bearer response message to the PGW_A 30 (S2408). In addition, in a case where the TWAG_A 74 has received a PDN modification accept message, the TWAG_A 74 transmits an update bearer response message to the PGW_A 30 (S2408). In addition, in a case where the ePDG_A 65 has received an INFORMATIONAL response message, the ePDG_A 65 transmits an update bearer response message to the PGW_A 30 (S2408). Then, the PGW_A 30 receives the update bearer response message. Based on the transmission and/or reception of the update bearer response message, each apparatus completes the procedure (A) in this procedure.

Note that one or more of the MME_A 40, the SGW_A 35, the TWAG_A 74, and the ePDG_A 65 may incorporate, into the update bearer response message, one or both of the twenty-first identification information, and the twenty-second identification information. By incorporating such pieces of identification information, that one or more of the MME_A 40, the SGW_A 35, the TWAG_A 74, and the ePDG_A 65 may indicate that the updating of the routing rule and/or the request from the network has been permitted.

Next, a description will be provided below about each step in the procedure (B) in this procedure. The UE_A 10 transmits a response message for rejection to the source of the control message, and thus starts the procedure (B) in this procedure (S2410). Specifically, in a case where the UE_A 10 has received a modify EPS bearer context request message, the UE_A 10 transmits a modify EPS bearer context reject message to the MME_A 40 (S2410). Then, the MME_A 40 receives the modify EPS bearer context reject message. In addition, in a case where the UE_A 10 has received a PDN modification request message, the UE_A 10 transmits a modify PDN reject message to the TWAG_A 74 (S2410). Then, the TWAG_A 74 receives the modify PDN reject message. In addition, in a case where the UE_A 10 has received an INFORMATIONAL request message, the UE_A 10 transmits an INFORMATIONAL response message to the ePDG_A 65 (S2410). Then, the ePDG_A 65 receives the INFORMATIONAL response message. Note that one or more of the modify EPS bearer context reject message, the modify PDN reject message, and the INFORMATIONAL request message may be update routing rule response messages.

Note that the UE_A 10 may incorporate the twenty-third identification information and/or the twenty-fourth identification information into one or more pieces of the modify EPS bearer context reject message, the modify PDN reject message and the INFORMATIONAL response message. By incorporating such pieces of identification information, the UE_A 10 may indicate that the updating of the routing rule and/or the request from the network is permitted.

In addition, by transmitting and/or receiving the twenty-third identification information, each apparatus may indicate that the performing of the Access Traffic Switching function and/or the NBIFOM function is not permitted in the multi-access session.

In addition, by transmitting and/or receiving the twenty-third identification information, each apparatus may indicate that the request for the setting or the changing of the access for performing a communication using a first type multi-access session has been rejected. In addition, each apparatus may indicate that the request has been rejected for the setting or the changing of the access to be used in the communication of one or more flows that can be communicated by use of a first type multi-access session.

In addition, by transmitting and/or receiving the twenty-third identification information, each apparatus may indicate that the request has been rejected for the setting or the changing of the routing rule associated with a first type multi-access session. In addition, each apparatus may notify of the reason why each request has been rejected.

In addition, by transmitting and/or receiving the twenty-third identification information, each apparatus may indicate that the setting or the changing of the access for performing a communication using a first type multi-access session has not been permitted, and/or may indicate that the setting or the changing of a routing rule associated with the first type multi-access session has not been permitted.

In addition, by transmitting and/or receiving the twenty-fourth identification information, each apparatus may indicate that the request has been rejected for the bundling of one or more PDU sessions and then the considering of the bundled PDU sessions as a second type multi-access session. In addition, by transmitting and/or receiving the twenty-fourth identification information, each apparatus may notify of the reason why the request has been rejected for the bundling of one or more PDU sessions and then the considering of the bundled PDU sessions as a second type multi-access session.

In addition, by transmitting and/or receiving the twenty-fourth identification information, each apparatus may indicate that the request has been rejected for the performing of the Access Traffic Splitting function and/or the MPTCP function for the communication of one or more flows that can be communicated by use of a second type multi-access session. In addition, each apparatus may indicate that the request has been rejected for the stopping of the Access Traffic Splitting function and/or the MPTCP function. In addition, by transmitting and/or receiving the twenty-fourth identification information, each apparatus may indicate which communication of the flow is not used to perform the Access Traffic Splitting function and/or the MPTCP function. In addition to or in lieu of this, by transmitting and/or receiving the twenty-fourth identification information, each apparatus may indicate that the request has been rejected for the starting or the stopping of the Access Traffic Splitting function and/or the MPTCP function using multiple PDU sessions and/or multiple communication paths. In addition, each apparatus may indicate that the request for the starting or the stopping of the user-data transmission and/or reception by use of the Access Traffic Splitting function and/or the MPTCP function has been rejected.

In addition, by transmitting and/or receiving the twenty-fourth identification information, each apparatus may indicate that the request has been rejected for the setting or the changing of the routing rule associated with a second type multi-access session. In addition, each apparatus may notify of the reason why each request has been rejected.

In addition, by transmitting and/or receiving the twenty-fourth identification information, each apparatus may indicate that no implementation of the Access Traffic Splitting function is permitted for each flow, and/or may indicate that no setting or no changing of a routing rule associated with a second type multi-access session has been permitted.

Then, in a case where the MME_A 40 has received the modify EPS bearer context reject message, the MME_A 40 transmits an update bearer reject message to the SGW_A 35 (S2412). Then, the SGW_A 35 receives the update bearer reject message, and then the SGW_A 35 transmits an update bearer reject message to the PGW_A 30 (S2412). In addition, in a case where the TWAG_A 74 has received a modify PDN reject message, the TWAG_A 74 transmits an update bearer reject message to the PGW_A 30 (S2412). In addition, in a case where the ePDG_A 65 has received an INFORMATIONAL response message, the ePDG_A 65 transmits an update bearer reject message to the PGW_A 30 (S2412). Then, the PGW_A 30 receives the update bearer reject message. Based on the transmission and/or reception of the update bearer reject message, each apparatus completes the procedure (B) in this procedure. Note that the update bearer reject message may be an update bearer response message containing a Reject cause.

Note that one or more of the MME_A 40, the SGW_A 35, the TWAG_A 74, and the ePDG_A 65 may incorporate, into the update bearer reject message, one or both of the twenty-third identification information, and the twenty-fourth identification information. By incorporating such pieces of identification information, that one or more of the MME_A 40, the SGW_A 35, the TWAG_A 74, and the ePDG_A 65 may indicate that the updating of the routing rule and/or the request from the network has not been permitted.

Based on the completion of the procedure (A) and/or the procedure (B) in this procedure, each apparatus completes the procedure (C) in this procedure. Based on the completion of the procedure (C) in this procedure, the PGW_A 30 completes the IP-CAN session update procedure (S2414). Specifically, the PGW_A 30 transmits, to the PCRF_A 60, a response message in the IP-CAN session update procedure, and thus completes the IP-CAN session update procedure. Then, the PCRF_A 60 receives the response message in the IP-CAN session update procedure.

Note that the PGW_A 30 may incorporate the twenty-first identification information and/or the twenty-second identification information into the response message in the IP-CAN session establishment procedure. By incorporating such pieces of identification information, PGW_A 30 may indicate that the request for the updating of the routing rule and/or the request from the network has been permitted.

In addition, the PGW_A 30 may incorporate the twenty-third identification information and/or the twenty-fourth identification information into the response message in the IP-CAN session establishment procedure. By incorporating such pieces of identification information, PGW_A 30 may indicate that the request for the updating of the routing rule and/or the request from the network has not been permitted.

Note that in a case where the already-established multi-access session and/or the PGW_A 30 does not use the PCRF_A 60, the IP-CAN session update procedure may be omitted (S2400) (S2414). In such a case, this procedure is not a procedure led by the PCRF_A 60, but may be a procedure led by PGW_A 30, and the roles that the PCRF_A 60 would otherwise take on may be taken on by the PGW_A 30.

Based on the completion of the procedure (C) in this procedure and/or on the completion of the IP-CAN session update procedure, each apparatus completes this procedure. Note that based on the completion of procedure (A) in this procedure, each apparatus may recognize that this procedure has been accepted. Alternatively, based on the completion of the procedure (B) in this procedure, each apparatus may recognize that this procedure has been rejected.

Based on the completion of this procedure, each apparatus may update the routing rule associated with the multi-access session, but each apparatus does not have to update the routing role. To put it differently, in a case where each apparatus has received the twenty-first identification information and/or twenty-second identification information, the apparatus may update the routing rule associated with a multi-access session. In addition, in a case where each apparatus has received the twenty-third identification information and/or twenty-fourth identification information, the apparatus may update the routing rule associated with a multi-access session.

In addition, in a case where each apparatus has transmitted and/or received the twenty-first identification information, the apparatus may perform the Access Traffic Switching function and/or the NBIFOM function in the multi-access session. In addition, in a case where each apparatus has transmitted and/or received the twenty-first identification information, the apparatus may recognize that the access for performing a communication using a first type multi-access session has been set or changed. In addition, each apparatus may recognize the access that is in effect after the setting or the change.

In addition, in a case where each apparatus has transmitted and/or received the twenty-first identification information, the apparatus may recognize that the routing rule associated with a first type multi-access session has been set or changed, or may recognize and store the routing rule associated with a first type multi-access session.

In addition, in a case where each apparatus has transmitted and/or received the twenty-second identification information, the apparatus may recognize that one or more PDU sessions can be bundled together and the bundled PDU sessions can be considered as a second type multi-access session. In addition, in a case where each apparatus has transmitted and/or received the twenty-second identification information, the apparatus may identify the multi-access session.

In addition, in a case where each apparatus has transmitted and/or received the twenty-second identification information, the apparatus may perform or may stop the Access Traffic Splitting function and/or the MPTCP function for the communication of one or more flows that can be communicated by use of a second type multi-access session. In addition, in a case where each apparatus has transmitted and/or received the twenty-second identification information, the apparatus may recognize which communication of the flow the Access Traffic Splitting function and/or the MPTCP function can be applied to. In addition to or in lieu of this, in a case where each apparatus has transmitted and/or received the twenty-second identification information, each apparatus may start or stop the Access Traffic Splitting function and/or the MPTCP function using multiple PDU sessions, and/or multiple communication paths. In addition, each apparatus may start or stop the user-data transmission and/or reception by use of the Access Traffic Splitting function and/or the MPTCP function.

In addition, in a case where each apparatus has transmitted and/or received the twenty-second identification information, the apparatus may recognize that the routing rule associated with a second type multi-access session has been set or changed, or may recognize and store the routing rule associated with a second type multi-access session.

In addition, in a case where each apparatus has transmitted and/or received the twenty-third identification information, the apparatus may determine that it is not possible to perform the Access Traffic Switching function and/or the NBIFOM function for a multi-access session, and/or may recognize that the access for performing a communication using a first type multi-access session has not been set or changed.

In addition, in a case where each apparatus has transmitted and/or received the twenty-third identification information, the apparatus may recognize that the routing rule associated with a first type multi-access session has not been set or changed.

In addition, in a case where each apparatus has transmitted and/or received the twenty-fourth identification information, the apparatus may determine that one or more PDU sessions that have been bundled together cannot be considered as a second type multi-access session.

In addition, in a case where each apparatus has transmitted and/or received the twenty-fourth identification information, the apparatus may determine that it is not possible to perform or stop the Access Traffic Splitting function and/or the MPTCP function for the communication of one or more flows that can be communicated by use of a second type multi-access session. In addition, the apparatus may recognize which communication of the flow the Access Traffic Splitting function and/or the MPTCP function cannot be applied to. In addition to or in lieu of this, in a case where each apparatus has transmitted and/or received the twenty-fourth identification information, the apparatus may determine that the Access Traffic Splitting function and/or the MPTCP function using multiple PDU sessions and/or multiple communication paths cannot be started or stopped. In addition, the apparatus may determine that the user-data transmission and/or reception by use of the Access Traffic Splitting function and/or the MPTCP function cannot be started or stopped.

In addition, in a case where each apparatus has transmitted and/or received the twenty-fourth identification information, the apparatus may recognize that the routing rule associated with a second type multi-access session has not been set or changed.

1.3.4.2. Exemplar UE-Initiated Routing-Rule Update Procedure

Figure 20:
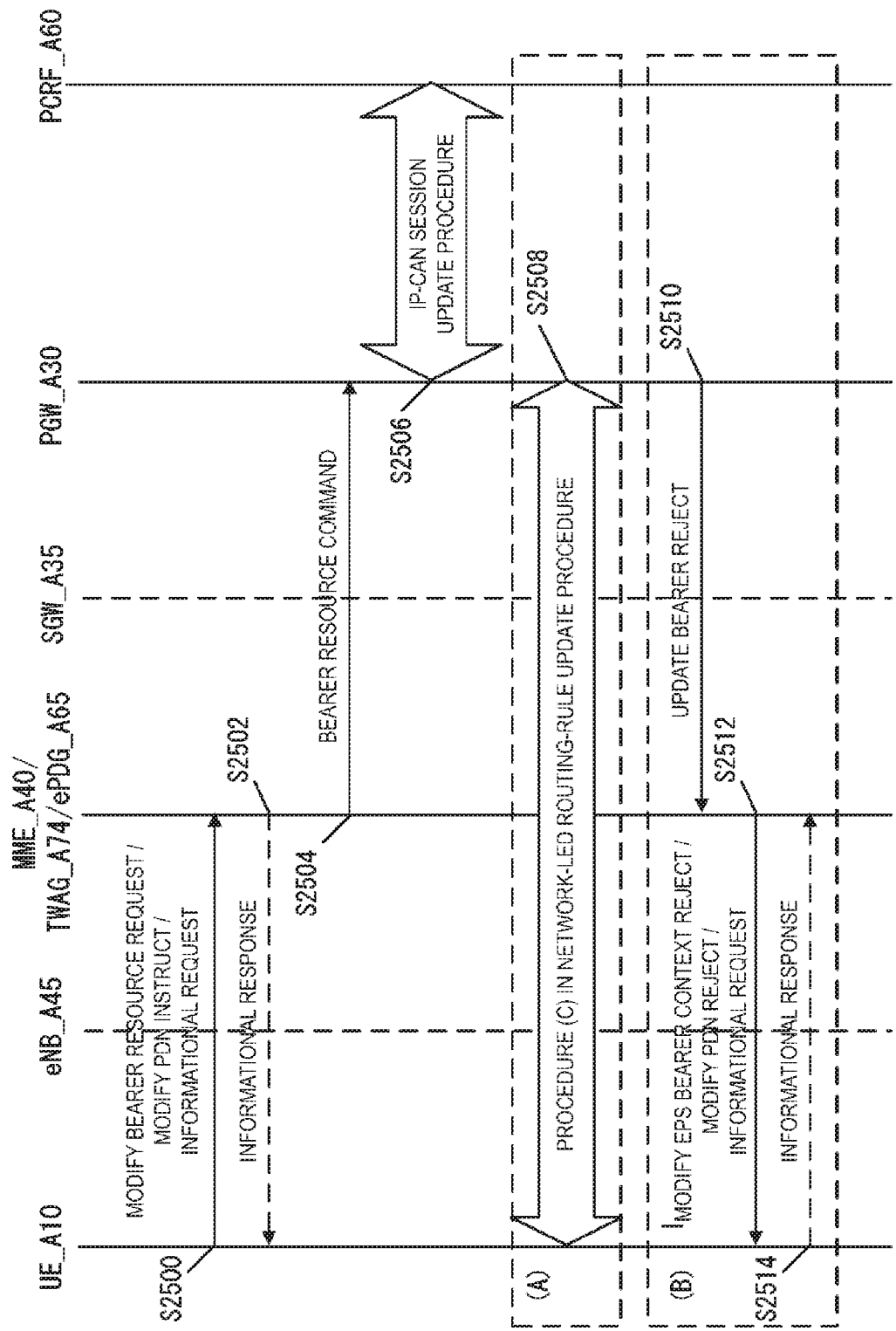
FIG. 20 is a diagram illustrating a UE-initiated routing-rule update procedure.

A description will be provided below with reference to FIG. 20 about an exemplar procedure to perform a routing-rule update procedure led by the UE_A 10. Each step of this procedure will be described below. Firstly, the UE_A 10 transmits a control message to an apparatus in an access network that has established a multi-access session and/or to an apparatus in the core network_A 90, and thus starts the UE-initiated routing-rule update procedure (S2500).

Specifically, in a case where the multi-access session has been established through the first access, the UE_A 10 may transmit a modify bearer resource request message to the MME_A 40 (S2500). Then, the MME_A 40 may receive the modify bearer resource request message. In addition, in a case where the multi-access session has been established through the second access and/or the WLAN ANa 70, the UE_A 10 may transmit a PDN modification indication message to the TWAG_A 74. Then, the TWAG_A 74 may receive the PDN modification indication message. In addition, in a case where the multi-access session has been established through the second access and/or the WLAN ANb 65, the UE_A 10 may transmit an INFORMATIONAL request message to the ePDG_A 65. Then, the ePDG_A 65 may receive the INFORMATIONAL request message and then may transmit an INFORMATIONAL response message to the UE_A 10. Note that one or more of the modify bearer resource request message, the PDN modification indication message, and the INFORMATIONAL request message may be update routing rule request messages.

Note that the UE_A 10 may incorporate the thirteenth identification information and/or the fourteenth identification information into one or more of the modify bearer resource request message, the PDN modification indication message, and the INFORMATIONAL request message. By incorporating such pieces of identification information, the UE_10 may request a routing-rule update or may indicate the request from the UE_A 10.

In addition, by transmitting and/or receiving the thirteenth identification information, each apparatus may request the performing of the Access Traffic Switching function and/or the NBIFOM function in the multi-access session.

In addition, by transmitting and/or receiving the thirteenth identification information, each apparatus may request the setting or changing the access for performing a communication using a first type multi-access session, and/or may indicate the access type that is in effect after the setting or the change. Note that the access to be set or changed may be an access to be used in a communication of one or more flows that can be communicated by use of a first type multi-access session.

In addition, by transmitting and/or receiving the thirteenth identification information, each apparatus may request the setting or the changing of the routing rule associated with a first type multi-access session, or may indicate the routing rule to be associated with a first type multi-access session.

In addition, by receiving the fourteenth identification information, each apparatus may request to bundle one or more PDU sessions and thus consider the bundled PDU sessions as a second type multi-access session. In addition, by transmitting and/or receiving the fourteenth identification information, each apparatus may indicate and/or identify each of the PDU sessions to be bundled.

In addition, by transmitting and/or receiving the fourteenth identification information, each apparatus may request the performing of the Access Traffic Splitting function and/or the MPTCP function for the communication of one or more flows that can be communicated by use of a second type multi-access session. In addition, each apparatus may request the stopping of the Access Traffic Splitting function and/or the MPTCP function. In addition, by transmitting and/or receiving the fourteenth identification information, each apparatus may indicate which communication of the flow is used to perform the Access Traffic Splitting function and/or the MPTCP function. In addition to or in lieu of this, by transmitting and/or receiving the fourteenth identification information, each apparatus may request the starting or the stopping of the Access Traffic Splitting function and/or the MPTCP function using multiple PDU sessions, and/or multiple communication paths, and/or may request the starting or the stopping of the user-data transmission and/or reception by use of the Access Traffic Splitting function and/or the MPTCP function.

In addition, by transmitting and/or receiving the fourteenth identification information, each apparatus may request the setting or the changing of the routing rule associated with a second type multi-access session, or may indicate the routing rule to be associated with a second type multi-access session.

Then, in a case where the MME_A 40 has received the modify bearer resource request message, the MME_A 40 transmits a bearer resource command message to the SGW_A 35 (S2504). Then, the SGW_A 35 receives the bearer resource command message, and transmits a bearer resource command message to the PGW_A 30 (S2504). In addition, in a case where the TWAG_A 74 has received the PDN modification indication message, the TWAG_A 74 transmits a bearer resource command message to the PGW_A 30 (S2504). In addition, in a case where the ePDG_A 65 has received the INFORMATIONAL request message, the ePDG_A 65 transmits a bearer resource command message to the PGW_A 30 (S2504).

Note that one or more of the MME_A 40, the SGW_A 35, the TWAG_A 74, and the ePDG_A 65 may incorporate the thirteenth identification information and/or the fourteenth identification information into the bearer resource command message. By incorporating such pieces of identification information, that one or more of the MME_A 40, the SGW_A 35, the TWAG_A 74, and the ePDG_A 65 may request an update of the routing rule, and/or may indicate the request from the UE_A 10.

The PGW_A 30 receives the bearer resource command message, and together with the PCRF_A 60, performs an IP-CAN session update procedure (S2506). Specifically, the PGW_A 30 transmits, to the PCRF_A 60, a request message in the IP-CAN session update procedure. Then, once the PCRF_A 60 receives the request message in the IP-CAN session update procedure, the PCRF_A 60 performs a sixth-condition determination. In addition, the PCRF_A 60 transmits, to the PGW_A 30, a response message in the IP-CAN session update procedure. Then, once the PGW_A 30 receives the response message in the IP-CAN session update procedure, the PGW_A 30 recognizes the result of the sixth-condition determination.

The sixth-condition determination described above allows the network to determine whether the network will or will not accept the request from the UE_A 10. A true sixth condition corresponds to a case where the request from the UE_A 10 will be accepted, which may be a case where the request from the UE_A 10 is permitted. In contrast, a false sixth condition corresponds to a case where the request from the UE_A 10 will be rejected, which may be a case where it is determined that the sixth condition is not true.

For example, in a case where the UE_A 10 requests a routing-rule update and the network permits the request, the sixth condition may be true. In addition, in a case where the UE_A 10 requests a routing-rule update and the network does not permit the request, the sixth condition may be false. In addition, in a case where the network of the connection destination of the UE_A 10 and/or an apparatus in the network do not support the updating of the routing rule, the sixth condition may be false.

Specifically, in a case the request by the UE_A 10 for the updating of the routing rule for the first type and/or the second type multi-access session is accepted, the sixth condition may be true, but otherwise, the sixth condition may be false.

In addition, the sixth condition may be true in a case where the request, from the UE_A 10, for the access type and/or the routing rule to be used in the multi-access session is accepted. Otherwise, the sixth condition may be false.

In addition, the sixth condition may be true in a case where the request, from the UE_A 10, for whether or not to enable one or more of the Access Traffic Switching function, the NBIFOM function, the Access Traffic Splitting function, and the MPTCP function is accepted. Otherwise, the sixth condition may be false.

In addition, the sixth may be true in a case where the request for the bundling of one or more PDU sessions and the considering of the bundled PDU sessions as a second type multi-access session is accepted. Otherwise, the sixth condition may be false.

Note that the PGW_A 30 may incorporate the thirteenth identification information and/or the fourteenth identification information into the request message in the IP-CAN session update procedure. By incorporating such pieces of identification information, the PGW_A 30 may request the updating of the routing rule, or may indicate the request from the UE_A 10.

In addition, the PCRF_A 60 may incorporate at least the result of the sixth-condition determination into the response message in the IP-CAN session update procedure. Thus, by the incorporation of this result, the PCRF_A 60 may notify the PGW_A 30 of the result of the sixth-condition determination.

In addition, the PCRF_A 60 may incorporate the fifteenth identification information and/or the sixteenth identification information into the response message in the IP-CAN session update procedure. By incorporating such pieces of identification information, the PCRF_A 60 may indicate that the updating of the routing rule and/or the request from the UE_A 10 is permitted.

In addition, the PCRF_A 60 may incorporate the seventeenth identification information and/or the eighteenth identification information into the response message in the IP-CAN session update procedure. By incorporating such pieces of identification information, the PCRF_A 60 may indicate that the updating of the routing rule and/or the request from the UE_A 10 is not permitted.

Note that in a case where the already-established multi-access session and/or the PGW_A 30 does not use the PCRF_A 60, the IP-CAN session update procedure may be omitted. In this case, the sixth-condition determination may be performed by the PGW_A 30, instead of by the PCRF_A 60.

Then, in a case where the sixth condition is true, the PGW_A 30 starts the procedure (A) in this procedure. In contrast, in a case where the sixth condition is false, the UE_A 10 starts the procedure (B) in this procedure. Note that the procedure (A) in this procedure may be identical with the procedure (C) in the network-led routing-rule update procedure.

Note that in the procedure (A) in this procedure, the PGW_A 30 and/or the SGW_A 35 may incorporate the fifteenth identification information and/or the sixteenth identification information into the modify bearer request message. By incorporating such pieces of identification information, the PGW_A 30 and/or the SGW_A 35 may indicate that the updating of the routing rule and/or the request from the UE_A 10 has been permitted.

In addition, the MME_A 40 may incorporate the fifteenth identification information and/or the sixteenth identification information into the modify EPS bearer context request message. By incorporating such pieces of identification information, the MME_A 40 may indicate that the updating of the routing rule and/or the request from the UE_A 10 has been permitted.

In addition, the TWAG_A 74 may incorporate the fifteenth identification information and/or the sixteenth identification information into the PDN modification request message. By incorporating such pieces of identification information, the TWAG_A 74 may indicate that the updating of the routing rule and/or the request from the UE_A 10 has been permitted.

In addition, the ePDG_A 65 may incorporate the fifteenth identification information and/or the sixteenth identification information into the INFORMATIONAL request message. By incorporating such pieces of identification information, the ePDG_A 65 may indicate that the updating of the routing rule and/or the request from the UE_A 10 has been permitted.

In addition, by transmitting and/or receiving the fifteenth identification information, each apparatus may indicate that the Access Traffic Switching function and/or the NBIFOM function is performed in the multi-access session.

In addition, by transmitting and/or receiving the fifteenth identification information, each apparatus may indicate that the setting or the changing of the access for performing a communication using a first type multi-access session has been permitted, and/or may indicate the access type that is in effect after the setting or the change. Note that the access to be set or changed may be an access to be used in a communication of one or more flows that can be communicated by use of a first type multi-access session.

In addition, by transmitting and/or receiving the fifteenth identification information, each apparatus may indicate that the setting or the changing of the routing rule associated with a first type multi-access session has been permitted, or may indicate the routing rule associated with a first type multi-access session.

In addition, by transmitting and/or receiving the sixteenth identification information, each apparatus may indicate that bundling one or more PDU sessions and then considering the bundled PDU sessions as a second type multi-access session has been permitted. In addition, by transmitting and/or receiving the sixteenth identification information, each apparatus may indicate and/or identify the multi-access session.

In addition, by transmitting and/or receiving the sixteenth identification information, each apparatus may indicate that the performing of the Access Traffic Splitting function and/or the MPTCP function has been permitted for the communication of one or more flows that can be communicated by use of a second type multi-access session. In addition, each apparatus may indicate that the stopping of the Access Traffic Splitting function and/or the MPTCP function is permitted. In addition, by transmitting and/or receiving the sixteenth identification information, each apparatus may indicate which communication of the flow is used to perform the Access Traffic Splitting function and/or the MPTCP function. In addition to or in lieu of this, by transmitting and/or receiving the sixteenth identification information, each apparatus may request the starting or the stopping of the Access Traffic Splitting function and/or the MPTCP function using multiple PDU sessions, and/or multiple communication paths, and/or may indicate that the starting or the stopping of the user-data transmission and/or reception by use of the Access Traffic Splitting function and/or the MPTCP function has been permitted.

In addition, by transmitting and/or receiving the sixteenth identification information, each apparatus may indicate that the setting or the changing of the routing rule associated with a second type multi-access session has been permitted, or may indicate the routing rule associated with a second type multi-access session.

Note that one or more of the modify EPS bearer context request message, the PDN modification request message, and the INFORMATIONAL request message may be update routing rule response messages.

Next, a description will be provided below about each step in the procedure (B) in this procedure. The PGW_A 30 transmits an update bearer reject message to the source of the bearer resource command message, and thus starts the procedure (B) in this procedure (S2510). Specifically, the PGW_A 30 transmits the update bearer reject message to one or more of the SGW_A 35, the TWAG_A 74, and the ePDG_A 65 (S2510). Then, that one or more of the SGW_A 35, the TWAG_A 74, and the ePDG_A 65 receive the update bearer reject message. Note that the update bearer reject message may be an update bearer request message or an update bearer response message containing a Reject cause.

Note that the PGW_A 30 and/or the SGW_A 35 may incorporate the seventeenth identification information and/or the eighteenth identification information into the modify bearer reject message. By incorporating such pieces of identification information, the PGW_A 30 and/or the SGW_A 35 may indicate that the updating of the routing rule and/or the request from the UE_A 10 has not been permitted.

Then, in a case where the SGW_A 35 has received the update bearer reject message, the SGW_A 35 transmits an update bearer reject message to the MME_A 40 (S2510). Then, the MME_A 40 receives the update bearer reject message, and transmits an modify EPS bearer context reject message to the UE_A 10 (S2512). In addition, in a case where the TWAG_A 74 has received the update bearer reject message, the TWAG_A 74 transmits a modify PDN reject message to the UE_A 10 (S2512). In addition, in a case where the ePDG_A 65 has received the update bearer reject message, the ePDG_A 65 transmits an INFORMATIONAL request message to the UE_A 10 (S2512). Note that one or more of the modify EPS bearer context reject message, the modify PDN reject message, and the INFORMATIONAL request message may be update routing rule reject messages.

In addition, the MME_A 40 may incorporate the seventeenth identification information and/or the eighteenth identification information into the modify EPS bearer context reject message. By incorporating such pieces of identification information, the MME_A 40 may indicate that the updating of the routing rule and/or the request from the UE_A 10 has not been permitted.

In addition, the TWAG_A 74 may incorporate the seventeenth identification information and/or the eighteenth identification information into the modify PDN reject message. By incorporating such pieces of identification information, the TWAG_A 74 may indicate that the updating of the routing rule and/or the request from the UE_A 10 has not been permitted.

In addition, the ePDG_A 65 may incorporate the seventeenth identification information and/or the eighteenth identification information into the INFORMATIONAL request message. By incorporating such pieces of identification information, the ePDG_A 65 may indicate that the updating of the routing rule and/or the request from the UE_A 10 has not been permitted.

In addition, by transmitting and/or receiving the seventeenth identification information, each apparatus may indicate that the performing of the Access Traffic Switching function and/or the NBIFOM function is not permitted in the multi-access session.

In addition, by transmitting and/or receiving the seventeenth identification information, each apparatus may indicate that the request for the setting or the changing of the access for performing a communication using a first type multi-access session has been rejected. In addition, each apparatus may indicate that the request has been rejected for the setting or the changing of the access to be used in the communication of one or more flows that can be communicated by use of a first type multi-access session.

In addition, by transmitting and/or receiving the seventeenth identification information, each apparatus may indicate that the request has been rejected for the setting or the changing of the routing rule associated with a first type multi-access session. In addition, each apparatus may notify of the reason why each request has been rejected.

In addition, by transmitting and/or receiving the seventeenth identification information, each apparatus may indicate that the setting or the changing of the access for performing a communication using a first type multi-access session has not been permitted, and/or may indicate that the setting or the changing of a routing rule associated with the first type multi-access session has not been permitted.

In addition, by transmitting and/or receiving the eighteenth identification information, each apparatus may indicate that the request has been rejected for the bundling of one or more PDU sessions and then the considering of the bundled PDU sessions as a second type multi-access session. In addition, by transmitting and/or receiving the eighteenth identification information, each apparatus may indicate the reason why the request has been rejected for the bundling of one or more PDU sessions and then the considering of the bundled PDU sessions as a second type multi-access session.

In addition, by transmitting and/or receiving the eighteenth identification information, each apparatus may indicate that the request has been rejected for the performing of the Access Traffic Splitting function and/or the MPTCP function for the communication of one or more flows that can be communicated by use of a second type multi-access session. In addition, each apparatus may indicate that the request has been rejected for the stopping of the Access Traffic Splitting function and/or the MPTCP function. In addition, by transmitting and/or receiving the eighteenth identification information, each apparatus may indicate which communication of the flow is not used to perform the Access Traffic Splitting function and/or the MPTCP function. In addition to or in lieu of this, by transmitting and/or receiving the eighteenth identification information, each apparatus may indicate that the request has been rejected for the starting or the stopping of the Access Traffic Splitting function and/or the MPTCP function using multiple PDU sessions and/or multiple communication paths. In addition, each apparatus may indicate that the starting or the stopping of the user-data transmission and/or reception by use of the Access Traffic Splitting function and/or the MPTCP function has been rejected.

In addition, by transmitting and/or receiving the eighteenth identification information, each apparatus may indicate that the request has been rejected for the setting or the changing of the routing rule associated with a second type multi-access session. In addition, each apparatus may notify of the reason why each request has been rejected.

In addition, by transmitting and/or receiving the eighteenth identification information, each apparatus may indicate that no implementation of the Access Traffic Splitting function and/or the MPTCP function is permitted for each flow, and/or may indicate that no setting or no changing of a routing rule associated with a second type multi-access session has been permitted.

Then, the UE_A 10 receives one or more of the modify EPS bearer context reject message, the modify PDN reject message, and the INFORMATIONAL request message.

In addition, in a case where the UE_A 10 has received an INFORMATIONAL request message, the UE_A 10 transmits an INFORMATIONAL response message to the ePDG_A 65 (S2514). Based on the transmission and/or reception of one or more of the modify EPS bearer context reject message, the modify PDN reject message, the INFOR- MATIONAL request message, and the INFORMATIONAL response message, each apparatus completes the procedure (B) in this procedure.

Based on the completion of the procedure (A) or (B) in this procedure, each apparatus completes this procedure. Note that based on the completion of procedure (A) in this procedure, each apparatus may recognize that this procedure has been accepted. Alternatively, based on the completion of the procedure (B) in this procedure, each apparatus may recognize that this procedure has been rejected.

Based on the completion of this procedure, each apparatus may update the routing rule associated with the multi-access session, but each apparatus does not have to update the routing role. To put it differently, in a case where each apparatus has received the fifteenth identification information and/or sixteenth identification information, the apparatus may update the routing rule associated with a multi-access session. In addition, in a case where each apparatus has received the seventeenth identification information and/or eighteenth identification information, the apparatus may update the routing rule associated with a multi-access session.

In addition, in a case where each apparatus has transmitted and/or received the fifteenth identification information, the apparatus may perform the Access Traffic Switching function and/or the NBIFOM function in the multi-access session. In addition, in a case where each apparatus has transmitted and/or received the fifteenth identification information, the apparatus may recognize that the access for performing a communication using a first type multi-access session has been set or changed. In addition, each apparatus may recognize the access that is in effect after the setting or the change.

In addition, in a case where each apparatus has transmitted and/or received the fifteenth identification information, the apparatus may recognize that the routing rule associated with a first type multi-access session has been set or changed, or may recognize and store the routing rule associated with a first type multi-access session.

In addition, in a case where each apparatus has transmitted and/or received the sixteenth identification information, the apparatus may bundle one or more PDU sessions together and then consider the bundled PDU sessions as a second type multi-access session. In addition, in a case where each apparatus has transmitted and/or received the sixteenth identification information, the apparatus may identify the multi-access session.

In addition, in a case where each apparatus has transmitted and/or received the sixteenth identification information, the apparatus may perform or may stop the Access Traffic Splitting function and/or the MPTCP function for the communication of one or more flows that can be communicated by use of a second type multi-access session. In addition, in a case where each apparatus has transmitted and/or received the sixteenth identification information, each apparatus may recognize which communication of the flow the Access Traffic Splitting function and/or the MPTCP function can be applied to. In addition to or in lieu of this, in a case where each apparatus has transmitted and/or received the sixteenth identification information, each apparatus may start or stop the Access Traffic Splitting function and/or the MPTCP function using multiple PDU sessions, and/or multiple communication paths. In addition, each apparatus may start or stop the user-data transmission and/or reception by use of the Access Traffic Splitting function and/or the MPTCP function.

In addition, in a case where each apparatus has transmitted and/or received the sixteenth identification information, the apparatus may recognize that the routing rule associated with a second type multi-access session has been set or changed, or may recognize and/or store the routing rule associated with a second type multi-access session.

In addition, in a case where each apparatus has transmitted and/or received the seventeenth identification information, the apparatus may determine that it is not possible to perform the Access Traffic Switching function and/or the NBIFOM function for a multi-access session, and/or may recognize that the access for performing a communication using a first type multi-access session has not been set or changed.

In addition, in a case where each apparatus has transmitted and/or received the seventeenth identification information, the apparatus may recognize that the routing rule associated with a first type multi-access session has not been set or changed.

In addition, in a case where each apparatus has transmitted and/or received the eighteenth identification information, the apparatus may determine that one or more PDU sessions that have been bundled together cannot be considered as a second type multi-access session.

In addition, in a case where each apparatus has transmitted and/or received the eighteenth identification information, the apparatus may determine that it is not possible to perform or stop the Access Traffic Splitting function and/or the MPTCP function for the communication of one or more flows that can be communicated by use of a second type multi-access session. In addition, the apparatus may recognize which communication of the flow the Access Traffic Splitting function and/or the MPTCP function cannot be applied to. In addition to or in lieu of this, in a case where each apparatus has transmitted and/or received the eighteenth identification information, the apparatus may determine that the Access Traffic Splitting function and/or the MPTCP function using multiple PDU sessions and/or multiple communication paths cannot be started or stopped. In addition, the apparatus may determine that the user-data transmission and/or reception by use of the Access Traffic Splitting function and/or the MPTCP function cannot be started or stopped.

In addition, in a case where each apparatus has transmitted and/or received the eighteenth identification information, the apparatus may recognize that the routing rule associated with a second type multi-access session has not been set or changed.

1.3.5. Modifications of Present Embodiment

Each apparatus in the present embodiment may be different from the one described thus far. For example, the MME_A 40 is an apparatus configured to manage the mobility of each apparatus such as the UE_A 10 and/or to manage the sessions among apparatuses. In the core network_A 90 in the present embodiment, a different apparatus may be in charge of the management of the mobility and the sessions.

Specifically, a Session Management Entity (SME) may manage the sessions, which would otherwise be a part of the management function of the MME_A 40. In this case, the MME_A 40 in the present embodiment may be replaced by a Session Management Entity (SME). In addition, each message transmitted and/or received by the MME_A 40 as described in the communication procedure in the present embodiment may be transmitted and/or received by the SME. In addition, the processing performed by the MME_A 40 may be performed by the SME.

In addition, the SGW_A 35 and/or the PGW_A 30 may be an UP function. In addition, the SGW_A 35 and/or the PGW_A 30 may be configured as a single apparatus or may be configured as separate apparatuses.

The eNB_A 45 in the present embodiment does not have to be an apparatus in the E-UTRAN_A 80. Instead, the eNB_A 45 may be an apparatus in a different 3GPP access network. For example, the eNB_A 45 may be a NextGen BS_A 122, may be an NB_A 22, or may be a BSS_A 26. In addition, the TWAG_A 74 in the present embodiment may be an apparatus in a different non-3GPP access network, or may be a WAG_A 126.

2. Modifications

A program running on an apparatus according to the present invention may serve as a program that controls a Central Processing Unit (CPU) and the like to cause a computer to operate in such a manner as to realize the functions of the embodiments according to the present invention. Programs or the information handled by the programs are temporarily stored in: a volatile memory, such as a Random Access Memory (RAM); a non-volatile memory, such as a flash memory; a Hard Disk Drive (HDD); or any other recording device systems.

Note that a program to realize the functions of the embodiments associated with the present invention may be recorded in a computer-readable recording medium. The functions may be realized by causing a computer system to load and execute the program recorded in this recording medium. It is assumed that the "computer system" refers to a computer system built into the apparatuses, and the computer system includes an operating system and hardware components such as a peripheral device. In addition, the "computer-readable recording medium" may be a semiconductor recording medium, an optical recording medium, a magnetic recording medium, a medium operable to dynamically hold a program for a short time, or any other computer-readable recording media.

Furthermore, each functional block or various characteristics of the apparatuses used in the above-described embodiment may be implemented or performed on an electric circuit, for example, an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor, or may be a processor of known type, a controller, a micro-controller, or a state machine instead. The above-mentioned circuits may include a digital circuit, or may include an analog circuit. Furthermore, in a case that with advances in semiconductor technology, a circuit integration technology appears that replaces the present integrated circuits, it is also possible for one or more aspects of the prevent invention to use a new integrated circuit based on the technology.

Note that the invention of the present patent application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention.

Furthermore, a configuration in which constituent elements, described in the respective embodiments and having mutually the same effects, are substituted for one another is also included in the technical scope of the present invention.

REFERENCE SIGNS LIST

1 Mobile communication system
5 PDN_A
10 UE_A
20 UTRAN_A
22 NB_A
24 RNC_A
25 GERAN_A
26 BSS_A
30 PGW_A
35 SGW_A
40 MME_A
42 SGSN_A
45 eNB_A
46 SCEF_A
50 HSS_A
55 AAA_A
60 PCRF_A
65 ePDG_A
70 WLAN ANa
72 WLAN APa
74 TWAG_A
75 WLAN ANb
76 WLAN APb
20 E-UTRAN_A
90 Core network_A
120 NextGen RAN_A
122 NextGen BS_A
125 WLAN ANc
126 WAG_A

The invention claimed is:

1. A User Equipment (UE) comprising:
transmission and reception circuitry configured for:
in a Protocol Data Unit (PDU) session establishment procedure, transmitting a PDU session establishment request message, to a core network; and
receiving a PDU session establishment accept message including at least a PDU session type, from the core network; and
a controller configured for:
in a case that the PDU session type is IPv6 or IPv4v6, and the PDU session establishment request message includes information indicating support of a Multi-homed PDU session using IPv6,
establishing a PDU session to use multiple IPv6 prefixes during the PDU session establishment procedure.

2. The UE according to claim 1, wherein
the PDU session establishment request message further includes information indicating IPv6 or IPv4v6.

3. The UE according to claim 2, wherein
the PDU session establishment request message further includes information indicating a Session and Service Continuity (SSC) mode.

4. The UE according to claim 1, wherein
the PDU session establishment request message further includes information indicating a Session and Service Continuity (SSC) mode.

5. A communication control method performed by a User Equipment (UE), the communication control method comprising:
in a Protocol Data Unit (PDU) session establishment procedure, transmitting a PDU session establishment request message, to a core network; and
receiving a PDU session establishment accept message including at least a PDU session type, from the core network; and
in a case that the PDU session type is IPv6 or IPv4v6, and the PDU session establishment request message includes information indicating support of a Multi-homed PDU session using IPv6, establishing a PDU session supported to use multiple IPv6 prefixes during the PDU session establishment procedure.

6. The communication control method according to claim 5, wherein
the PDU session establishment request message further includes information indicating a IPv6 or IPv4v6.

7. The communication control method according to claim 6, wherein
the PDU session establishment request message further includes information indicating a Session and Service Continuity (SSC) mode.

8. The communication control method according to claim 5, wherein
the PDU session establishment request message further includes information indicating a Session and Service Continuity (SSC) mode.

9. A core network device comprising: transmission and reception circuitry configured for:
in a Protocol Data Unit (PDU) session establishment procedure, receiving a PDU session establishment request message, from a User Equipment (UE); and
transmitting a PDU session establishment accept message including at least a PDU session type, to the UE; and
a controller configured for:
in a case that the PDU session type is IPv6 or IPv4v6, and the PDU session establishment request message includes information indicating support of Multi-homed PDU session using IPv6, establishing a PDU session to use multiple IPv6 prefixes during the PDU session establishment procedure.

10. The core network device according to claim 9, wherein
the PDU session establishment request message further includes information indicating IPv6 or IPv4v6.

11. The core network device according to claim 10, wherein
the PDU session establishment request message further includes information indicating a Session and Service Continuity (SSC) mode.

12. The core network device according to claim 9, wherein
the PDU session establishment request message further includes information indicating a Session and Service Continuity (SSC) mode.

13. A communication control method performed by a core network device, the communication control method comprising:
in a Protocol Data Unit (PDU) session establishment procedure, receiving a PDU session establishment request message, from a User Equipment (UE); and
transmitting a PDU session establishment accept message including at least a PDU session type, to the UE; and
in a case that the PDU session type is IPv6 or IPv4v6, and the PDU session establishment request message includes information indicating support of a Multi-homed PDU session using IPv6, establishing a PDU session to use multiple IPv6 prefixes during the PDU session establishment procedure.

14. The communication control method according to claim 13, wherein
the PDU session establishment request message further includes information indicating IPv6 or IPv4v6.

15. The communication control method according to claim 14, wherein
the PDU session establishment request message further includes information indicating a Session and Service Continuity (SSC) mode.

16. The communication control method according to claim 13, wherein
the PDU session establishment request message further includes information indicating a Session and Service Continuity (SSC) mode.

* * * * *